(12) United States Patent
Rohmer

(10) Patent No.: US 12,341,328 B2
(45) Date of Patent: Jun. 24, 2025

(54) COMPUTER SYSTEM NETWORKING DEVICES AND ASSEMBLIES

(71) Applicant: Pass & Seymour, Inc., Syracuse, NY (US)

(72) Inventor: Richard M. Rohmer, Memphis, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 18/601,018

(22) Filed: Mar. 11, 2024

(65) Prior Publication Data

US 2024/0213751 A1 Jun. 27, 2024

Related U.S. Application Data

(63) Continuation of application No. 17/125,238, filed on Dec. 17, 2020, now Pat. No. 11,979,013.

(60) Provisional application No. 62/948,843, filed on Dec. 17, 2019.

(51) Int. Cl.
| | |
|---|---|
| *H02G 3/18* | (2006.01) |
| *H01R 25/00* | (2006.01) |
| *H02G 3/12* | (2006.01) |
| *H02G 3/14* | (2006.01) |
| *H01R 103/00* | (2006.01) |

(52) U.S. Cl.
CPC ............ *H02G 3/12* (2013.01); *H01R 25/006* (2013.01); *H02G 3/14* (2013.01); *H02G 3/18* (2013.01); *H01R 2103/00* (2013.01)

(58) Field of Classification Search
CPC ... H02G 3/12; H02G 3/14; H02G 3/18; H01R 25/006; H04L 45/60; H04L 12/66
See application file for complete search history.

(56) References Cited

U.S. PATENT DOCUMENTS

2009/0247006 A1* 10/2009 Thompson .......... H04L 12/2898
                                                    439/527
2019/0357339 A1* 11/2019 Kim ....................... H05B 47/19

\* cited by examiner

*Primary Examiner* — Michael C Zarroli
(74) *Attorney, Agent, or Firm* — Bond, Schoeneck & King, PLLC; Frederick J. M. Price

(57) ABSTRACT

The present invention is directed to a computer system networking device assembly including a computer system networking device including a computer system networking device module coupled to a power supply circuit, and at least one connection point on the power supply circuit configured to be directly connected via an AC power wire to a mains power supply. The device can include an enclosure housing the device module and power supply circuit; and a subplate or wall plate having a first aperture formed therethrough, wherein the front surface of the enclosure is configured to be positioned through the first aperture formed in a subplate or a wall plate. The subplate or wall plate further can include a second aperture formed therethrough being configured to accommodate at least a portion of an electrical wiring device.

17 Claims, 62 Drawing Sheets

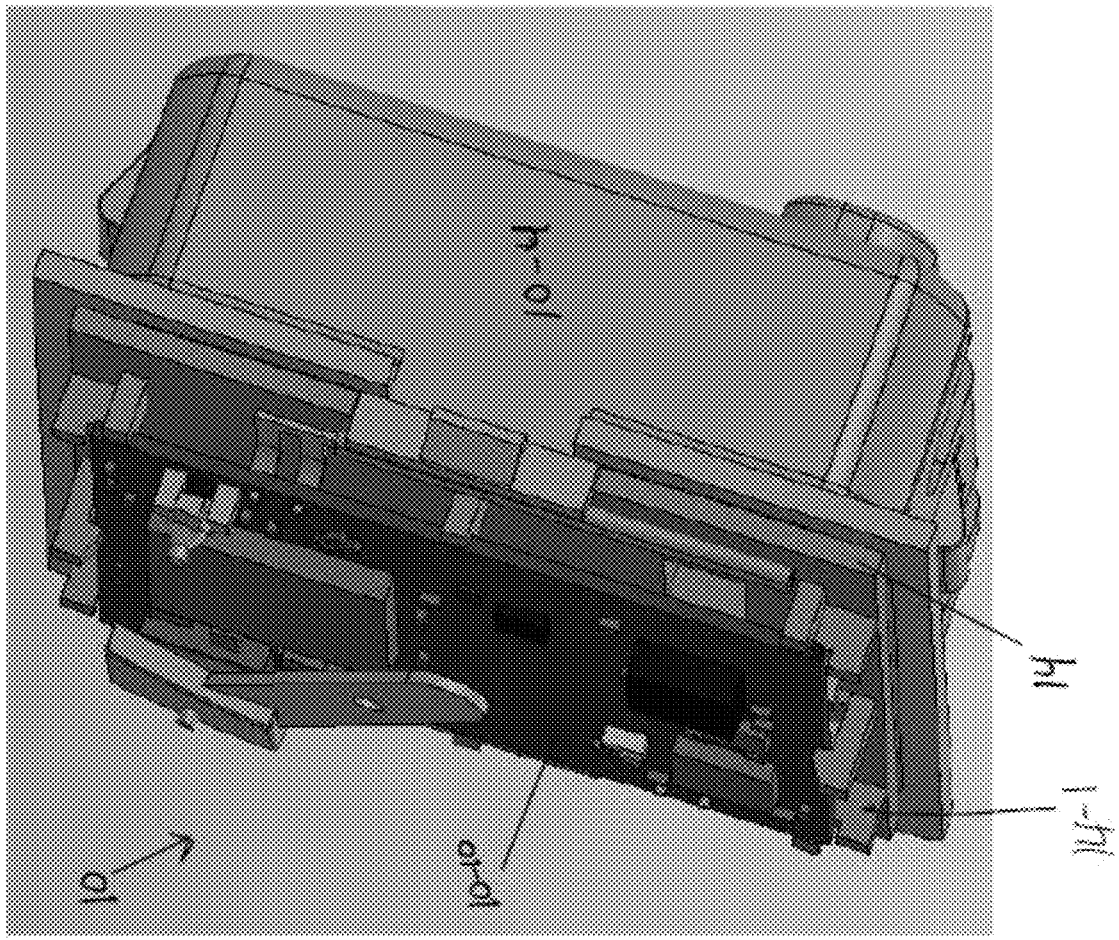

COMPUTER SYSTEM NETWORKING DEVICES AND ASSEMBLIES

CROSS-REFERENCE TO RELATED APPLICATIONS

This application is a Continuation of U.S. Non-Provisional patent application Ser. No. 17/125,238 filed on Dec. 17, 2020, which claims priority to, and the benefit of U.S. Provisional Patent Application No. 62/948,843 filed on Dec. 17, 2019, the entirety of which is incorporated herein by reference.

BACKGROUND OF THE INVENTION

1. Field of the Invention

The present invention relates generally to computer system networking devices and assemblies, and particularly to computer system networking devices and assemblies that can communicate with, control, and/or structurally attach to electrical wiring devices and assemblies.

2. Technical Background

As smart device use in homes and businesses increases, it has become necessary to have computer system networking devices (e.g., border router, IP router, hub, or Wi-Fi router devices, etc. as should be understood by those of ordinary skill in the art) to allow internet-of-thing (IoT) devices to communicate, control or pass through information to one another. Currently there are a multitude of conventional standalone computer system networking devices that can accomplish one or more of these functionalities. Such devices are separate from fixed (in-wall or otherwise in-structure) electrical wiring devices, are required to be plugged in to an electrical receptacle/outlet to receive power and be utilized, and be maintained and specifically located somewhere in the home or business (either crowding the outlet itself or other space in a specific room).

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention address the issues with conventional computer system networking devices described above. Embodiments of the present invention recognize that when linking electrical wiring devices (e.g., switches, dimmers, receptacles) within a network, it can be preferable if hub/router features were built into an electrical wiring device assembly to avoid having another appliance to maintain and locate. A drawback to such an approach can be that the space required in an in-wall electrical wiring device assembly can be limited and the cost to add it to all devices can be prohibitive. Accordingly, embodiments of the present invention may be realized in an electrical wiring device form factor that provides the user with a computer system networking device portion (e.g., router/hub/WiFi portion) added either to an associated wall plate or to a subplate that goes under the wall plate. The computer system networking device portion can be positioned over and bank against the wall (preferably without the device penetrating the wall) and does not require another "gang" in the outlet/wall box already occupied by an electrical wiring device, making it easier for retrofitting. The computer system networking device can be fixably attached to the wall box through a subplate and/or a wall plate (and can be unitary with the subplate or wall plate, or can be positioned through a hole formed therein). In such an embodiment, the AC power lines of the computer system networking device portion can extend through the wall box alongside the electrical wiring device, and connect to a mains power source. In accordance with an embodiment, the computer system networking device portion can be paired with (placed adjacent to and mechanically connected through the subplate and/or wall plate) any type of electrical wiring device or multiple electrical wiring devices already existing in a structure without forming holes in a wall structure.

Alternatively, in a new build/non-retrofit context, the computer system networking device portion can exist as an assembly of its own in a single gang wall box, or in a multiple gang embodiment where one of the gangs is reserved for the computer system networking device portion, and the other gangs can be reserved/used by certain electrical wiring devices. Similarly, in this new build/non-retrofit context, the AC power lines of the computer system networking device portion can be connected to a mains power source.

With respect to certain embodiments described herein, the computer system networking device can be formed through respective openings in wall plates described and illustrated herein. The computer system networking device of certain embodiments can also be formed through openings formed in subplates, frames and wall plates, or be formed integral with the same (as a unitary construction).

The devices and assemblies described and illustrated herein can be modular (see, e.g., description and discussion of "modular" electrical wiring devices in US Pat. App. Pub. No. 20200185898, which is incorporated by reference herein in its entirety).

Electrical wiring devices (as the non-limiting term is used herein, and as should be understood by those of ordinary skill in the art) may be configured as an outlet receptacle or as a protective device, such as a ground fault circuit interrupter (GFCI), an arc fault circuit interrupter (AFCI), a transient voltage surge suppressor (TVSS), or a surge protective device (SPD). Other electrical wiring device examples include switches, dimmers, fan speed controls, night lights, low voltage ports, or USB ports. The electrical wiring devices may also be a smart device or smart version of any of the previously wiring device types. Finally, each of these electrical wiring device types may be found in mix-and-match combinations with other kinds of these wiring devices. For example, a GFCI/AFCI combination device may be included within a single housing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1E-2 is a front view of the computer system networking device assembly of FIG. 1A with the front plate removed;

FIG. 1E-3 is a partial close up isometric view of the curved surface of the computer system networking device assembly of FIG. 1A;

FIG. 1E-4 is a front view of the computer system networking device assembly of FIG. 1A with the front plate and mounting strap removed;

FIG. 2B-2 is a cross sectional top view of the computer system networking device assembly of FIG. 2A with the subplate and the front plate removed;

FIG. 2D-2 is a top and side view showing particular dimensional measurements of a computer system networking device in accordance with a particular embodiment;

FIG. 2D-3 is a close up illustration of particular dimensional measurements of detail "A" of FIG. 2D-2;

FIG. 2D-4 is a top and side view showing particular dimensional measurements of a computer system networking device positioned within subplate in accordance with a particular embodiment;

FIG. 6I is a front isometric view of the computer system networking device assembly of FIG. 6A with certain component(s) removed;

FIG. 6K is a front isometric view of the computer system networking device assembly of FIG. 6A with certain component(s) removed;

FIG. 6N-1 is a side isometric view of the computer system networking device assembly of FIG. 6A with certain component(s) removed;

FIG. 6O is a side isometric view of the computer system networking device assembly of FIG. 6A with certain component(s) removed;

FIG. 6O-1 is a side isometric view of the computer system networking device assembly of FIG. 6A with certain component(s) removed;

FIG. 7H-1 is a front isometric view of the computer system networking device assembly of FIG. 7A with certain component(s) removed;

FIG. 7I is a side isometric view of the computer system networking device assembly of FIG. 7A with certain component(s) removed;

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. Discussion or illustration of a particular element or structural configuration does not mean that that particular element or structural configuration is required.

Figure 1A:
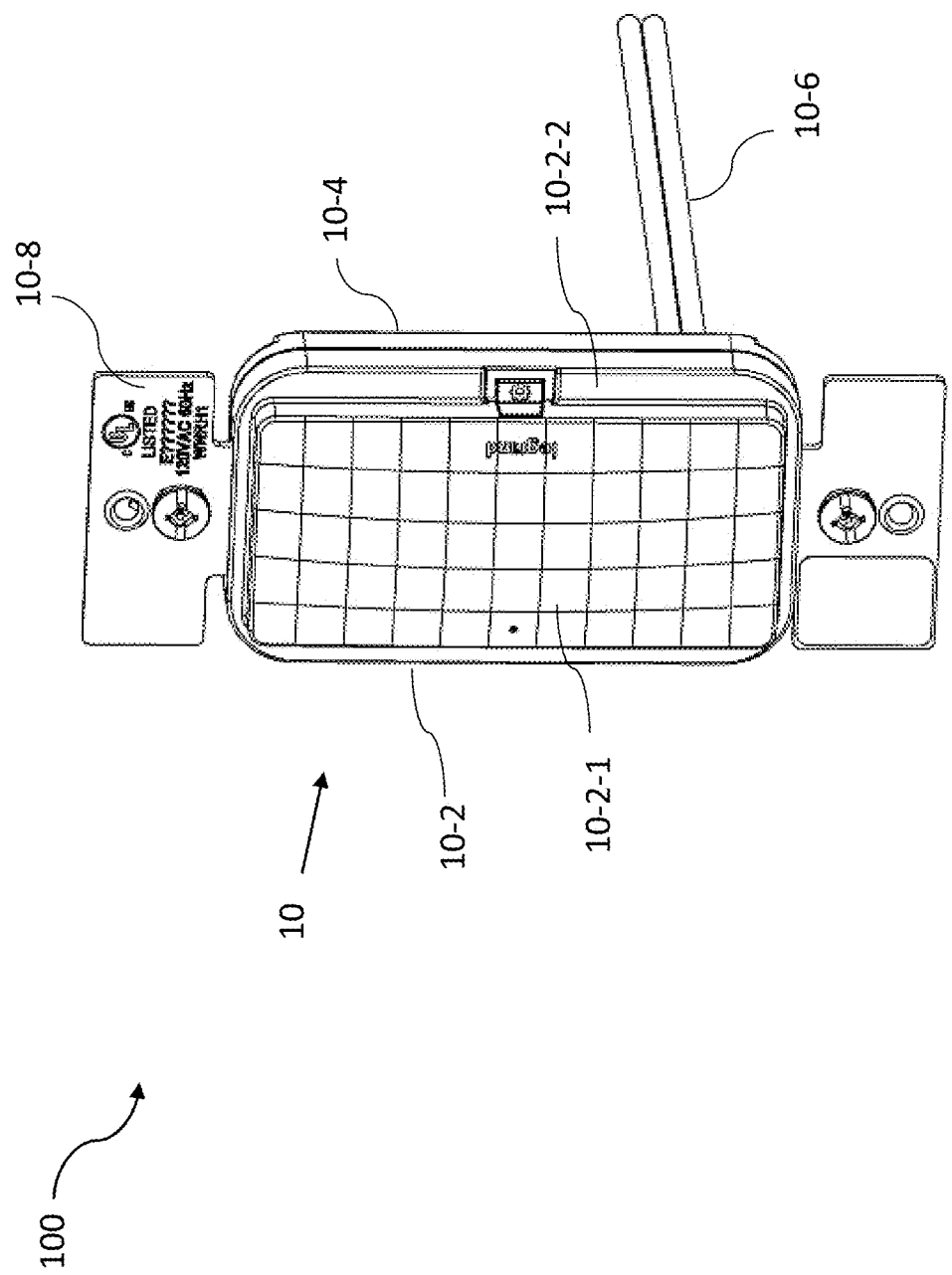
FIG. 1A is a front isometric view of a computer system networking device assembly in accordance with an embodiment of the invention.
Figure 1B:
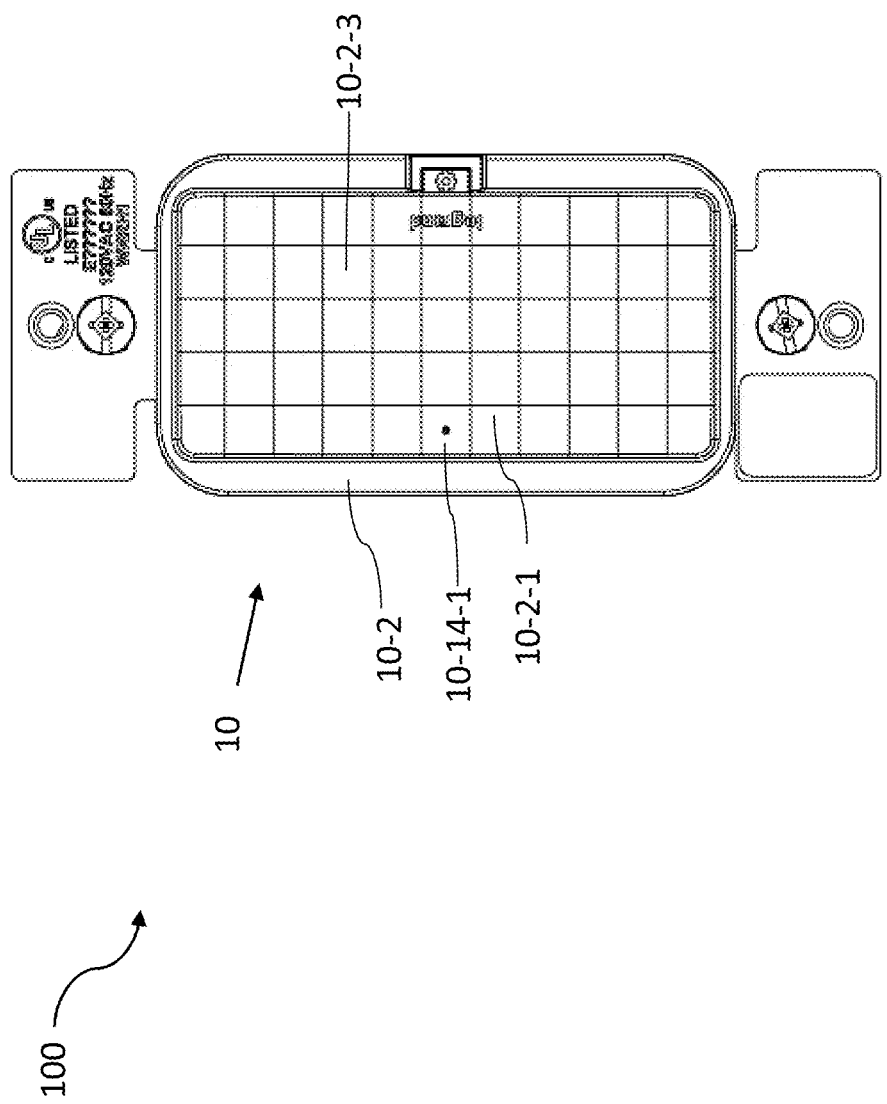
FIG. 1B is a front view of the computer system networking device assembly of FIG. 1A.
Figure 1C:
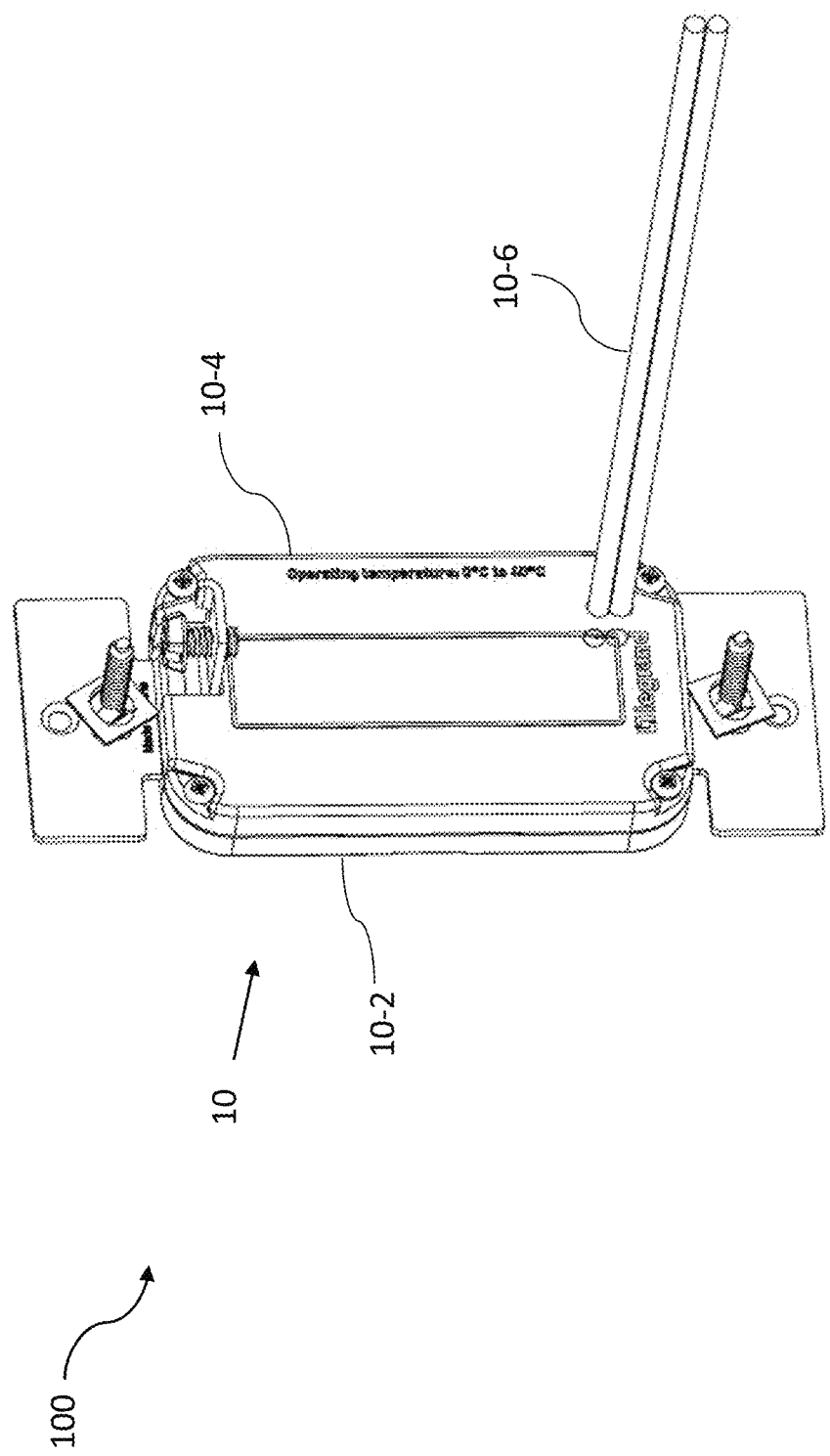
FIG. 1C is a rear isometric view of the computer system networking device assembly of FIG. 1A.
Figure 1D:
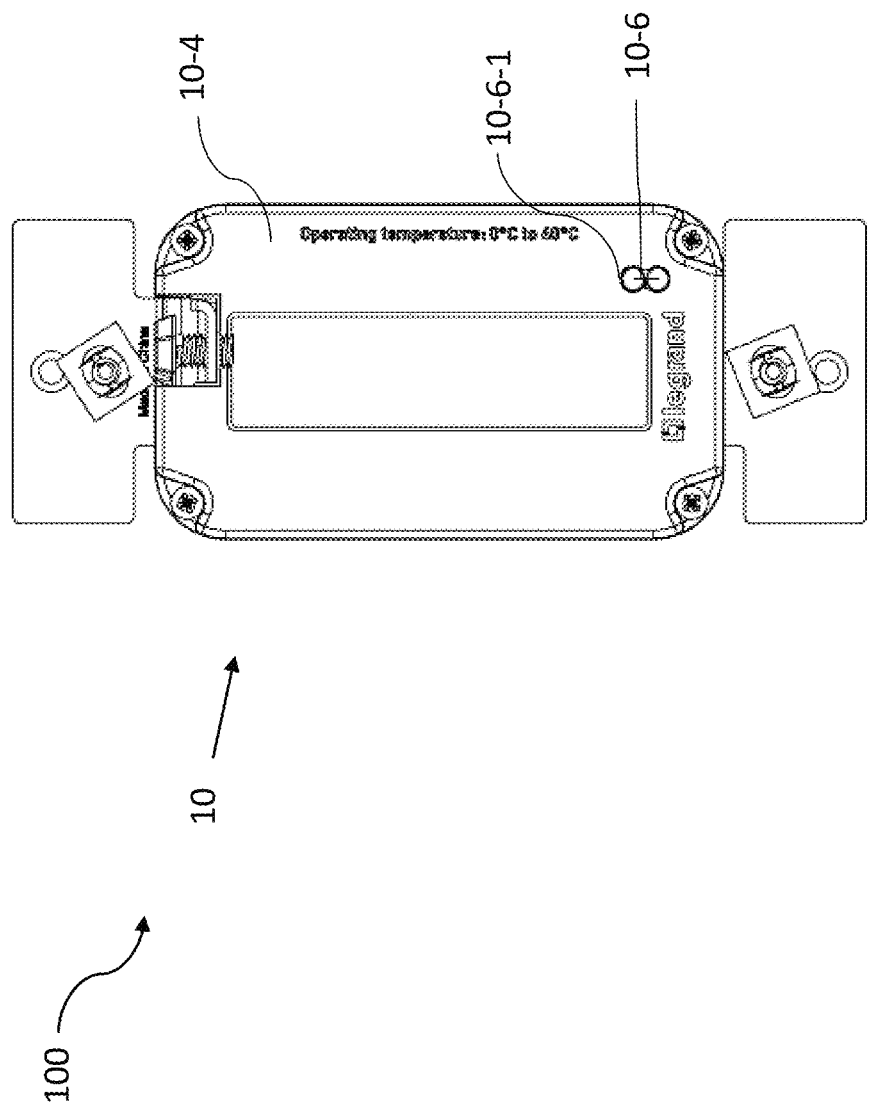
FIG. 1D is a rear view of the computer system networking device assembly of FIG. 1A.
Figure 1E:
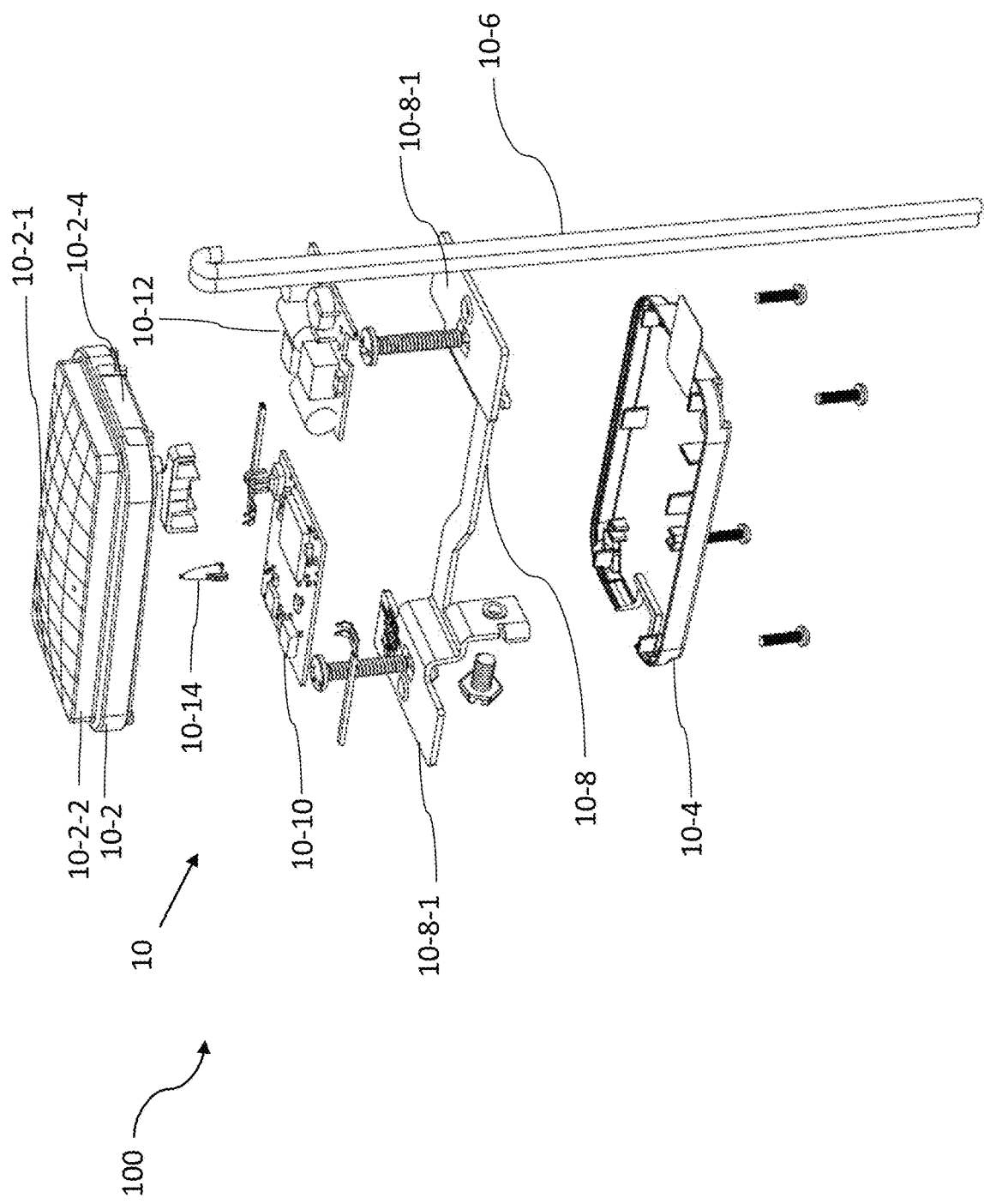
FIG. 1E is an exploded view of the computer system networking device assembly of FIG. 1A.
Figures 1, 1E, 2:
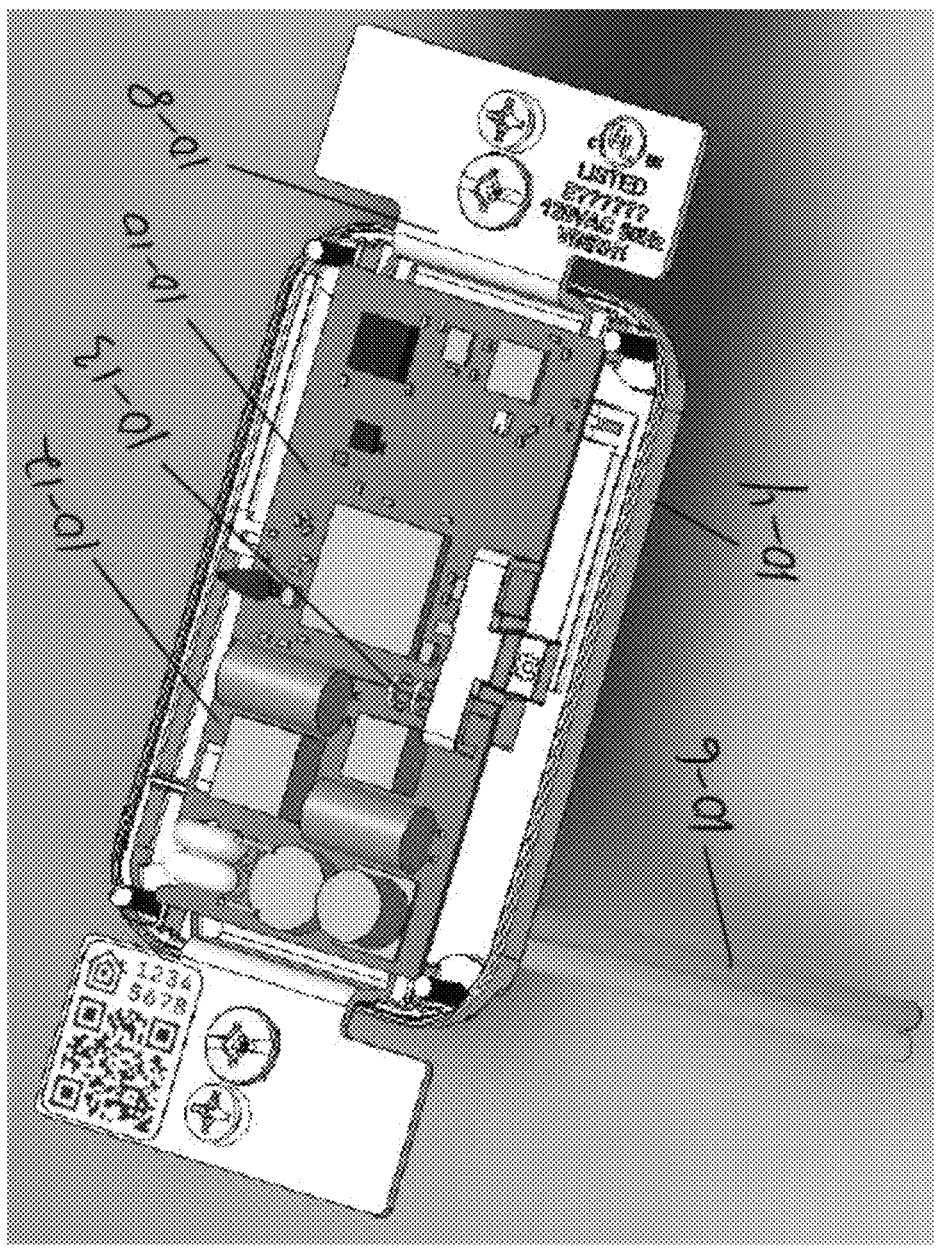
Figures 1, 1E, 2, 3:
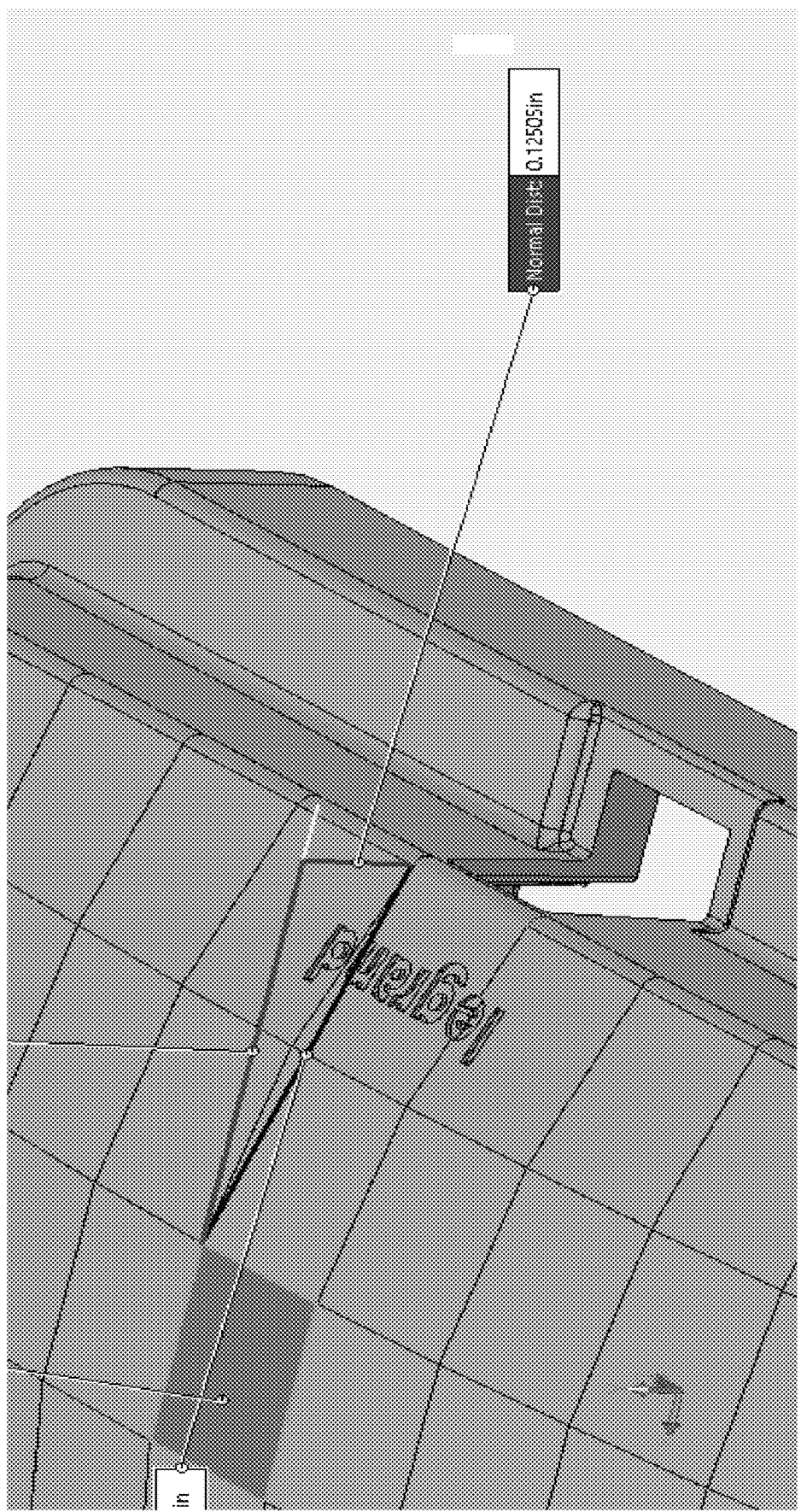
Figures 1, 1E, 2, 3, 4:
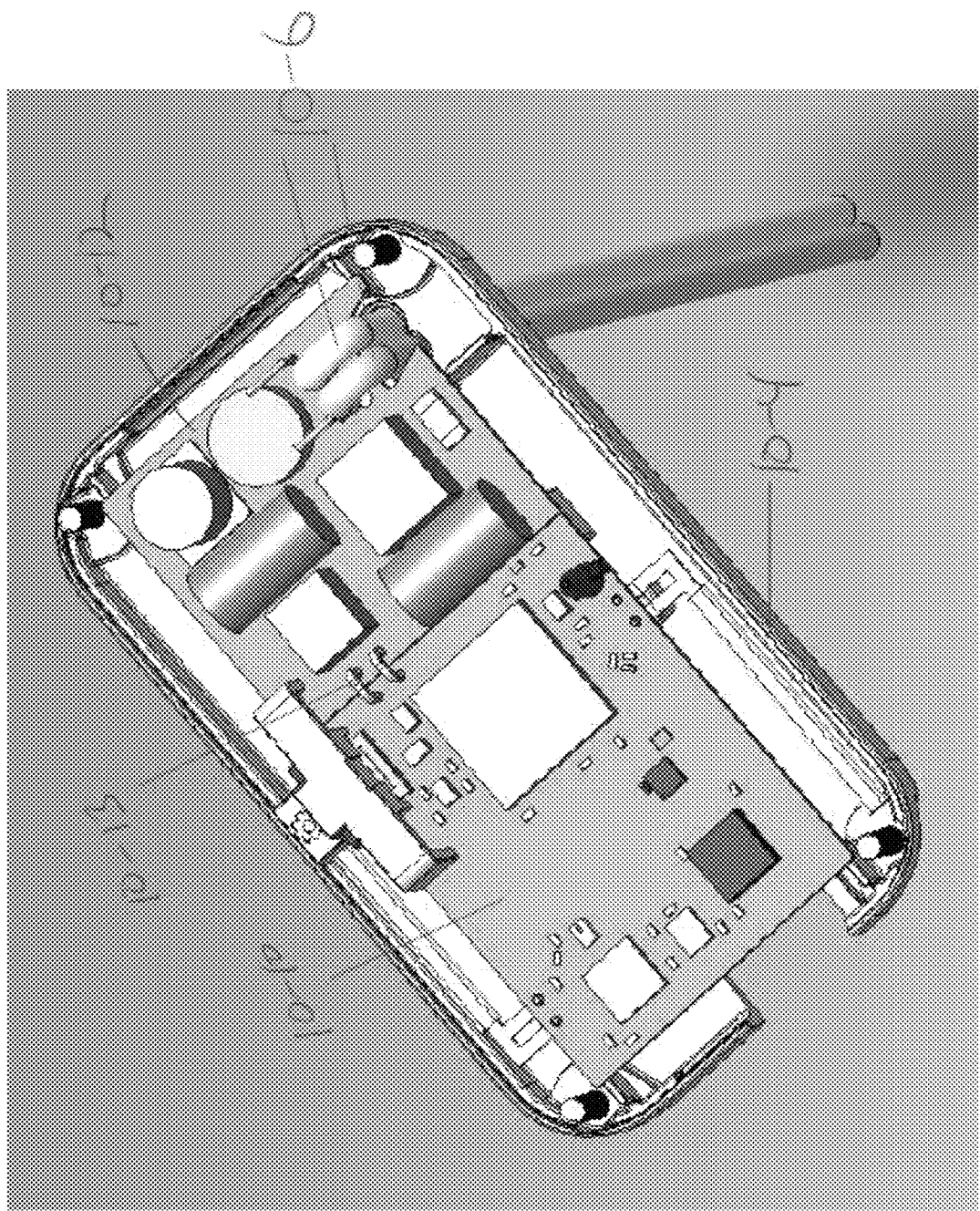
Figure 1F:
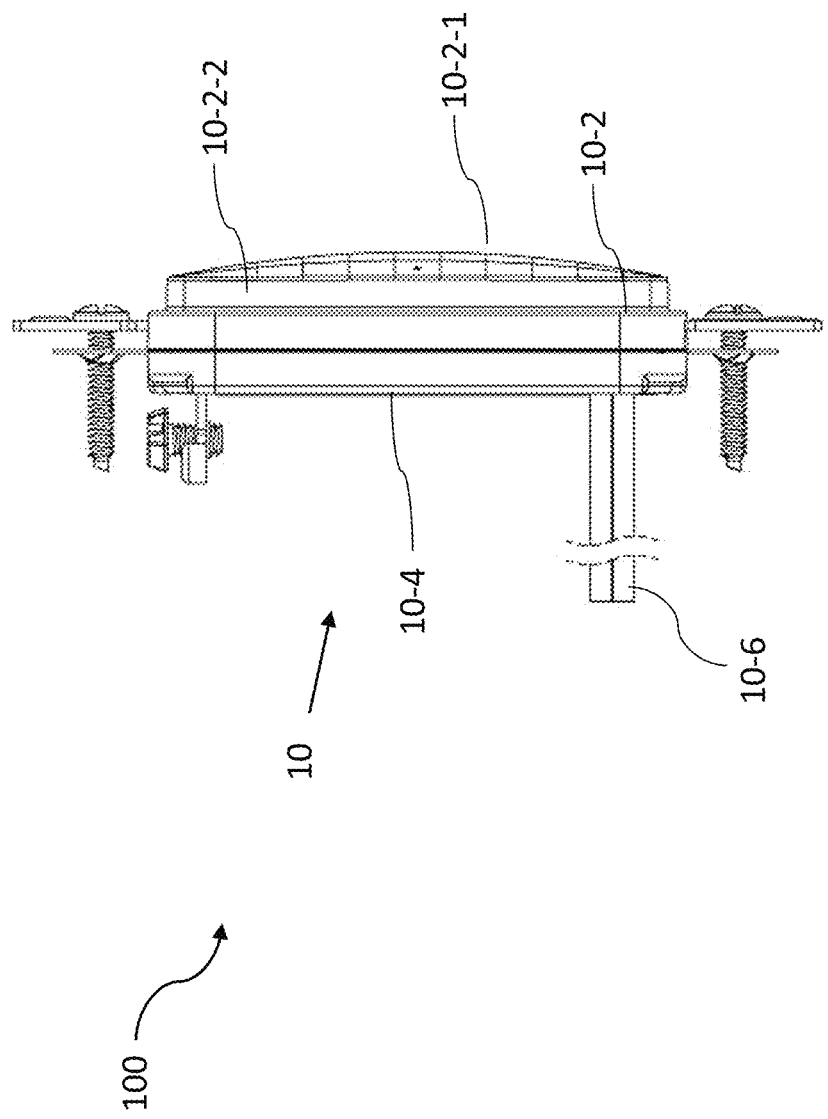
FIG. 1F is a first side view of the computer system networking device assembly of FIG. 1A.
Figure 1G:
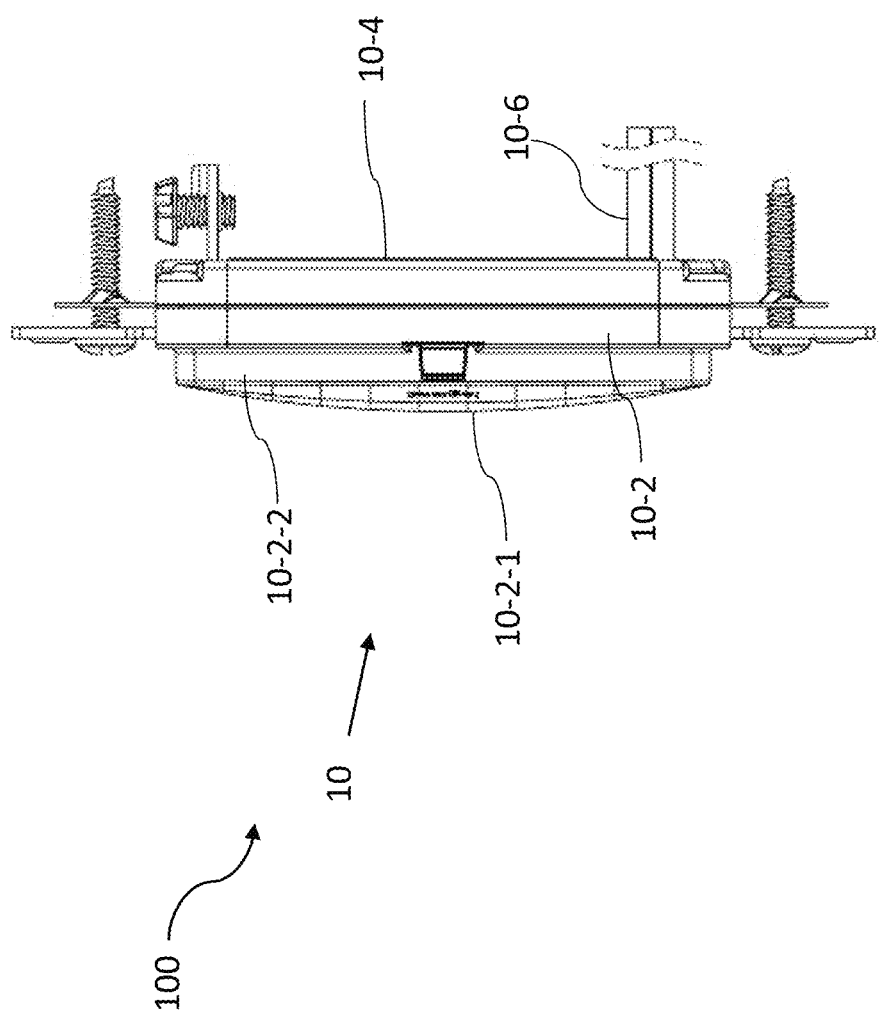
FIG. 1G is a second side view of the computer system networking device assembly of FIG. 1A.
Figure 1H:
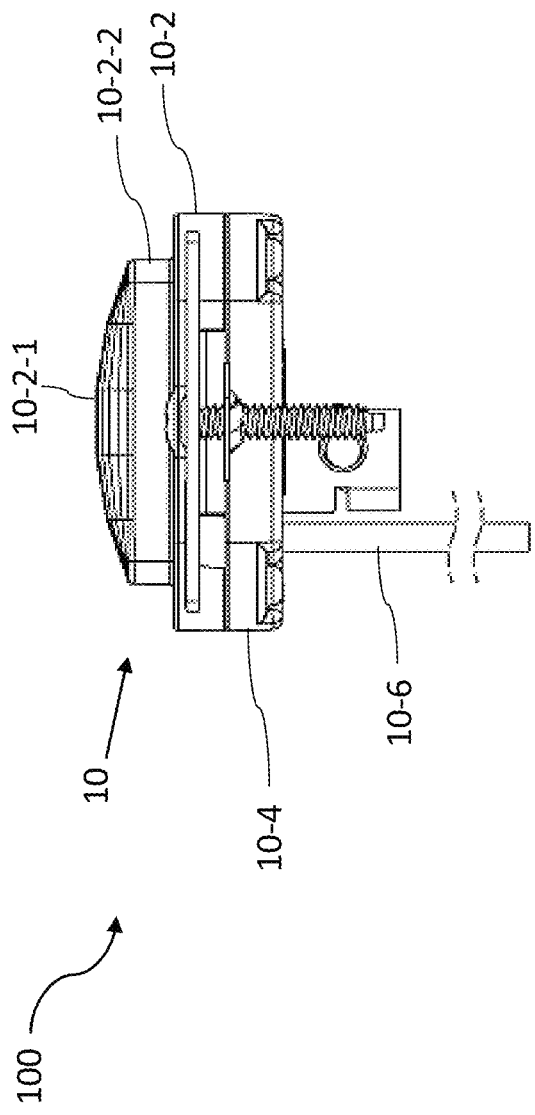
FIG. 1H is a top view of the computer system networking device assembly of FIG. 1A.
Figure 1I:
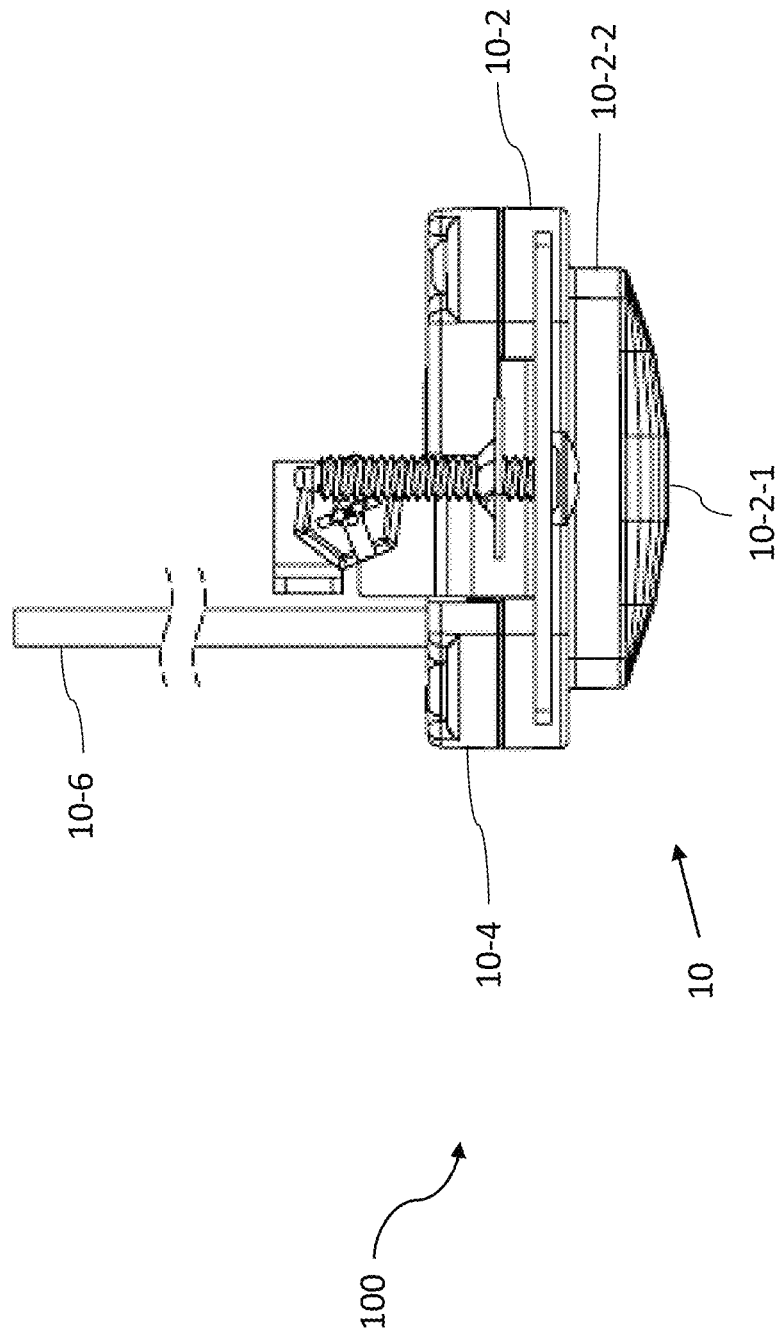
FIG. 1I is a bottom view of the computer system networking device assembly of FIG. 1A.
Figure 1J:
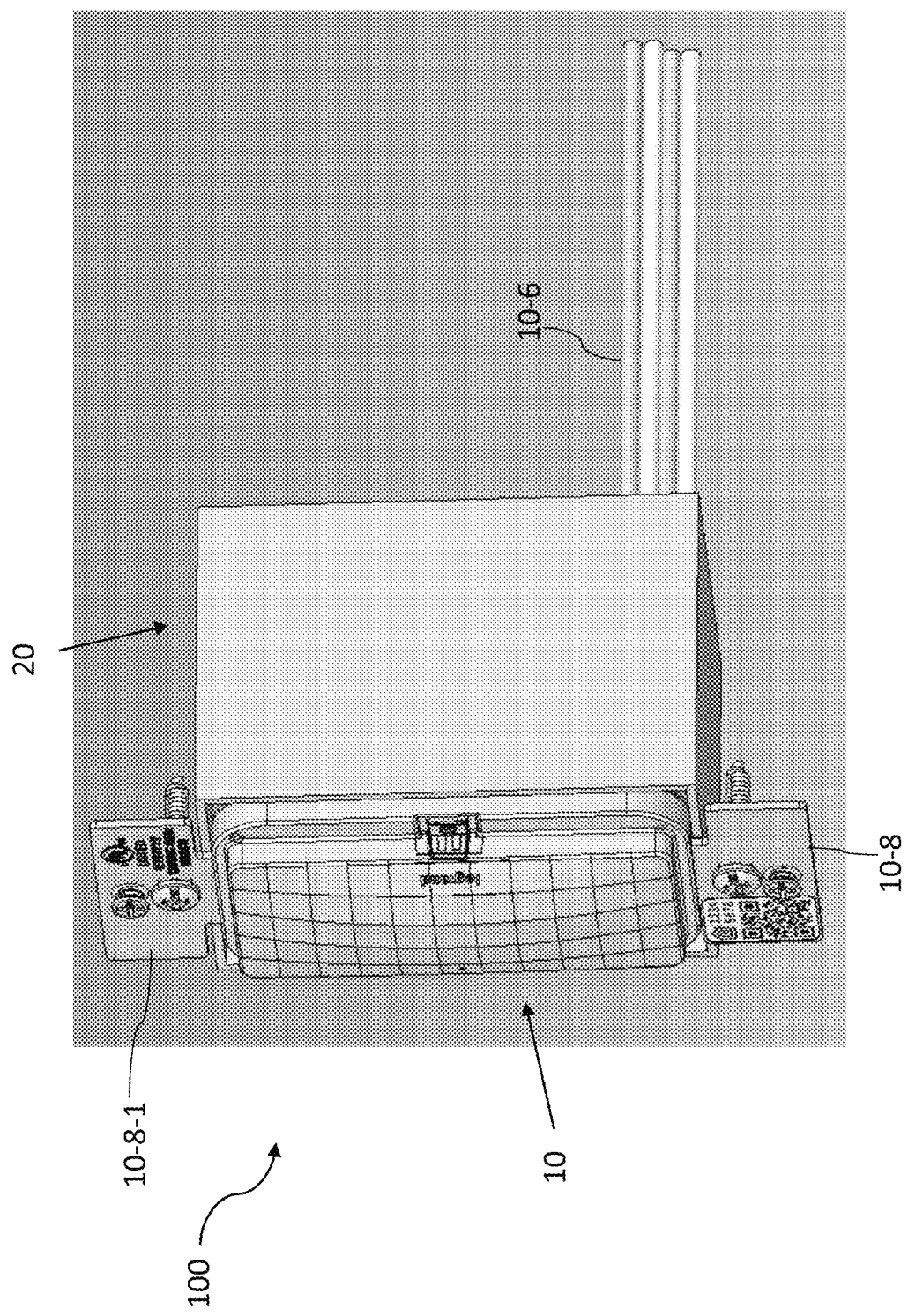
FIG. 1J is a side, isometric view of the computer system networking device assembly of FIG. 1A assembled and attached to a wall box.
Figure 1K:
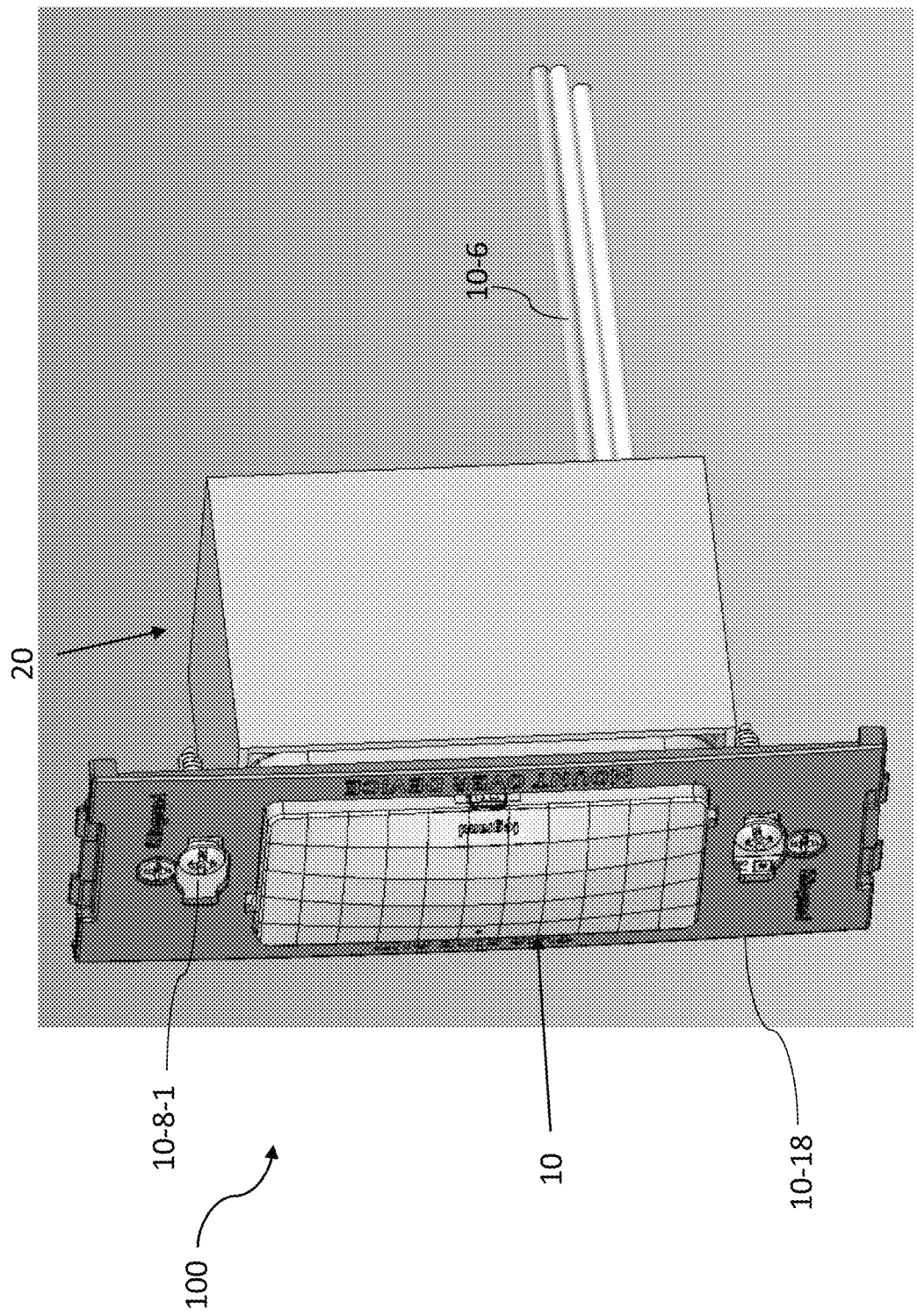
FIG. 1K is a side, isometric view of the computer system networking device assembly of FIG. 1J with an attached subplate.
Figure 1L:
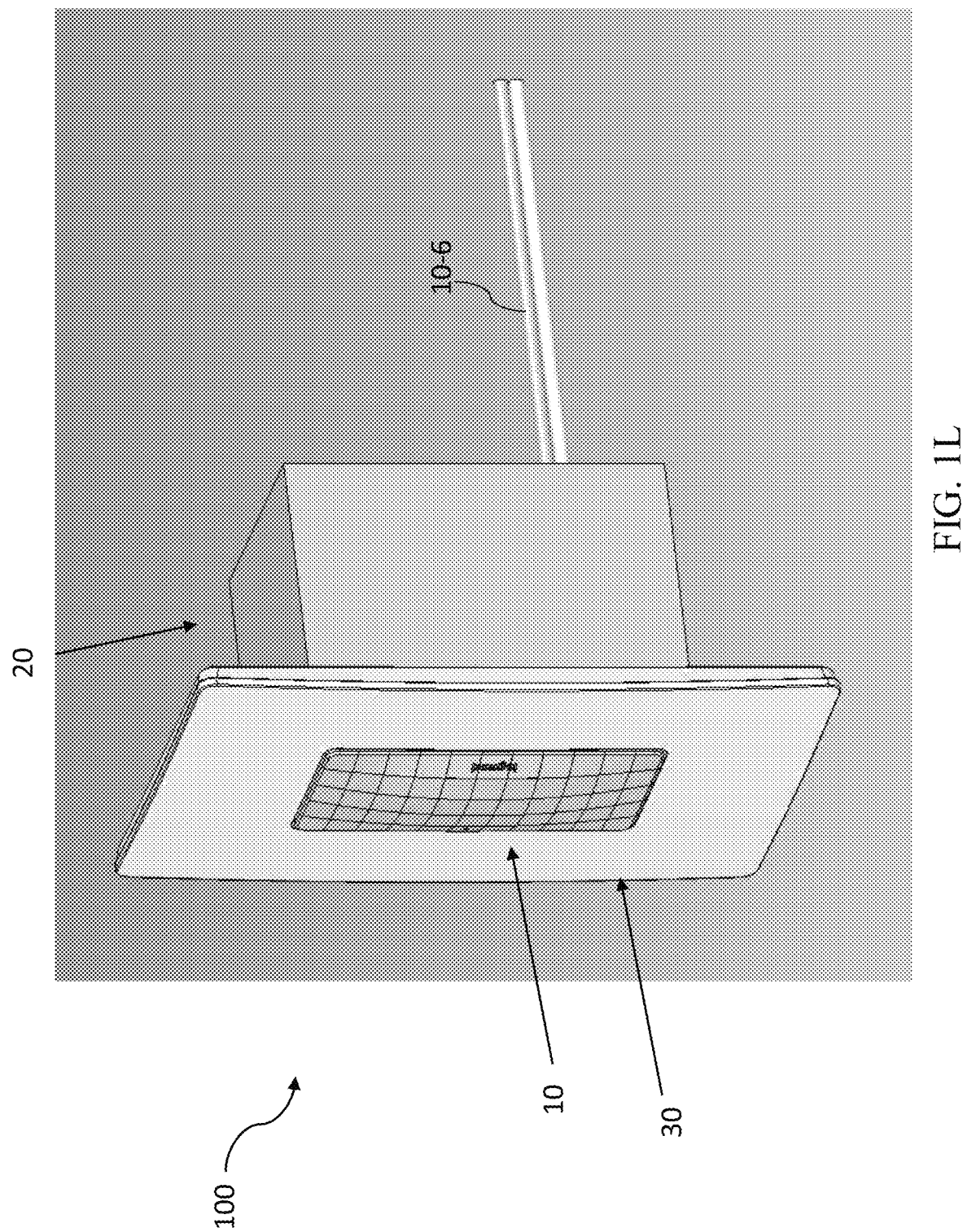
FIG. 1L is a side, isometric view of the computer system networking device assembly of FIG. 1K with an attached wall plate.

In accordance with an embodiment of the present invention, a computer system networking device assembly 100 is illustrated in FIGS. 1A-L and can include a computer system networking device 10 configured to be and positioned in a single gang wall box 20 (see FIGS. 1J-L). Alternatively, the computer system networking device 10 can be positioned in a multi-gang wall box with various electrical wiring devices (which can be the same or different, e.g., switches, receptacles or just receptacles), not shown (as should be understood by a person of ordinary skill in the art in conjunction with a review of this disclosure). The non-limiting example of the computer system networking device 10 shown in the figures is a gateway hub device.

As embodied herein, and depicted in FIGS. 1A and 1B, a front isometric view and a front view, respectively, of a computer system networking device assembly 100 in accordance with an embodiment of the invention are disclosed. The computer system networking device assembly 100 includes a computer system networking device 10. As noted above, the example computer system networking device 10 in FIGS. 1A-1L is a gateway hub device. The gateway hub 10 includes an enclosure formed of a front plate 10-2 attached to a back plate 10-4. The front plate 10-2 can have a curved or dome-shaped surface 10-2-1 (but does not have be, and can be substantially or fully planar), which can be formed of a plurality of square or other polygonal shaped units 10-2-3 connected together (alternatively, the units could be circular or elliptical in shape; the front plate can be partially covered by particularly shaped unites, or no shaped units need be present). Each unit can be planar and can extend or exist in a plane separate from at least one other unit, and in some embodiments, all other units. Alternatively, at least one of the units can extend or exist in a plane that is substantially similar or the same as at least one other unit.

In the depicted embodiment, the curved surface 10-2-1 is connected to and raised (or positioned at a distance) from a base or foundation 10-2-4 of the front plate 10-2 such that the curved surface 10-2-1 has one or more facets or sides 10-2-2 (see, e.g., FIG. 1E). In FIG. 1A, the curved surface 10-2-1 is rectangular with rounded corners and has four facets/sides 10-2-2 (connected in a rectangular shape) connecting the curved surface 10-2-1 to the front plate 10-2. The back plate 10-4 of the gateway hub 10 has one or more AC power lines/wires 10-6 extending therefrom. The one or more wires 10-6 are shown extending from the back plate 10-2 in the rear isometric and rear views of FIGS. 1C and 1D, respectively. The AC power wires 10-6 are configured to receive power from a mains power source (source of AC power) on one end, and extend through an aperture(s) 10-6-1 in the back plate 10-4 (fed into the enclosure formed by front plate 10-2 and back plate 10-4) and connect to and provide power to a power supply circuit 10-12 at the other end (see FIG. 1E).

Referring to FIG. 1E, an exploded view of the computer system networking device assembly 100 depicted in FIG. 1A is disclosed. As shown, the front plate 10-2 and the back plate 10-4 form an enclosure to house and/or attach to a number of elements. The enclosure is can have apertures or other openings, or can be completely sealed. The mounting strap 10-8 is positioned within and between the front plate 10-2 and the back plate 10-4. Mounting strap 10-8 has a mounting portions 10-8-1 (e.g., mounting hinge(s)) for attaching the computer system networking device assembly 100 to a wall structure (not shown), wall mounting surface (not shown), and/or a wall plate 10-18 (FIG. 1K) through the use of screws, adhesive or other securing or mounting means (as should be understood by a person of ordinary skill in the art in conjunction with a review of this disclosure).

Still referring to FIG. 1E, a gateway control assembly including a gateway module 10-10 (with a microchip, transmitter and receiver antennas, and other related components positioned on and/or otherwise connected to a gateway circuit board, as should be understood by a person of skill in the art in conjunction with a review of this disclosure) and a power supply circuit 10-12 (with power supply components positioned on a power circuit board, and with functionality described herein) is shown positioned within the enclosure formed between the front plate 10-2 and the back plate 10-4. The power supply circuit 10-12 can be configured to convert the received AC mains voltage and/or current into respective values suitable for operation of the gateway module 10-10.

Turning to FIG. 1E-2, gateway control assembly is shown formed, and positioned within a seat (which can include a separate frame 10-20, see FIG. 2B, but does not need to) formed within the back body 10-4 (which can include a generally closed back surface with the aperture 10-6-1 for AC wires 10-6, or a generally open back portion) and over mounting strap 10-8. Gateway module 10-10 and power supply circuit 10-12 circuit boards are electrically and mechanically connected via a pair of electrical connectors 10-13 to form the gateway control assembly (as should be understood by a person of skill in the art in conjunction with a review of this disclosure). These circuit boards may be connected adjacent to one another so that they are positioned and extend in the same plane as shown in FIG. 1E-2 or can be stacked such that one is stacked above or in a different plane than the other. Alternatively, the gateway module 10-10 and power supply circuit 10-12 of this embodiment can be positioned on one single circuit board. The power supply circuit 10-12 is configured to supply power received from a mains power source (not shown) to the gateway module 10-10 through the pair of electrical connectors 10-13. As noted above, the mains power source is connected to the power supply circuit 10-12 through one or more wires 10-6, which extend from the mains power source through an aperture in the back plate 10-4 and are connected to the power supply circuit 10-12. The gateway control assembly can additionally include a light pipe 10-14 positioned between the front plate 10-2 and the back plate 10-4. The light pipe can act as an indicator when commissioning the gateway to the network. It can also flash to indicate an error in the network. It can be seen through front plate 10-2 at aperture 10-14-1 (see FIG. 1B).

Turning to FIG. 1E-3, a partial close up isometric view of the curved surface 10-2-1 is provided. In accordance with an embodiment, the distance from the surface of the center unit (which can be planar to the wall surface when properly installed) to the based edge of the curved surface can be about 0.125 inches (as shown). In accordance with an embodiment, the size of each unit can be 0.238 by 0.260 inches.

Turning to FIG. 1E-4, a front view of the computer system networking device assembly of FIG. 1A with the front plate and mounting strap removed is shown. In particular, the AC wires 10-6 are shown connecting to the power supply circuit 10-12 at connection points thereon.

In use, and as should be understood by a person of ordinary skill in the art in conjunction with a review of this disclosure, the gateway module 10-10 includes a gateway controller in a microchip being configured to provide communication between one or more internet-of-thing (IoT) devices and the cloud. More particularly, the gateway controller communicates with one or more remote servers over an internet connection, via wireless communication with a device that provides access to the internet, such as a router (e.g., over Wi-Fi, although other protocols are contemplated). The gateway controller is also configured to communicate with one or more IoT devices, such as smart electrical wiring devices (e.g., switches or outlets), over a wireless protocol such as ZigBee (although other protocols are contemplated). The gateway controller can relay commands and/or data between the one or more servers and the one or more IoT devices. In various examples, the IoT devices can function as a mesh network, communicating with each other relaying commands or data from the gateway to other IoT devices within the mesh network. Thus, if the gateway controller is to relay a command from a server to an IoT device, it might do so by relaying the command to a different IoT device, which transmits the command across the IoT mesh network to the end device (either directly or through one or more intervening IoT devices).

The gateway controller can be any suitable gateway controller as are known in the art. Because such gateway controllers are known and should be appreciated by those of skill in the art in conjunction with a review of this disclosure, further explanation will be omitted from this disclosure.

The gateway controller is configured to receive power from the power supply circuit 10-12. Power supply circuit 10-12 is configured to be connected to line and neutral of the mains supply through AC power wires 10-6 at connection points on the power supply circuit (as should be understood by a person of ordinary skill in the art in conjunction with a review of this disclosure), and is configured to condition the received voltage and current to meet the power requirements of the gateway controller. The power supply circuit 10-12 can be any suitable AC/DC power supply circuit, as are known in the art. For example, the power supply circuit 10-12 can be a switched-mode power supply circuit, which can convert the incoming AC mains signal to the suitable DC signal with high efficiency (stepped down power, e.g., receiving 120V from the mains power supply, and providing 3.3V power to the gateway module 10-10). The precise power requirements (i.e., the power supply circuit output voltage and current) will vary depending on the gateway controller used; however, a person of ordinary skill in the art, in conjunction with a review of this disclosure, will understand how to select or design a power supply circuit to meet the power requirements of the gateway controller employed.

As should be understood by those of ordinary skill in the art in conjunction with a review of this disclosure, the hub module 10-10 can be replaced by a particular router module with an associated communication and control structural configuration and related functionalities, and power requirements.

Referring to FIGS. 1F and 1G, first and second side views of the computer system networking device assembly 100 of FIG. 1A is disclosed. As noted, the AC power wires 10-6 extending from the back plate 10-4 have a direct connection from the power supply circuit 10-12 (FIG. 1E) to the mains power source (not shown). The direct extension of the wires 10-6 from the back plate 10-4 of the gateway hub device 10 is also shown in the top and bottom views of FIGS. 1H and 1I, respectively.

Referring to FIG. 1J, a side, isometric view of the computer system networking device assembly 100 of FIG. 1A is disclosed. The gateway hub device 10 is shown partially positioned within and attached/mounted to a wall box 20 (in a similar manner to the mounting of an electrical wiring device to a wall box, as should be understood by a person of ordinary skill in the art). The specific portion shown positioned in the wall box 20 is the back body 10-4 and a portion of the base or foundation 10-2-4 of the front plate 10-2, and the mounting strap 10-8 (which is configured to assist with securing the gateway hub device 10 to the wall or other structure and to the wall box) extends lengthwise beyond the top end and bottom end of the wall box opening and can prevent the remainder of the gateway hub device 10 from sliding into the wall box 20. In this embodiment, the computer system networking device assembly 100 is preferably used for a new build. In FIG. 1J, the wall box 20 is a single gang outlet box. A subplate 10-18 (formed of metal or plastic) is connected to the mounting strap 10-8 of the gateway hub device 10 via the mounting portion 10-8-1, as disclosed in FIG. 1K. FIG. 1L shows a side, isometric view of the computer system networking device assembly 100 where a wall plate 30 is attached to the subplate 10-18. In use, the wall box 20 extends into the wall structure of a building and the wire(s) 10-6 of the gateway hub device 10 extend away from the wall box 20 and are connected directly to a mains supply (not shown). Screws or another attachment device/means connects the gateway hub device 10 to a wall structure (not shown) or wall mounting surface (not shown), and the wall plate 30 connects to and over the subplate 10-18 to improve the aesthetics of the computer system networking device assembly 100 where only the curved surface 10-2-1 of the gateway hub device 10 is shown.

In accordance with another embodiment of the present invention, a computer system networking device assembly 100 is illustrated in FIGS. 2A-E and can include one or more electrical wiring devices 10-1-2 positioned in a wall box (as shown, one electrical wiring device 10-1-2 positioned in a single gang wall box 20, but can include multiple of the same and/or different electrical wiring devices positioned in a multi-gang wall box), and a computer system networking device 10-1-1 connected to the electrical wiring device 10-1-2 via a subplate 10-18 and/or wall plate 30. In this embodiment, the computer system networking device assembly 100 is preferably used as a retrofit configuration. Indeed, as shown in and described with respect to the following FIGS. 2A-E, the subplate 10-18 and/or wall plate 30 is structured and configured to connect the computer system networking device 10-1-1 to one or more electrical wiring devices 10-1-2 already existing in a building structure (where the computer system networking device 10-1-1 is positioned over the wall adjacent to an electrical wiring device 10-1-2 that is itself positioned in a wall box 20). The non-limiting example of the computer system networking device 10 shown in the figures is a gateway hub device 10-1-1.

Figure 2A:
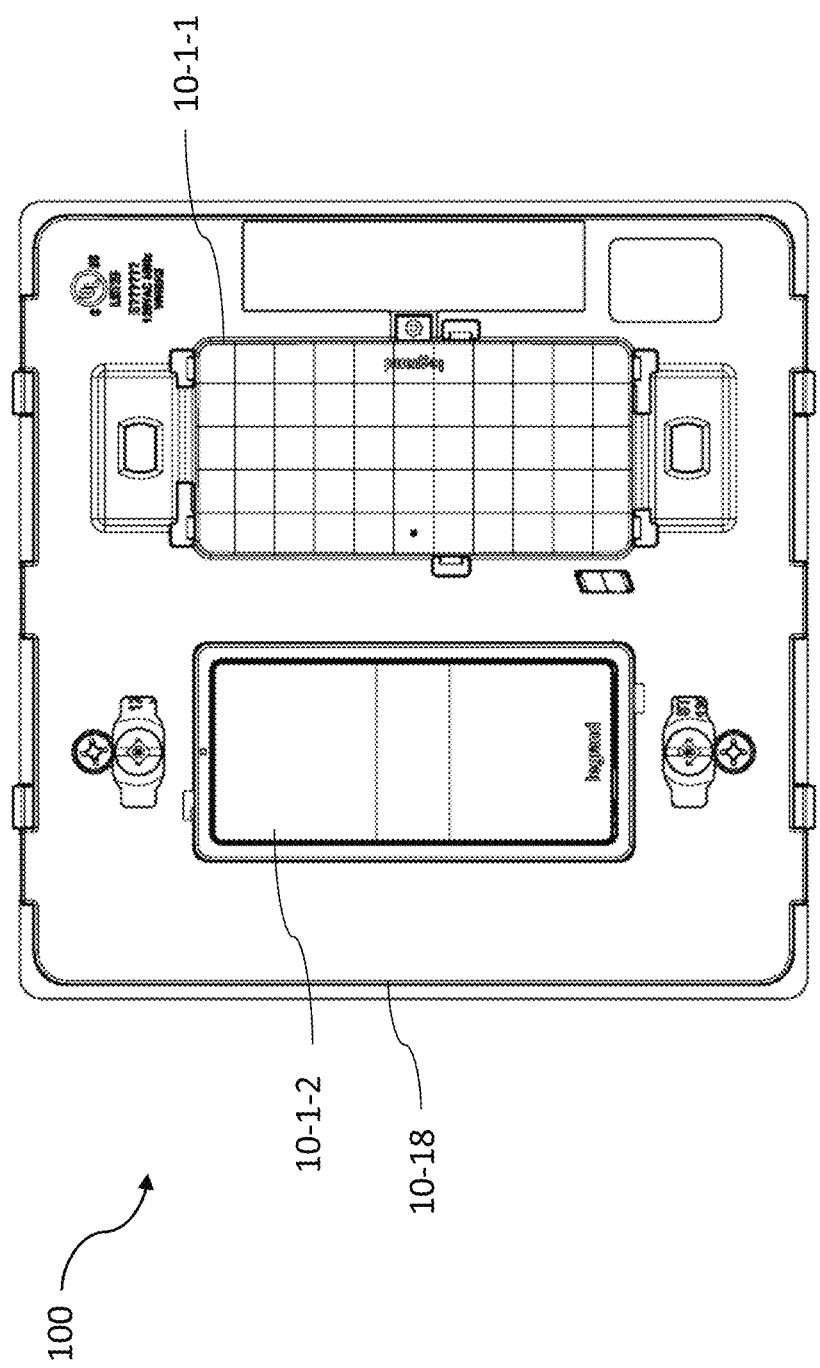
FIG. 2A is a front view of a computer system networking device assembly in accordance with another embodiment of the invention.

Referring to FIG. 2A, a front view of a computer system networking device assembly 100 in accordance with an embodiment of the invention is disclosed. The computer system networking device assembly 100 includes a subplate 10-18 an electrical wiring device 10-1-2 and a gateway hub device 10-1-1. In the embodiment shown in FIG. 2A, the example electrical wiring device 10-1-2 is a rectangular/decorator switch.

Figure 2B:
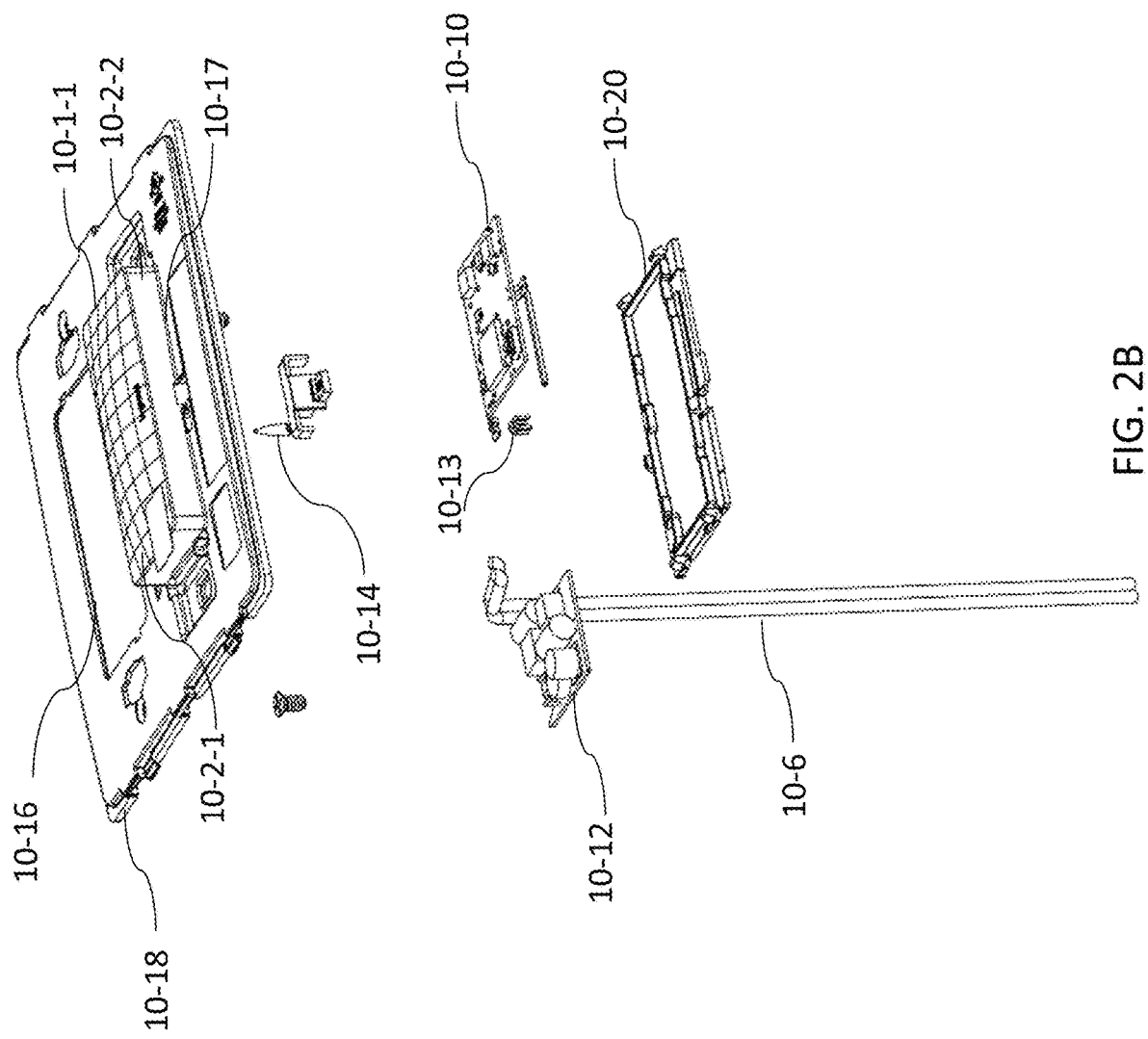
FIG. 2B is an exploded view of the computer system networking device assembly of FIG. 2A.
Figures 2, 2B:
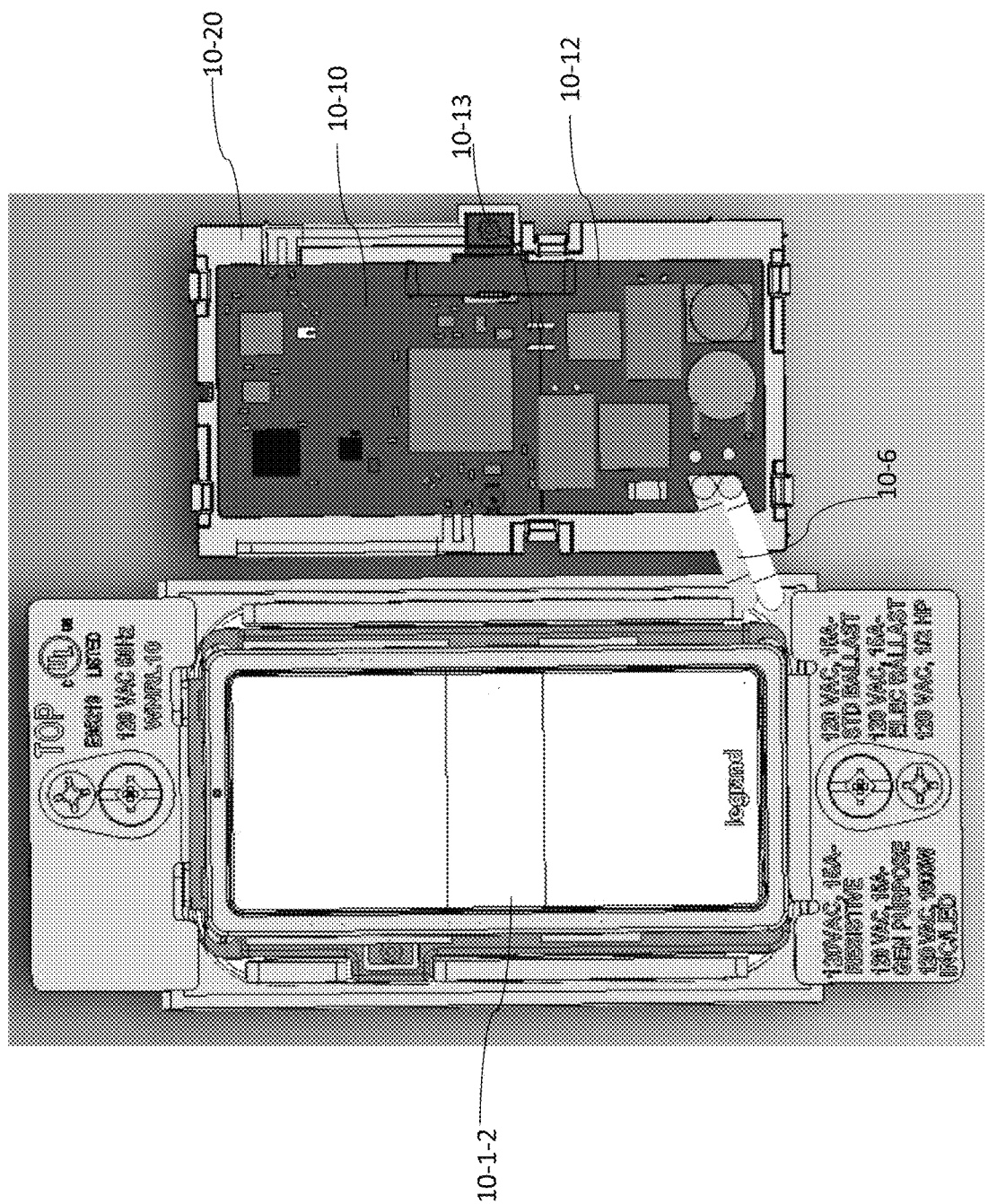

Referring to FIG. 2B, an exploded view of the computer system networking device assembly 100 depicted in FIG. 2A is disclosed. The subplate 10-18 comprises a first opening 10-16 sized and configured to accommodate the electrical wiring device 10-1-2. The electrical wiring device 10-1-2 can be any of the electrical wiring devices, and smart versions thereof, listed above. The gateway hub 10-1-1 is positioned through a second opening 10-17 in the subplate 10-18, which is sized and configured to accommodate the gateway hub 10-1-1. Alternatively, the gateway hub 10-1-1 can be a unitary part of the subplate 10-18. The gateway hub 10-1-1 itself includes many of the same elements as discussed above with respect to the gateway hub device 10, described with respect to FIGS. 1A-L above, which will not be fully repeated here.

Still referring to FIG. 2B, the gateway hub 10-1-1 includes a back body or frame 10-20 (which can be similar to back body 10-4 with a substantially closed back surface with an aperture for the AC wires or can have a substantially open back section, but preferably is shorter in dimension so that the gateway hub 10-1-1 does not stick out unnecessarily far from the wall as it is not positioned in a wall box like the first described embodiment above). As shown in FIGS. 2B-2-E, one or more wires 10-6 extend from the power supply circuit 10-12 of the gateway hub 10-1-1 towards the electrical wiring device, and down into the wall box 20 to connect directly to a mains power source (not shown). Stated differently, while not positioned within a wall box 20, the gateway hub 10-1-1 is configured to take advantage of some limited space in the wall box 20 to connect the gateway hub 10-1-1 to the mains power source. Embodiments of the invention allow for this improvement without the gateway hub 10-1-1 being positioned in a wall box or requiring a worker to make any additional holes in an existing wall structure in order to accommodate the gateway hub device's 10-1-1 power connection and/or the gateway hub device 10-1-1 itself.

Figure 2C:
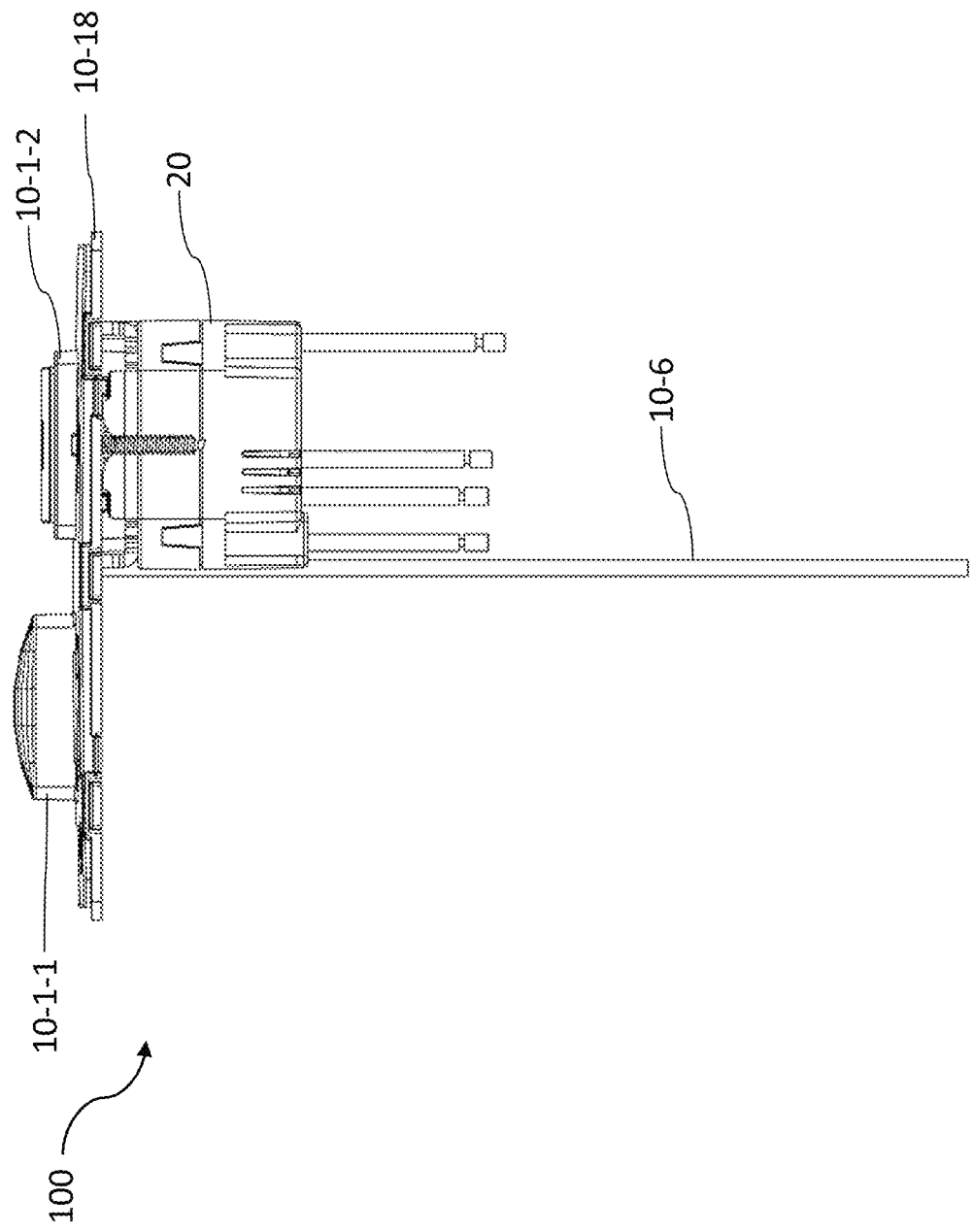
FIG. 2C is a bottom view of the computer system networking device assembly of FIG. 2A.
Figure 2D:
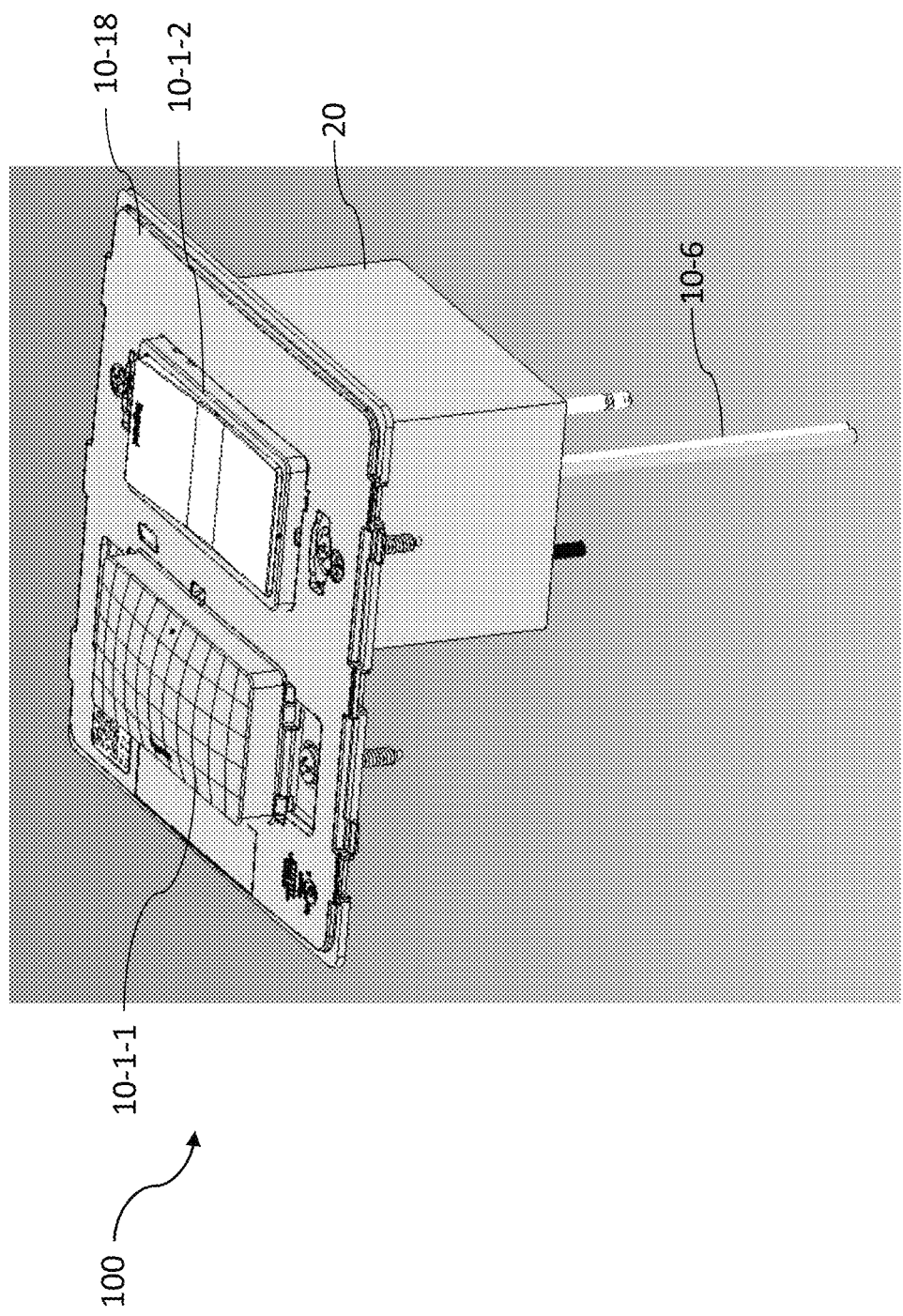
FIG. 2D is a top, isometric view of the computer system networking device assembly of FIG. 2A assembled and attached to a wall box.
Figures 2, 2D, 3:
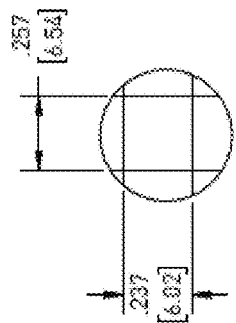
Figures 2, 2D:
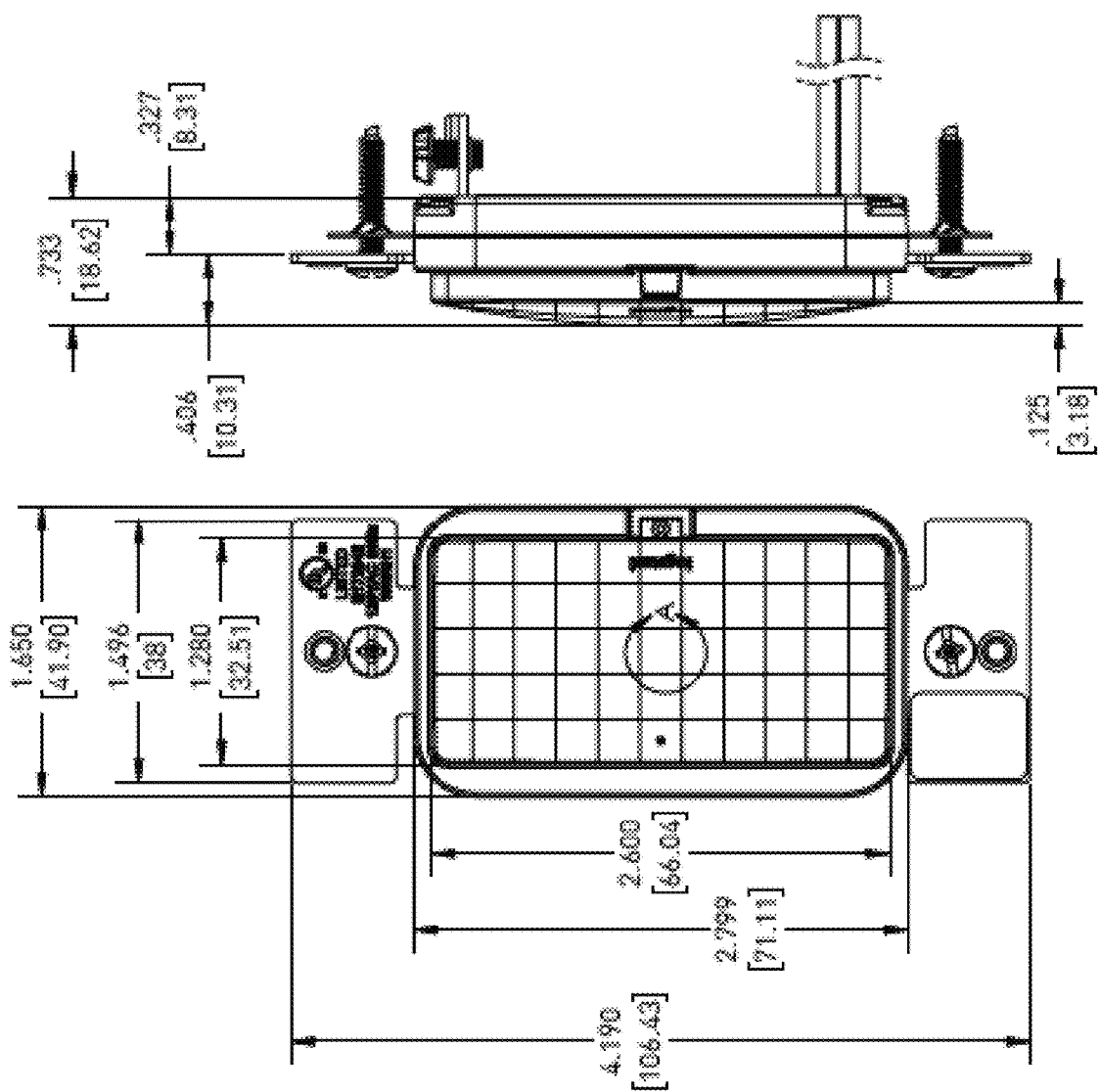
Figures 2, 2D, 3, 4:
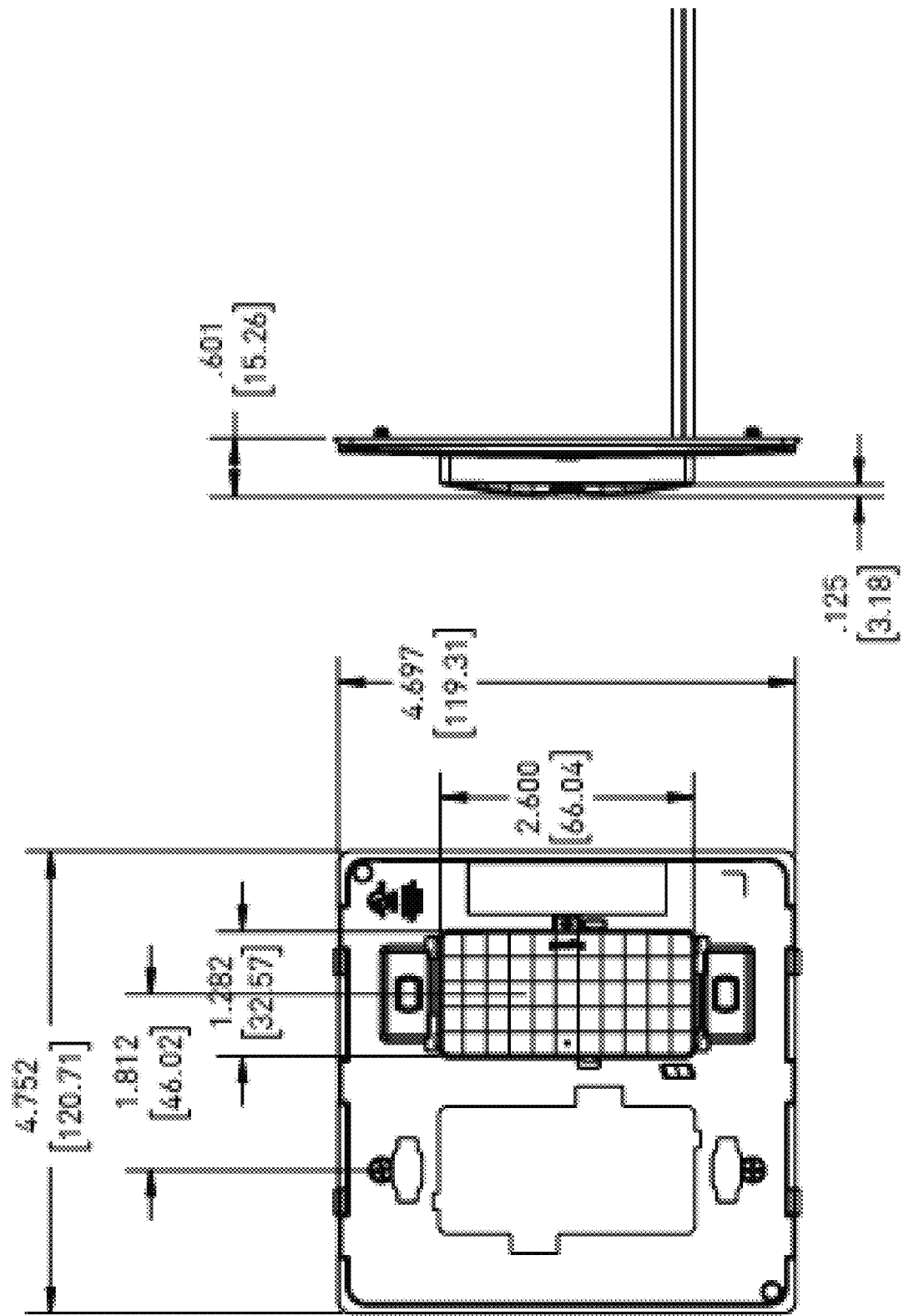

Referring to FIGS. 2C and 2D, a side view and a top, isometric view, respectively, of the computer system networking device assembly 100 depicted in FIG. 2A are disclosed. The electrical wiring device 10-1-2 extends into a device box 20. In this embodiment, the computer system networking device assembly 100 is a retrofit build, i.e., retrofitting the connection of the gateway hub device 10-1-1 with an existing, electrical wiring device 10-1-2. While the wall box 20 in FIGS. 2C and 2D is a single gang outlet box, the wall box 20 can be extended widthwise to accommodate additional electrical wiring devices (as noted above). In FIGS. 2C and 2D, the gateway hub device 10-1-1 extends over a wall structure (not shown), or to a wall mounting surface (not shown), i.e., overhangs the wall, and is anchored by the second electrical wiring device 10-1-2. Alternatively, the gateway hub device 10-1-1 can be secured to the wall structure or wall mounting surface by a screw or other securing device such as an adhesive (as described above with respect to the first embodiment). It can be beneficial to have the gateway hub 10-1-1 near or adjacent to an electrical wiring device 10-1-2 that is an electrical receptacle with a router plugged therein (as should be understood by a person of ordinary skill in the art in conjunction with a review of this disclosure). FIGS. 2B-2 and 2C show how the AC wires 10-6 extend from connection points on the power supply circuit 10-12 of the gateway hub device 10 and into the wall box next to it as opposed to a wall box directly under the gateway hub device 10.

Turning to FIGS. 2D-2 and 2D-3, particular dimensional measurements are provided of the gateway module 10 in accordance with a particular embodiment. FIG. 2D-3 provides measurements of detail "A" of FIG. 2D-2.

Turning to FIG. 2D-4, particular dimensional measurements are provided of the gateway module 10 positioned within subplate 218 in accordance with a particular embodiment.

Figure 2E:
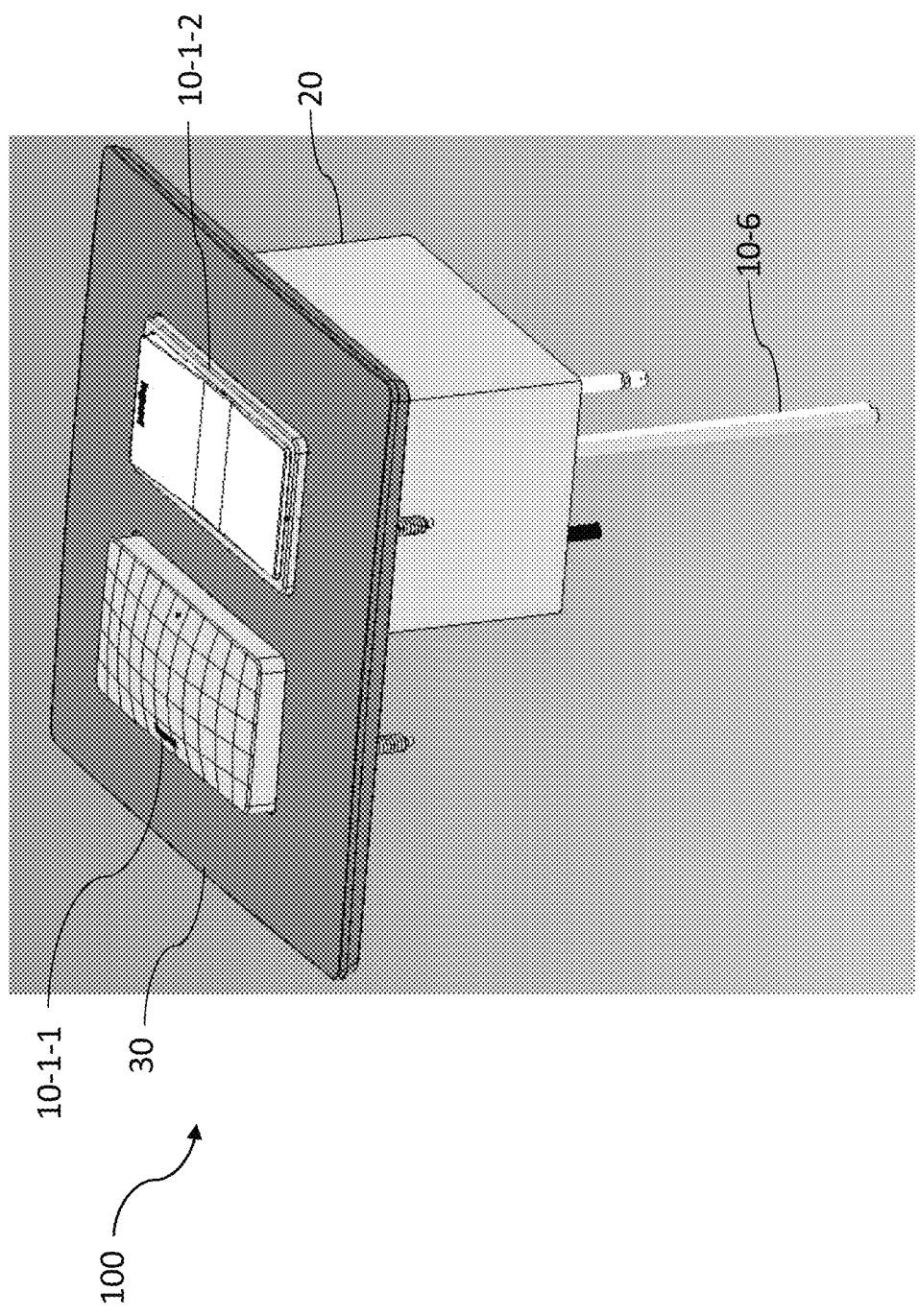
FIG. 2E is a top, isometric view of the computer system networking device assembly of FIG. 2D with an attached wall plate.

Referring to FIG. 2E, another top, isometric view of the computer system networking device assembly 100 of FIG. 2A is disclosed. In FIG. 2E, a fully assembled computer system networking device assembly 100 includes a wall plate 30 attached to the subplate 10-18, to improve the aesthetics of the computer system networking device assembly 100 where only the face or front surface of each of the gateway hub device 10-1-1 and the electrical wiring device 10-1-2 are exposed.

Turning to FIGS. 3A-5C, additional alternative embodiments of the computer system networking device assembly 100 are shown and described. Many of the same previously described elements of the assembly 100 exist in these alternative embodiments and will not be repeated hereinbelow.

Figure 3A:
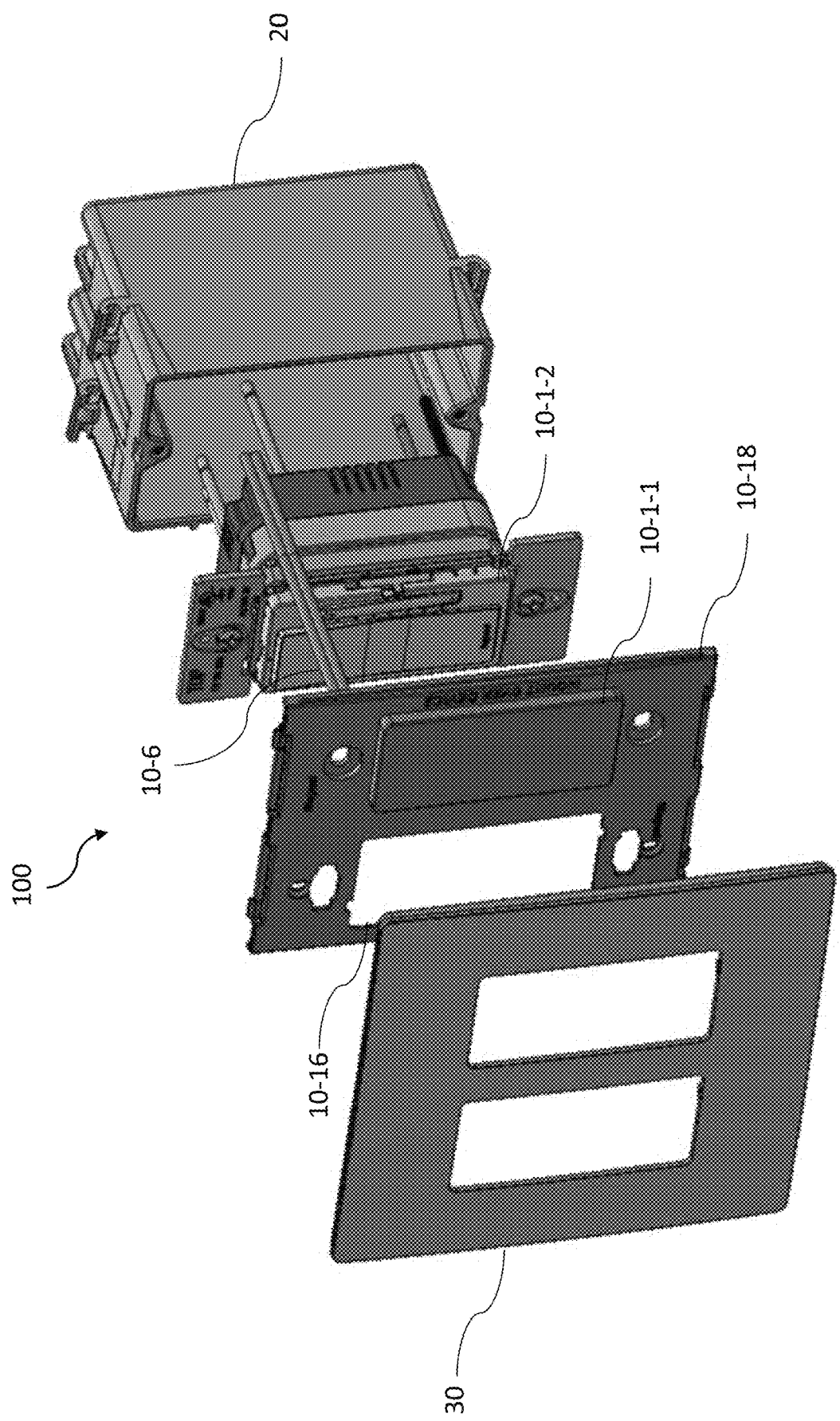
FIG. 3A is an exploded and front, isometric view of a computer system networking device assembly in accordance with an alternative embodiment of the invention.
Figure 3B:
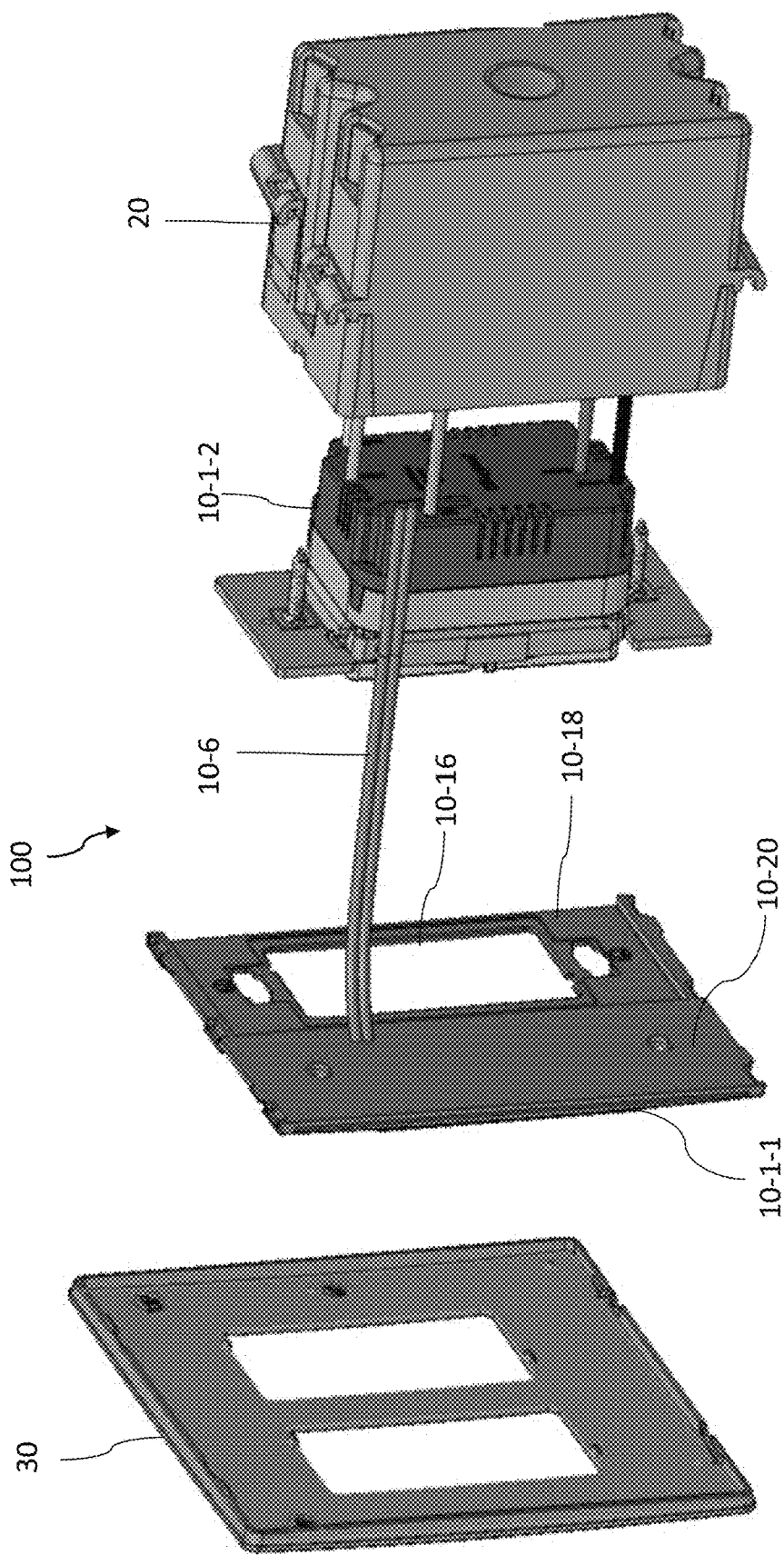
FIG. 3B is an exploded and back, isometric view of the computer system networking device assembly of FIG. 3A.

Referring to FIG. 3A, an exploded and front, isometric view of the computer system networking device assembly 100 in accordance with an alternative embodiment of the invention is disclosed. The computer system networking device assembly 100 includes a wall plate 30, a subplate 10-18, a gateway hub device 10-1-1 (which can be unitary part of the subplate, but is not required to be), an electrical wiring device 10-1-2, and a device box 20. The subplate 10-18 includes the gateway hub device 10-1-1 positioned therein (and is actually a part thereof) and a rectangular opening 10-16 for the electrical wiring device 10-1-2. The rectangular opening 10-16 can accommodate any type of similarly shaped electrical wiring device 10-1-2. FIG. 3B discloses an exploded and back, isometric view of the computer system networking device assembly 100 of FIG. 3A.

Figure 3C:
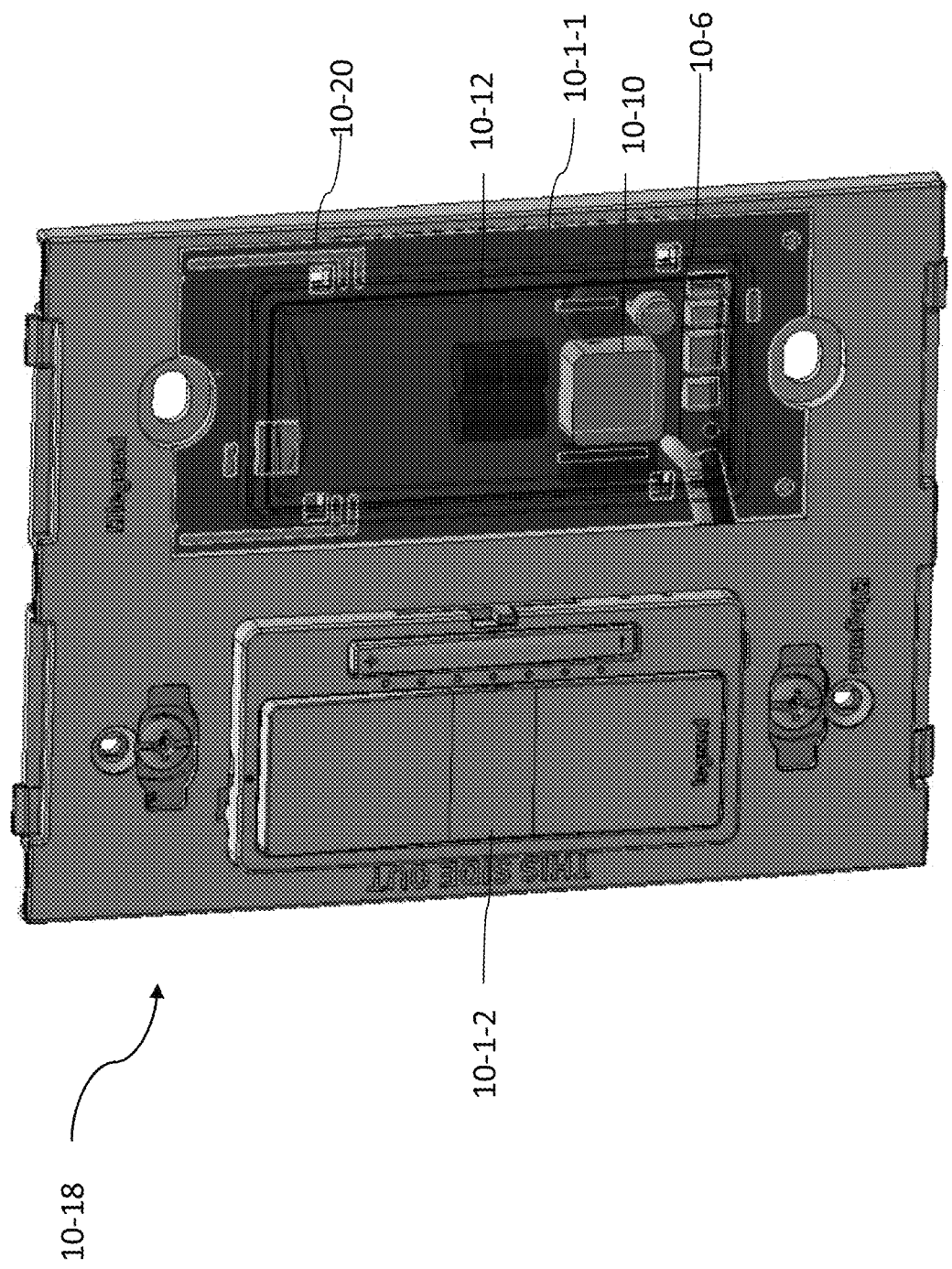
FIG. 3C is a partial cross-sectional, front view of the computer system networking device assembly of FIG. 3A with the wall plate removed.
Figure 3D:
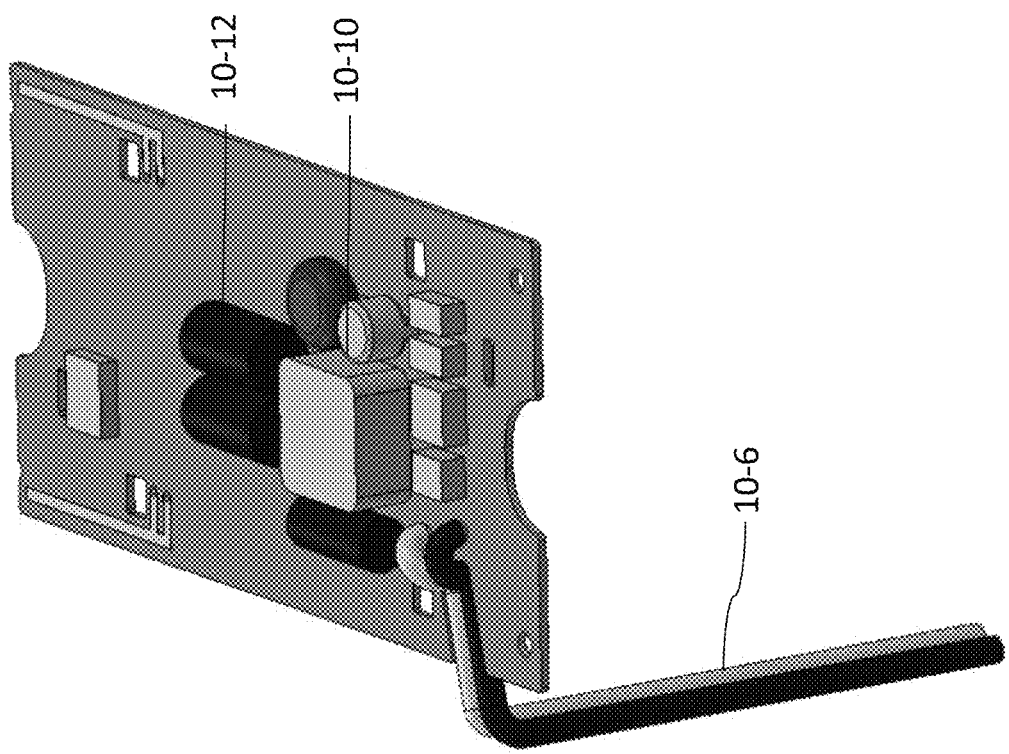
FIG. 3D is a top, isometric view of the circuit board and electronics of computer system networking device assembly of FIG. 3A.

Referring to FIG. 3C, a partial cross-sectional, front view of the computer system networking device assembly 100 depicted in FIG. 3A is disclosed. The frame 10-20 is shown attached to the subplate 10-18 with the gateway control assembly fit within a seat area formed therein. In FIG. 3D, a top, isometric view of the circuit board and electronics of the computer system networking device assembly 100 of FIG. 3A is disclosed. As shown more clearly in FIG. 3D, the gateway module 10-10 and power supply circuit 10-12 of this embodiment are positioned on one circuit board. However, as noted above, the gateway chip 10-10 may be separate and connected adjacent in the same plane to the power supply 10-12 or the gateway module 10-10 and the power supply circuit 10-12 can be stacked such that one is stacked above the other in different planes.

Figure 4A:
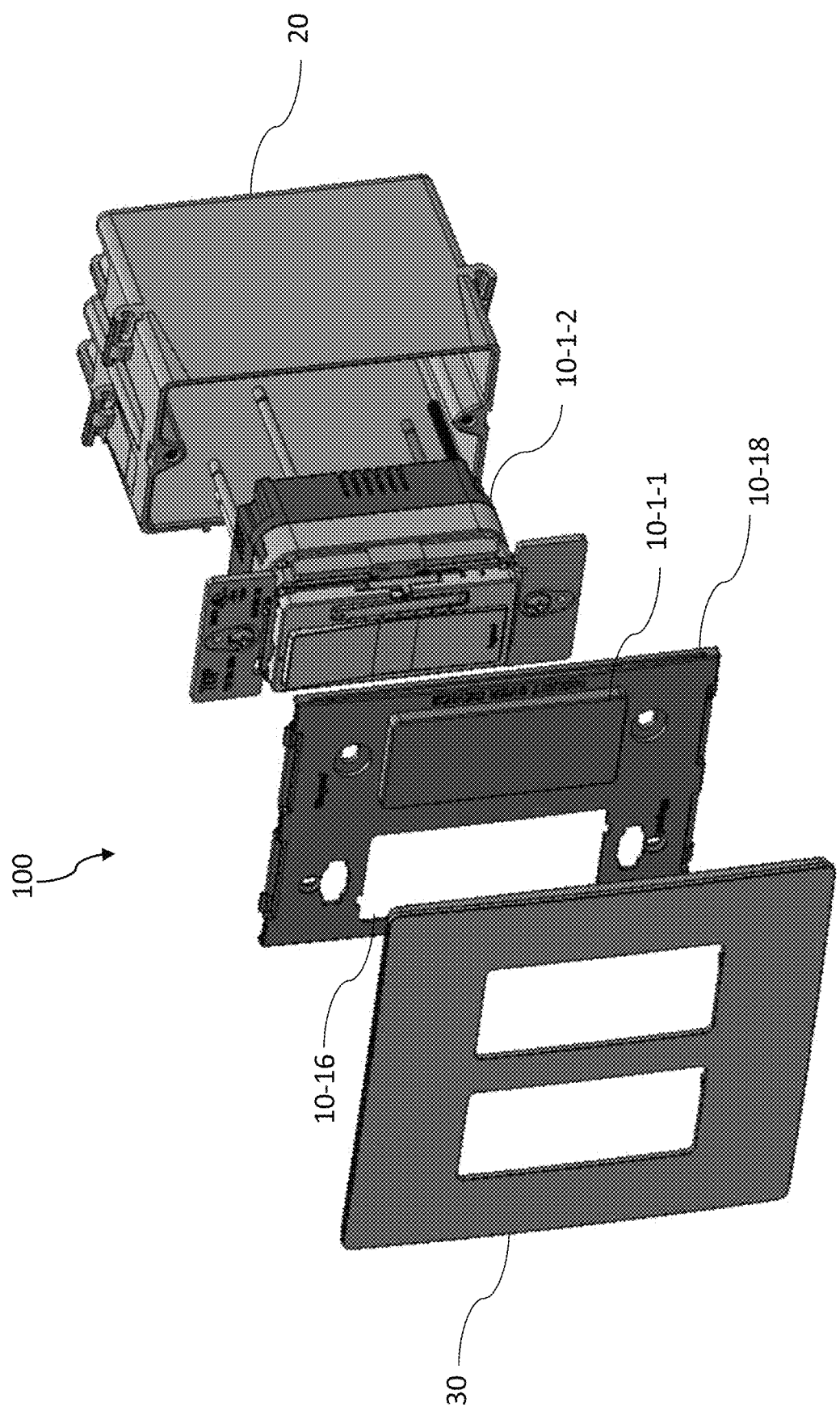
FIG. 4A is an exploded and front, isometric view of a computer system networking device assembly in accordance with an alternative embodiment of the invention.
Figure 4B:
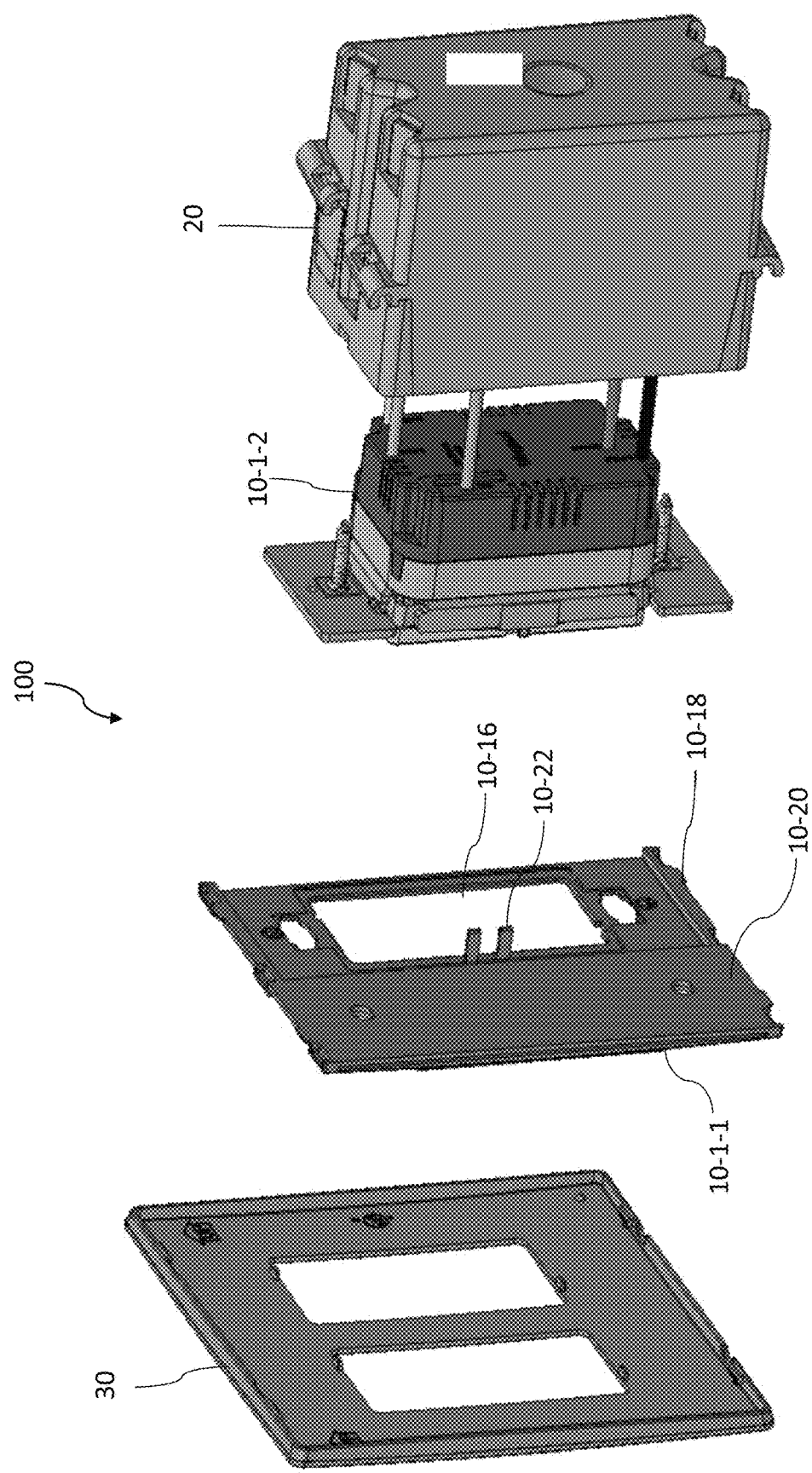
FIG. 4B is an exploded and back, isometric view of the computer system networking device assembly of FIG. 4A.

Referring to FIGS. 4A-B, exploded front and back, isometric views of the computer system networking device assembly 100 in accordance with an alternative embodiment of the invention is disclosed. The computer system networking device assembly 100 of these figures is similar to the assembly described and shown with respect to FIGS. 3A-C. However, the frame or back plate 10-20 includes one or more terminal inputs 10-22 extending therefrom instead of separate AC wires 10-6. The terminal inputs 10-22 plug into a one or more terminals of the electrical wiring device 10-1-2 (not shown). The terminals are configured to provide power to the circuit board in subplate 10-18 via the terminal inputs 10-22 in a similar stepped down manner as described above with respect to the first described embodiment (as should be understood by a person of ordinary skill in the art in conjunction with a review of this disclosure).

Figure 5A:
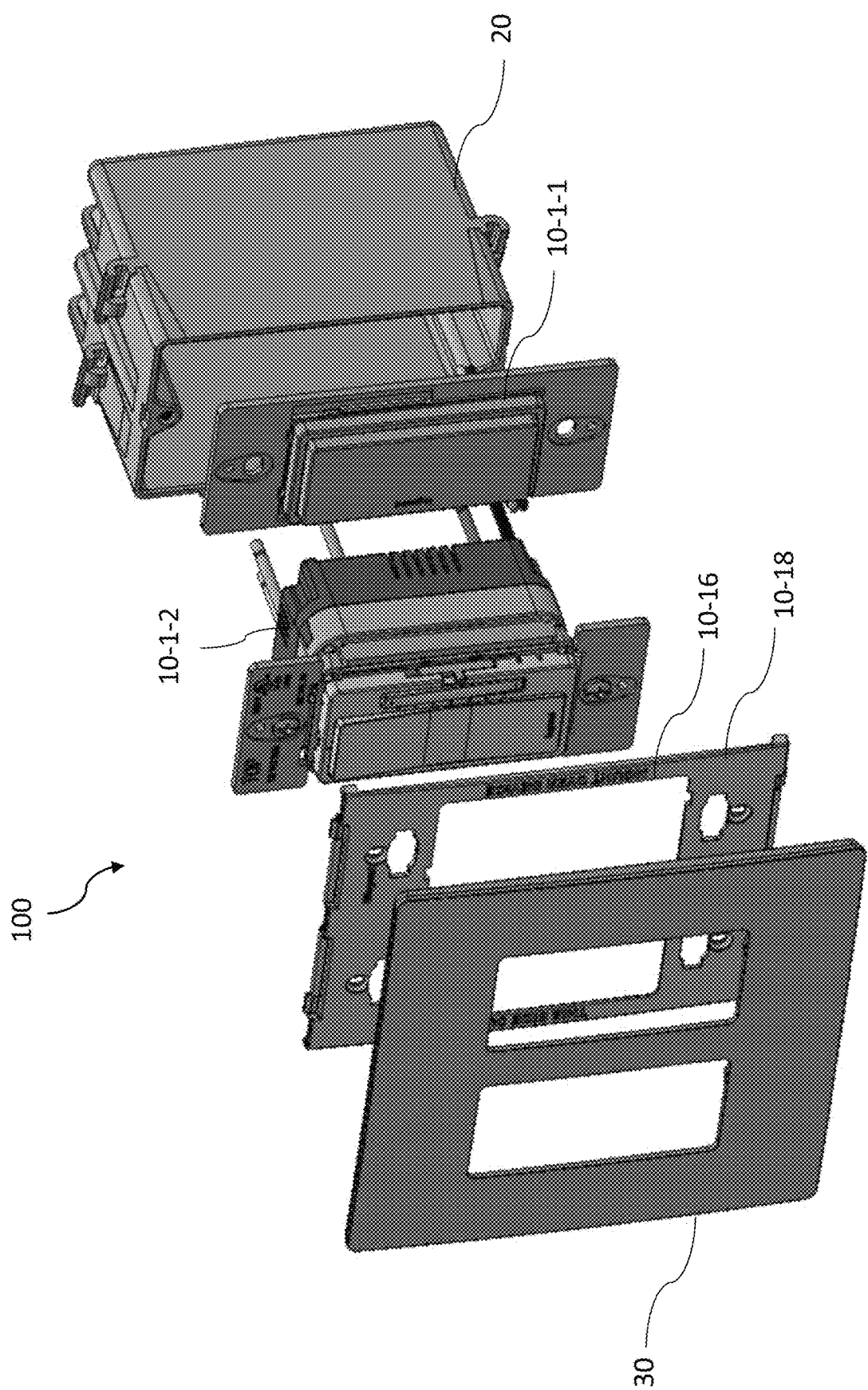
FIG. 5A is an exploded and front, isometric view of a computer system networking device assembly in accordance with an alternative embodiment of the invention.
Figure 5B:
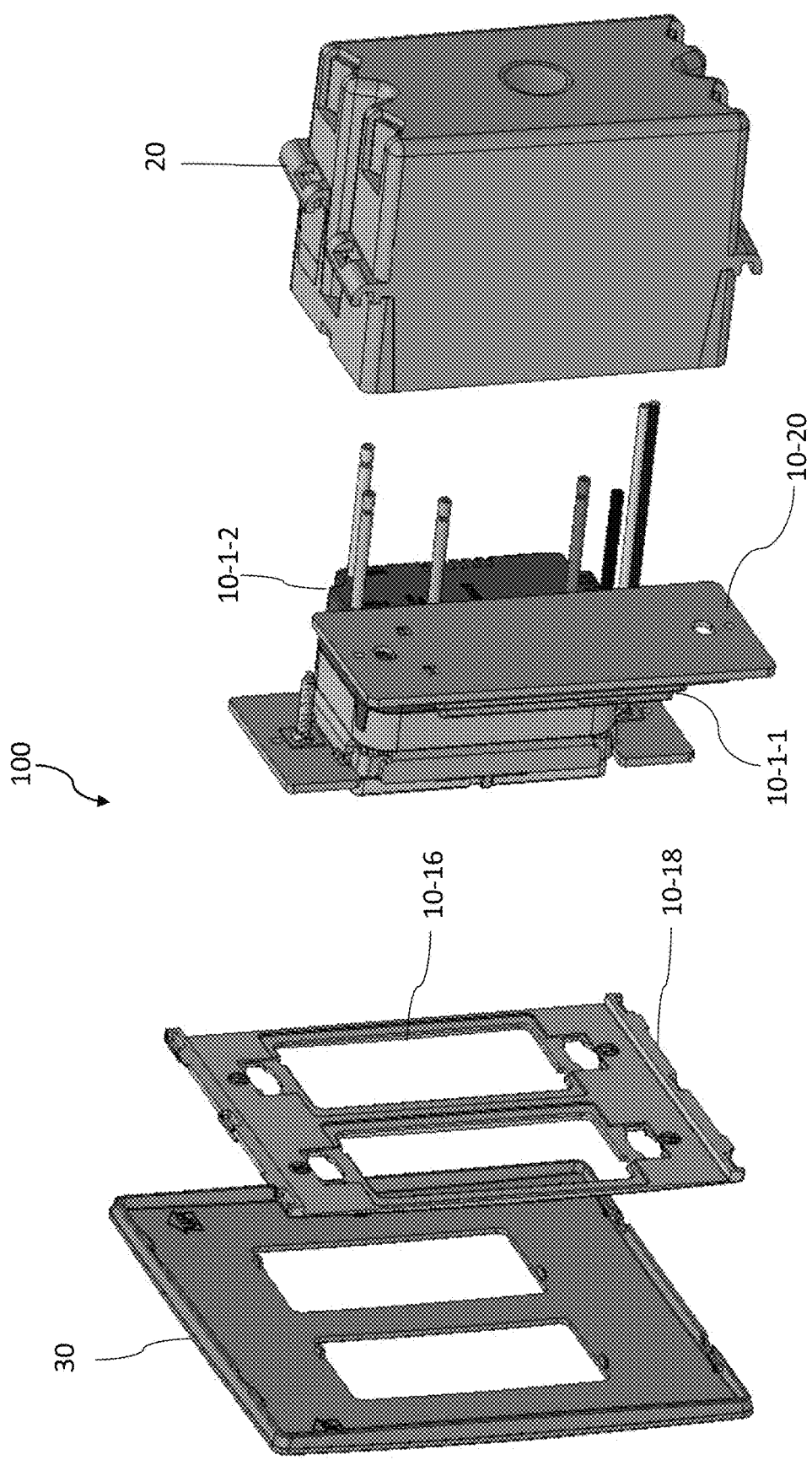
FIG. 5B is an exploded and back, isometric view of the computer system networking device assembly of FIG. 5A.

Referring to FIG. 5A-B, an exploded front and back, isometric view of the computer system networking device assembly 100 in accordance with an alternative embodiment of the invention is disclosed. The computer system networking device assembly 100 of these figures is similar to the assembly described and shown with respect to FIGS. 3A-C. However, the subplate 10-18 includes a pair of rectangular electrical receptacles 10-16, one for the gateway hub 10-1-1 and one for the electrical wiring device 10-1-2. The gateway hub 10-1-1 is an individual device that is mounted on the subplate 10-18 (and not part of a unitary piece with subplate 10-18, as it is with embodiments illustrated with respect to FIGS. 3A-C and 4A-B) next to an existing, electrical wiring device 10-1-2. A back plate 10-20 is connected to the wall plate 10-18 beneath the gateway hub 10-1-1. As with all other retrofit assemblies 100, the gateway hub 10-1-1 can be screwed directly to the wall structure or wall mounting surface or adhered to the wall structure or wall mounting surface using two-sided tape or another suitable adhesive.

Figure 5C:
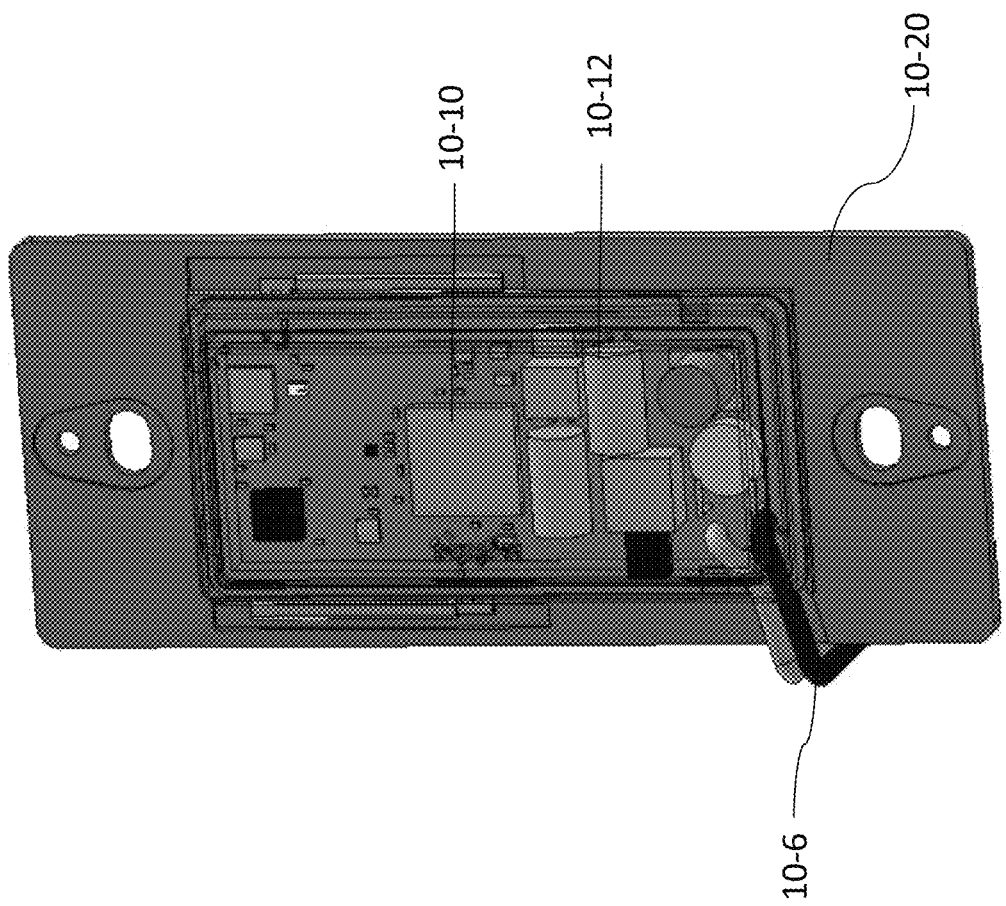
FIG. 5C is a partial cross-sectional, front view of the computer system networking device assembly of FIG. 5A with certain component(s) removed.

Referring to FIG. 5C, a partial cross-sectional, front view of the computer system networking device assembly 100 depicted in FIG. 5A is disclosed with certain components removed. The back plate 10-20 is shown attached to the gateway module 10-10 and power supply circuit 10-12 and includes elements similar to that shown in FIGS. 3C-D, however, without subplate 10-18.

Figure 6A:
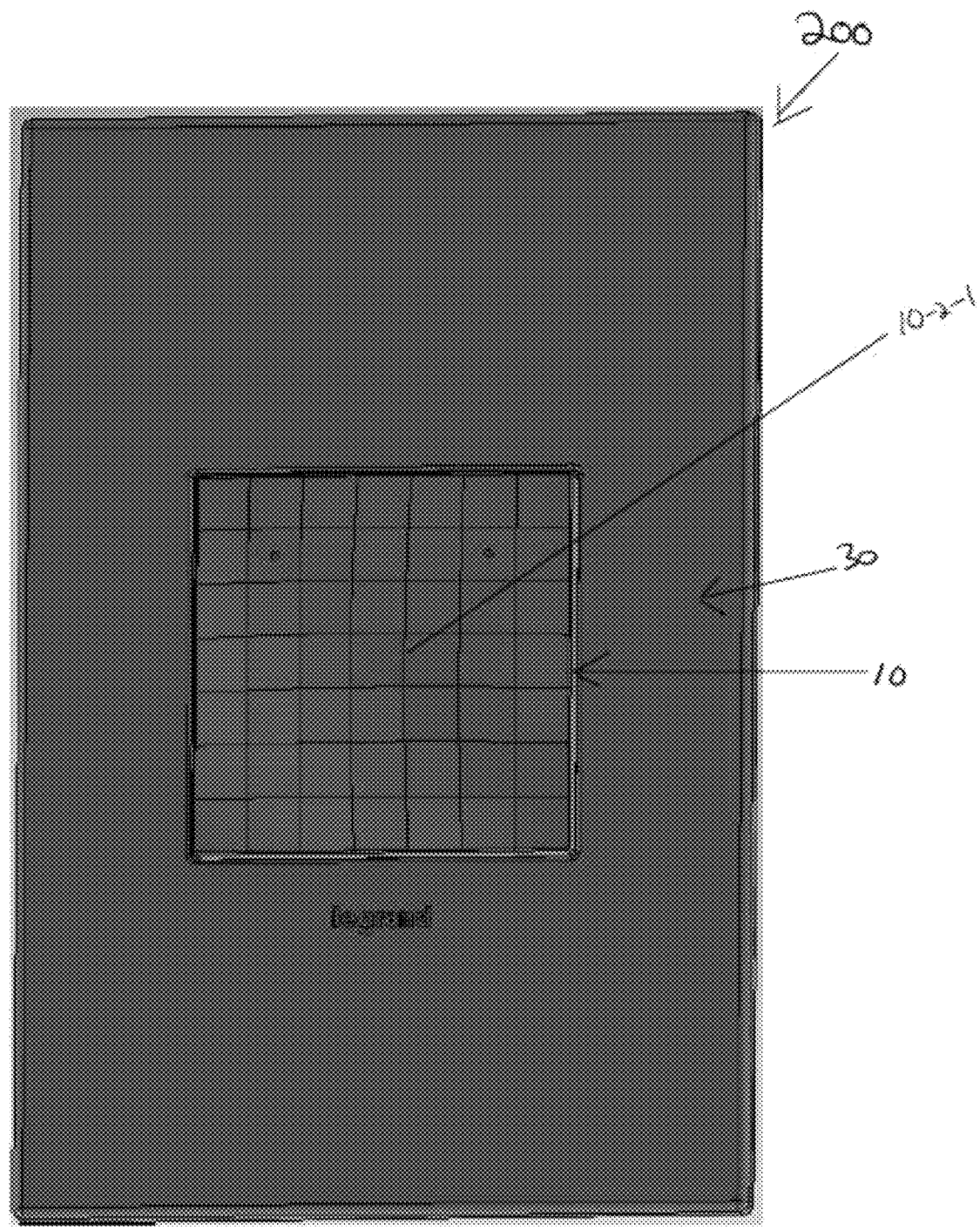
FIG. 6A is a front view of a computer system networking device assembly in accordance with another embodiment of the invention.

In accordance with an embodiment of the present invention, a computer system networking device assembly 200 is illustrated in FIGS. 6A-6O and can include a computer system networking device 10 configured to be positioned in a single gang wall box 20. Alternatively, the computer system networking device 10 can be positioned in a multi-gang wall box with various electrical wiring devices (which can be the same or different, e.g., switches, receptacles or just receptacles), not shown (as should be understood by a person of ordinary skill in the art in conjunction with a review of this disclosure). The non-limiting example of the computer system networking device 10 shown in the figures is a gateway hub device. The embodiments described with respect to FIGS. 6A-6O are similar in many respects to the embodiments described with respect to FIGS. 1A-L including overall functionality, certain structural configuration features, being configured to be positioned in a wall box, and including a power supply circuit connected to AC wires which are configured to be connected to a mains power source (as should be understood by a person of ordinary skill in the art in conjunction with this disclosure). As such, these similarities may not be fully repeated herein below. There are, however, certain structural configuration differences (e.g., square shape of opening in wall plate and square shape of computer system networking device vs. rectangular shape of the same components discussed with respect to FIGS. 1A-L; and stacked circuit boards including the gateway module and power supply circuit, respectively vs. the planar connection illustrated with respect to the embodiments shown in FIGS. 1A-L (although, as discussed, the circuit boards can be stacked with those embodiments)).

With respect to FIGS. 6A-6O and FIGS. 7A-7L (which is addressed in further detail below), US Pat. App. Pub. No. 20200185898 (owned by Applicant), discloses a modular electrical wiring device assembly with substantially square shaped electrical wiring devices and apertures in subplates and/or wall plates and other structural features such as associated frames, fasteners, and alignment connectors which can be used in conjunction with the computer system networking device assembly 200 described with respect to FIGS. 6A-6O and FIGS. 7A-7L (as should be understood by a person of ordinary skill in the art in conjunction with this disclosures). Accordingly, US Pat. App. Pub. No. 20200185898 is hereby incorporated by reference herein in its entirety, including as it relates specifically to the above referenced features.

Turning to FIG. 6A, a front view of a computer system networking device assembly 200 is illustrated in accordance with an embodiment. A computer system networking device 10 is shown positioned through a substantially square (or fully square) shaped aperture formed in a wall plate 30. The front surface 10-2-1 of the front plate 10-2 can be curved and made of various planar units as discussed with respect to other embodiments above.

Figure 6B:
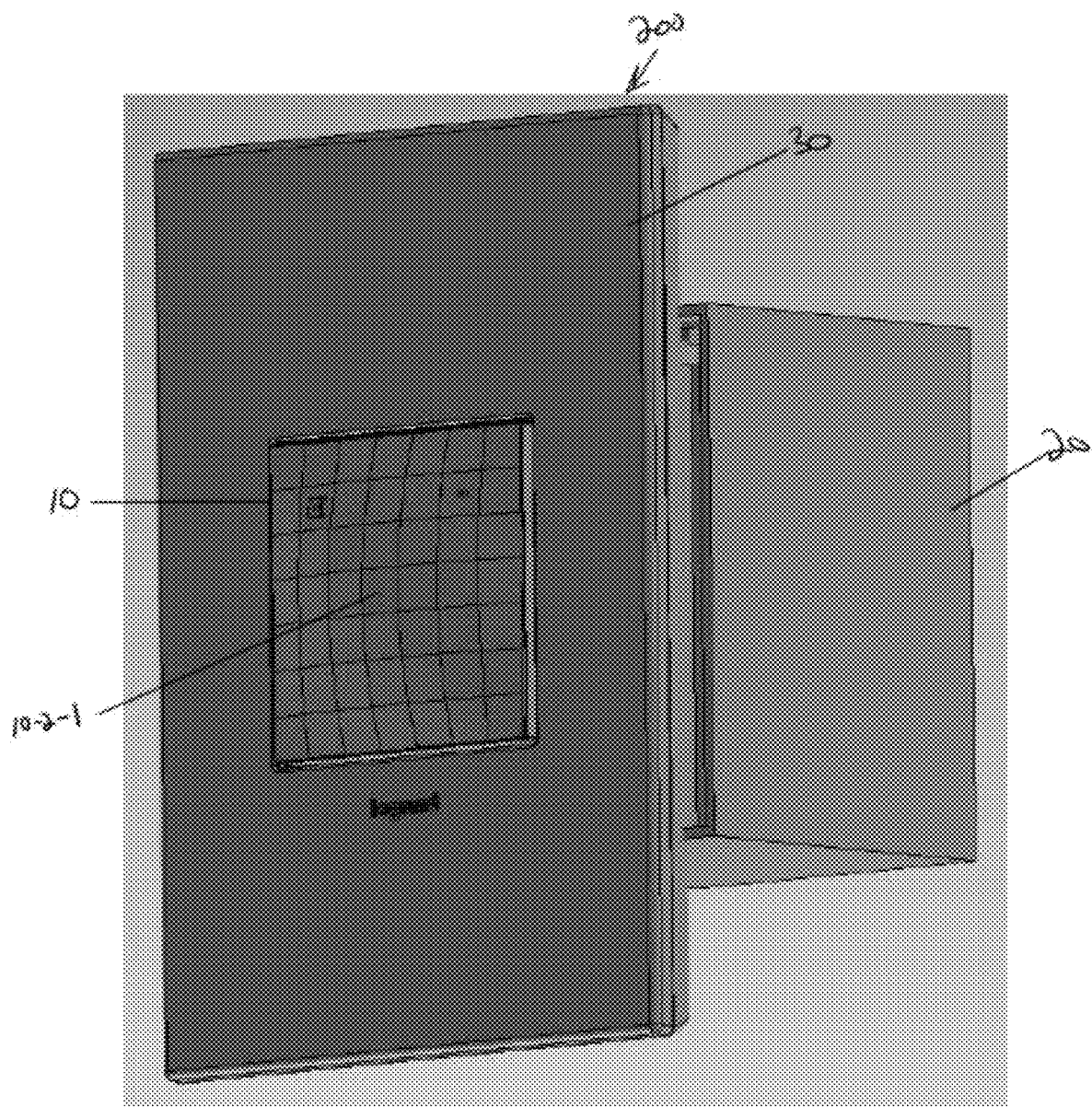
FIG. 6B is a front isometric view of the computer system networking device assembly of FIG. 6A.

FIG. 6B is a front isometric view of the computer system networking device assembly 200 of FIG. 6A. A wall box 20 in which the computer system networking device 10 is positioned is also shown.

Figure 6C:
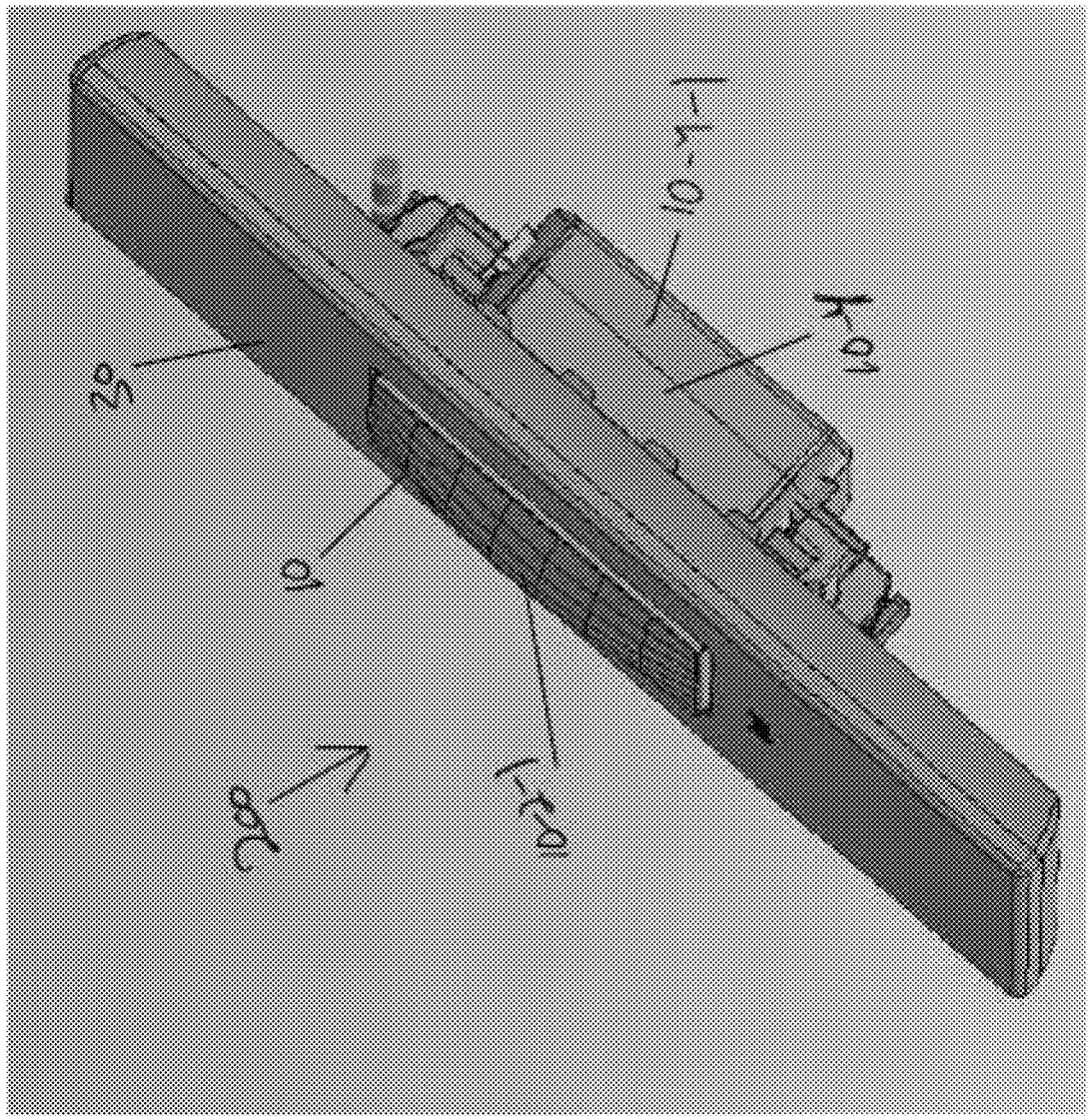
FIG. 6C is a front isometric view of the computer system networking device assembly of FIG. 6A with certain component(s) removed.

Referring to FIG. 6C, a front isometric view of the computer system networking device assembly 200 of FIG. 6A without the wall box 20 is shown. The back plate 10-4 is shown in this FIG. in addition to a back cover 10-4-1.

Figure 6D:
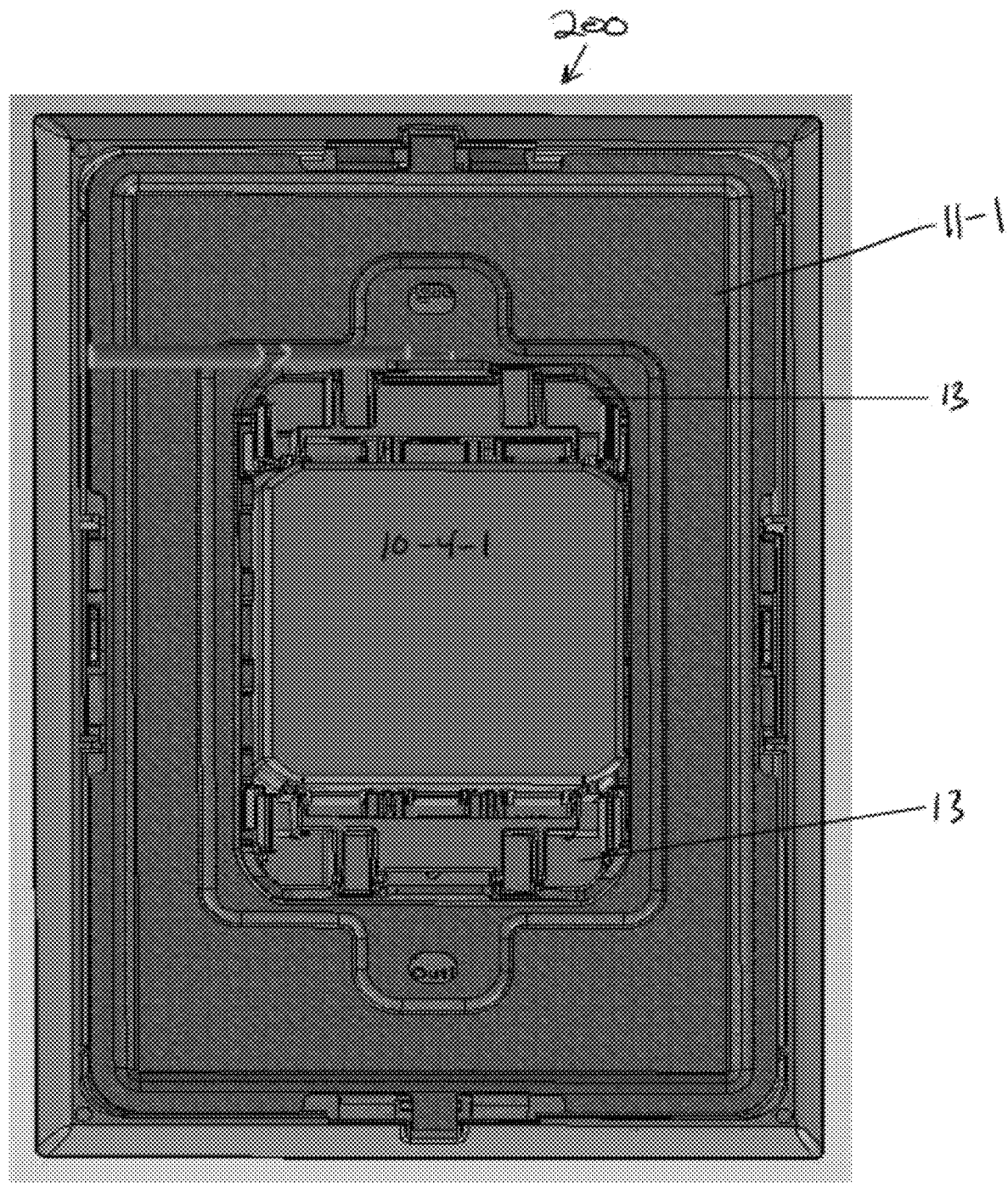
FIG. 6D is a back view of the computer system networking device assembly of FIG. 6A with certain component(s) removed.
Figure 6E:
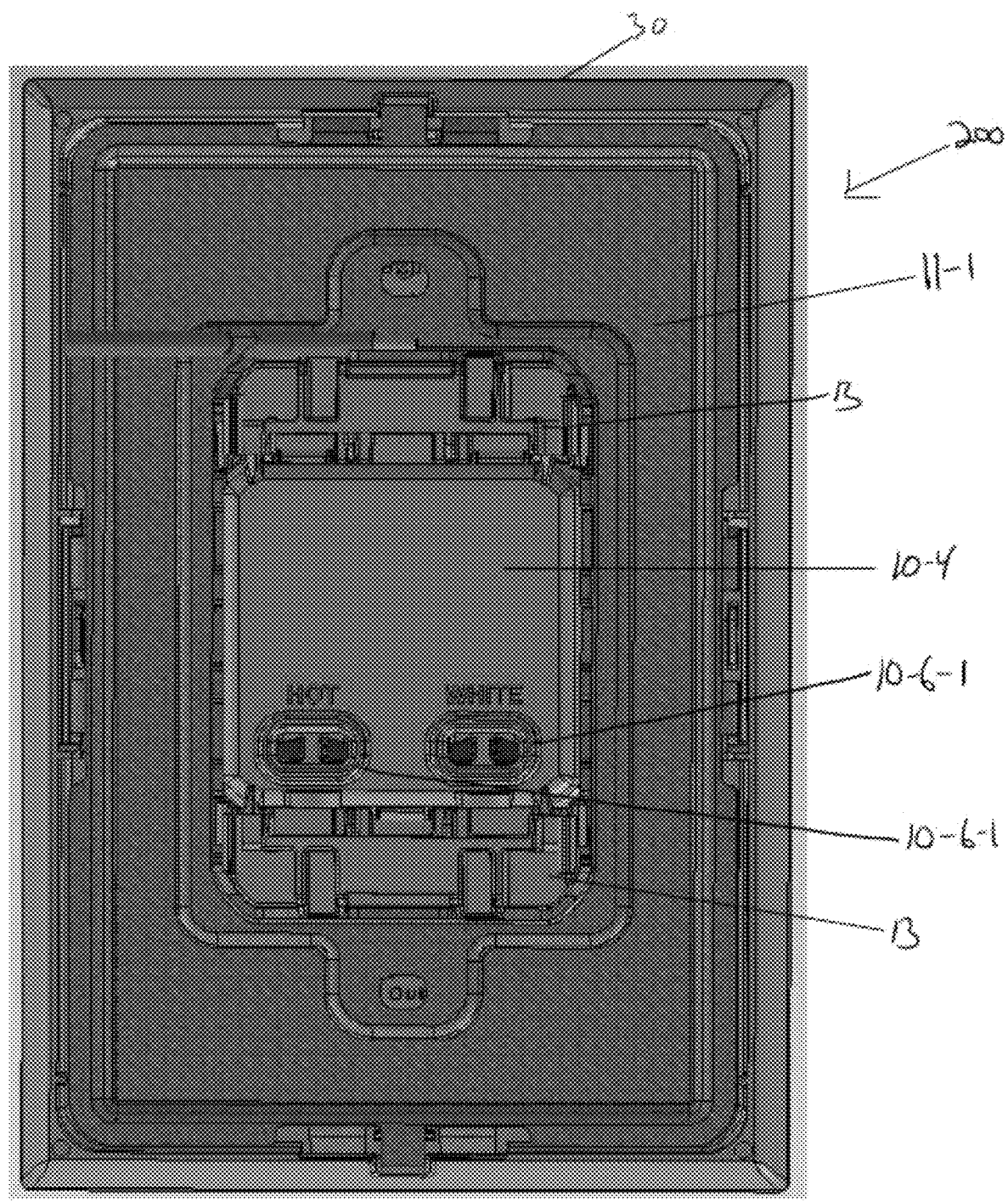
FIG. 6E is a back view of the computer system networking device assembly of FIG. 6A with certain component(s) removed.

FIGS. 6D-E are back views of the computer system networking device assembly 200 of FIG. 6A. FIG. 6D shows the back plate 10-4 covered by a back cover 10-4-1. The back cover 10-4-1 is removed in FIG. 6E, and the back plate 10-4 is shown with openings 10-6-1 for AC wires 10-6 (hot and neutral, extending from a mains power source) to extend therethrough. Frame 11-1 to which the wall plate 30 is attached (via, e.g., a snap-fit). Modular alignment connectors 13 are also shown, which assist with connecting the top and bottom of the computer system networking device 10 to the frame 11-1 (extra space is added to the top and bottom portions of the device 10 on the back side of the mounting strap 10-8, which are filled by the connectors 13).

Figure 6F:
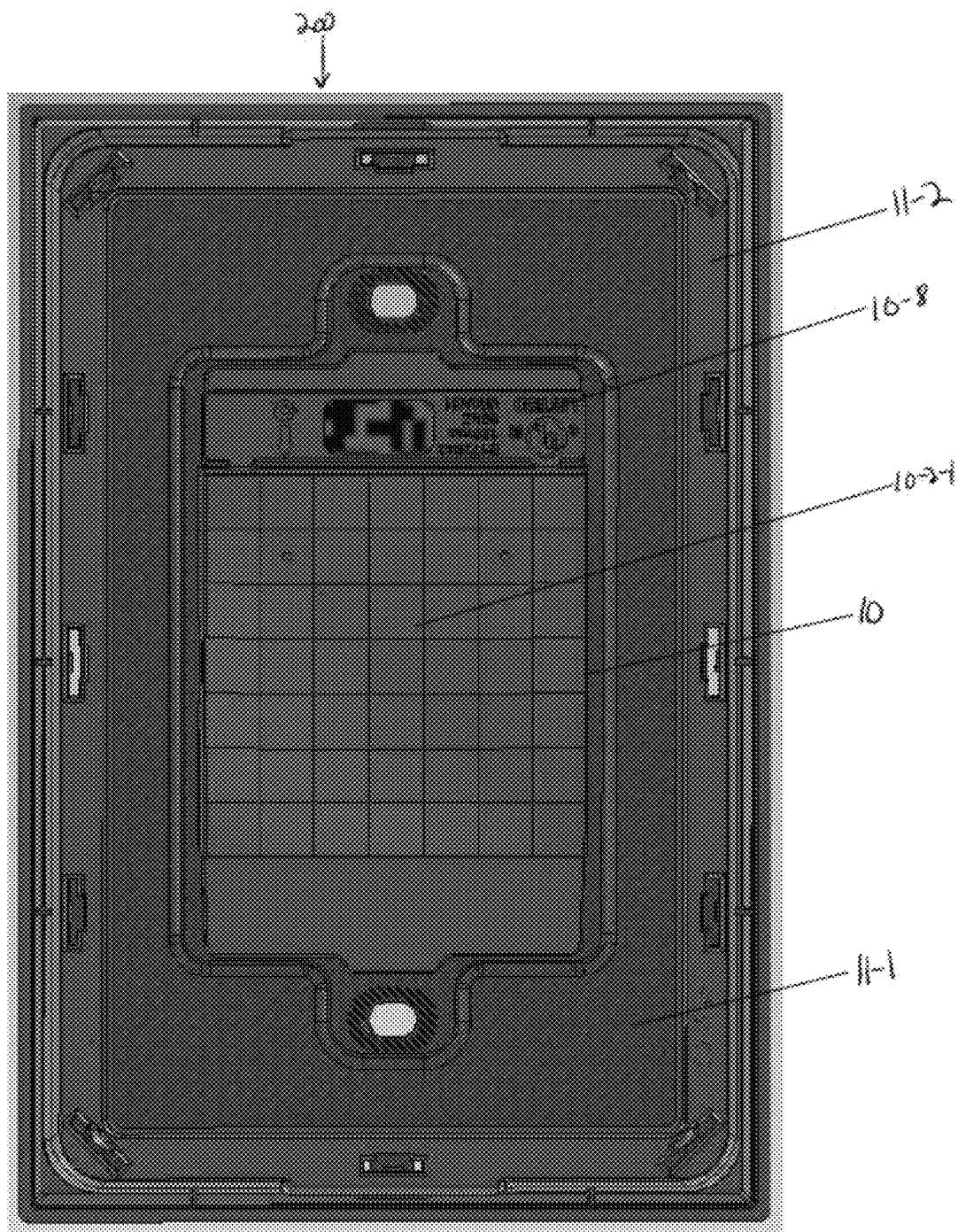
FIG. 6F is a front view of the computer system networking device assembly of FIG. 6A with certain component(s) removed.
Figure 6G:
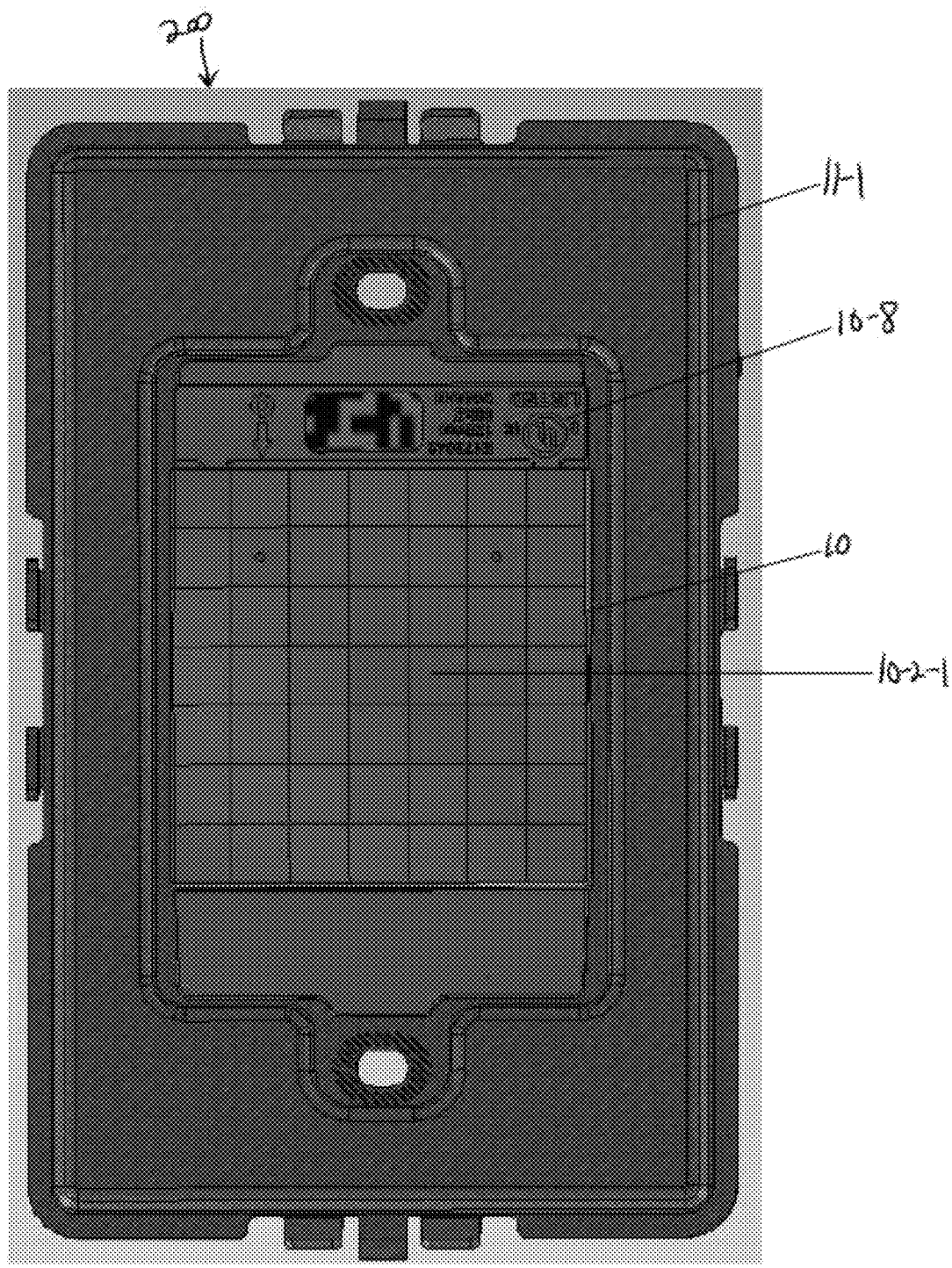
FIG. 6G is a front view of the computer system networking device assembly of FIG. 6A with certain component(s) removed.

FIGS. 6F-G are front views of the computer system networking device assembly 200 of FIG. 6A with the wall plate 30 removed. A subplate 11-2 is shown in FIG. 6F, which is connected (e.g., snap-fit) to the perimeter of the frame 11-1. The subplate 11-2 is shown removed in FIG. 6G. The computer system networking device 10 with a mounting strap 10-8 is shown positioned through an aperture of the frame 11-1.

Turning to FIGS. 6H-O, various views of the computer system networking device 10 of the computer system networking device assembly 200 of FIG. 6A in various points of disassembly are illustrated for the purpose of showing all components of the computer system networking device 10.

Figure 6H:
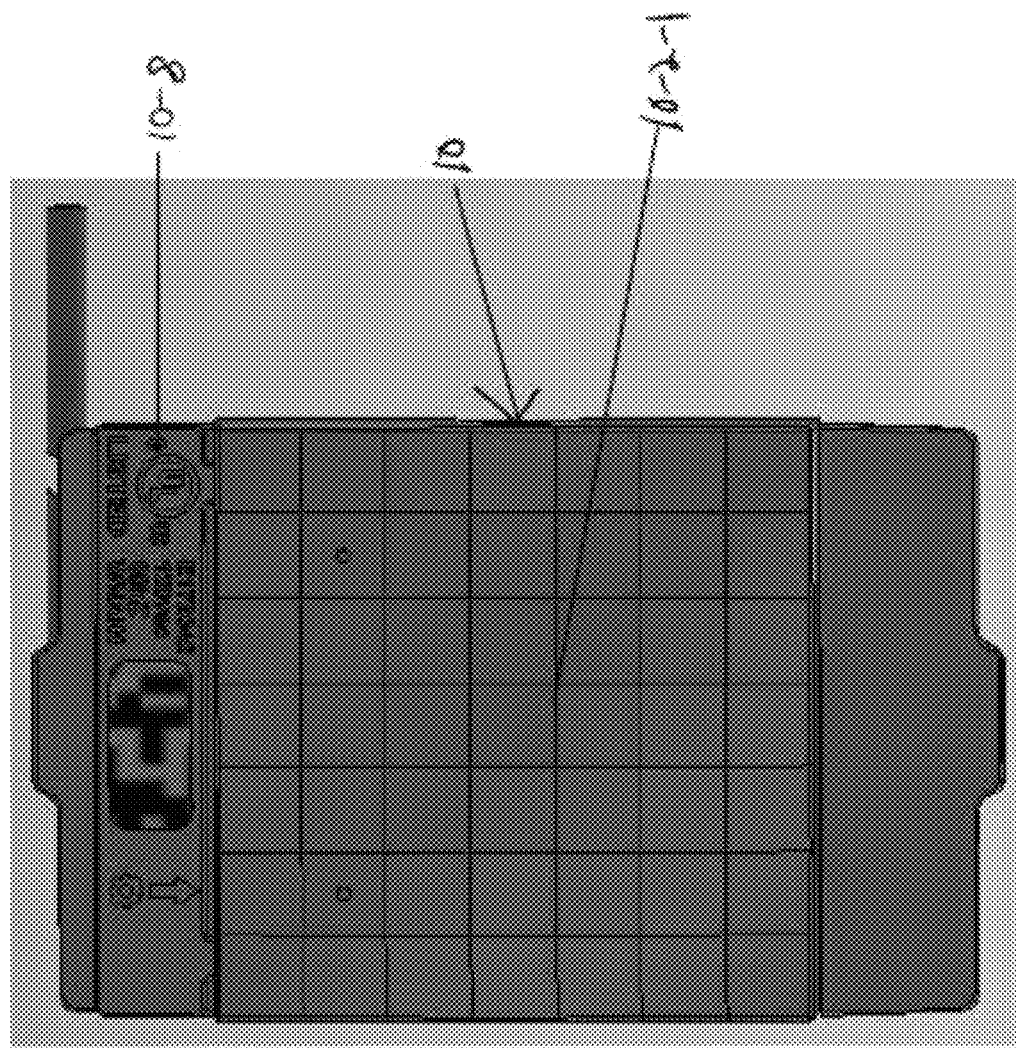
FIG. 6H is a front view of the computer system networking device assembly of FIG. 6A with certain component(s) removed.
Figure 61:
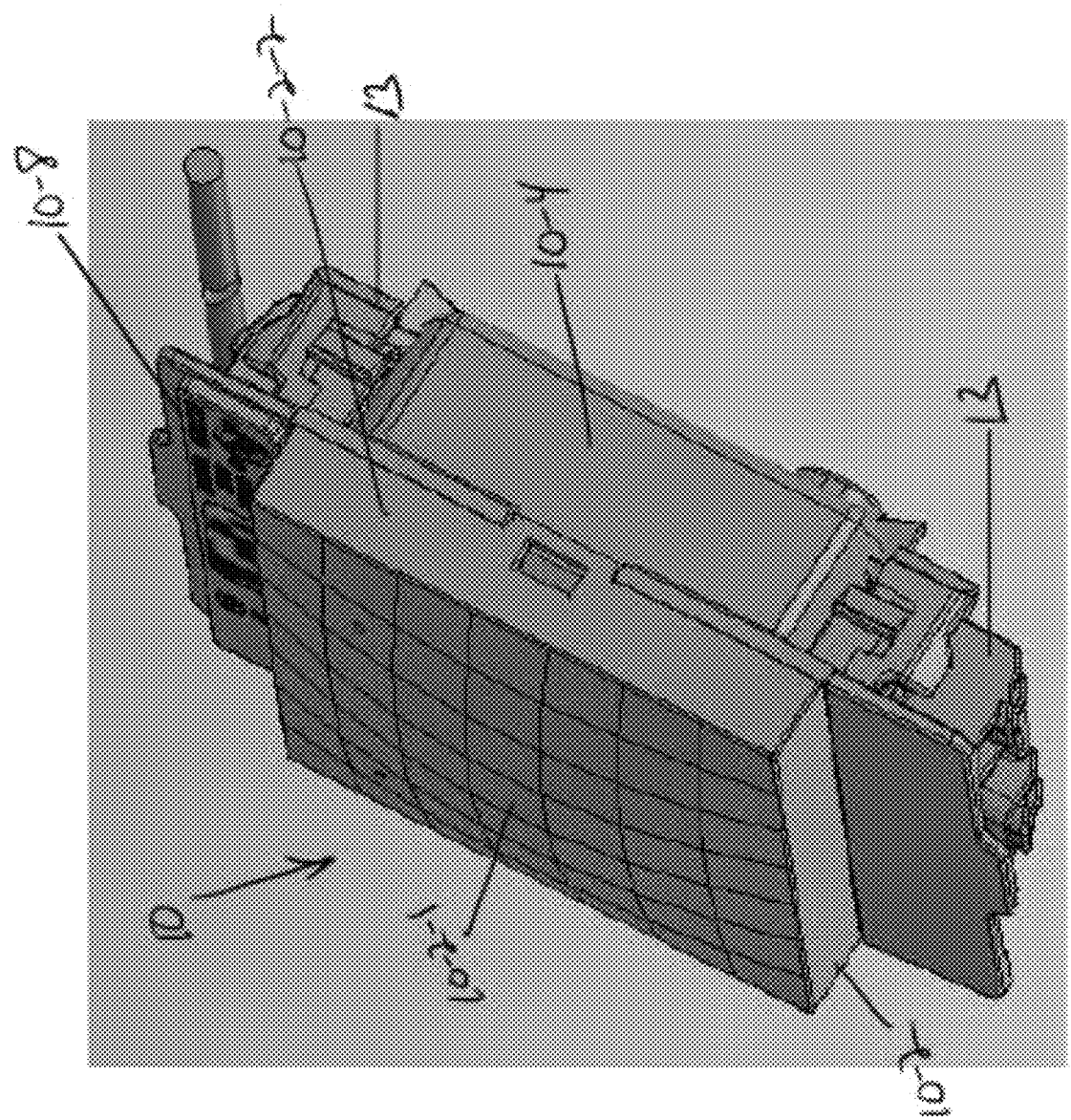

FIG. 6H is a front view of the computer system networking device 10.

FIG. 6I is a front isometric view of the computer system networking device 10. The front plate 10-2 is shown with the curved surface 10-2-1 and sides/facets 10-2-2. Modular alignment connectors 13, mounting strap 10-8 and the back plate 10-4 are also shown.

Figure 6J:
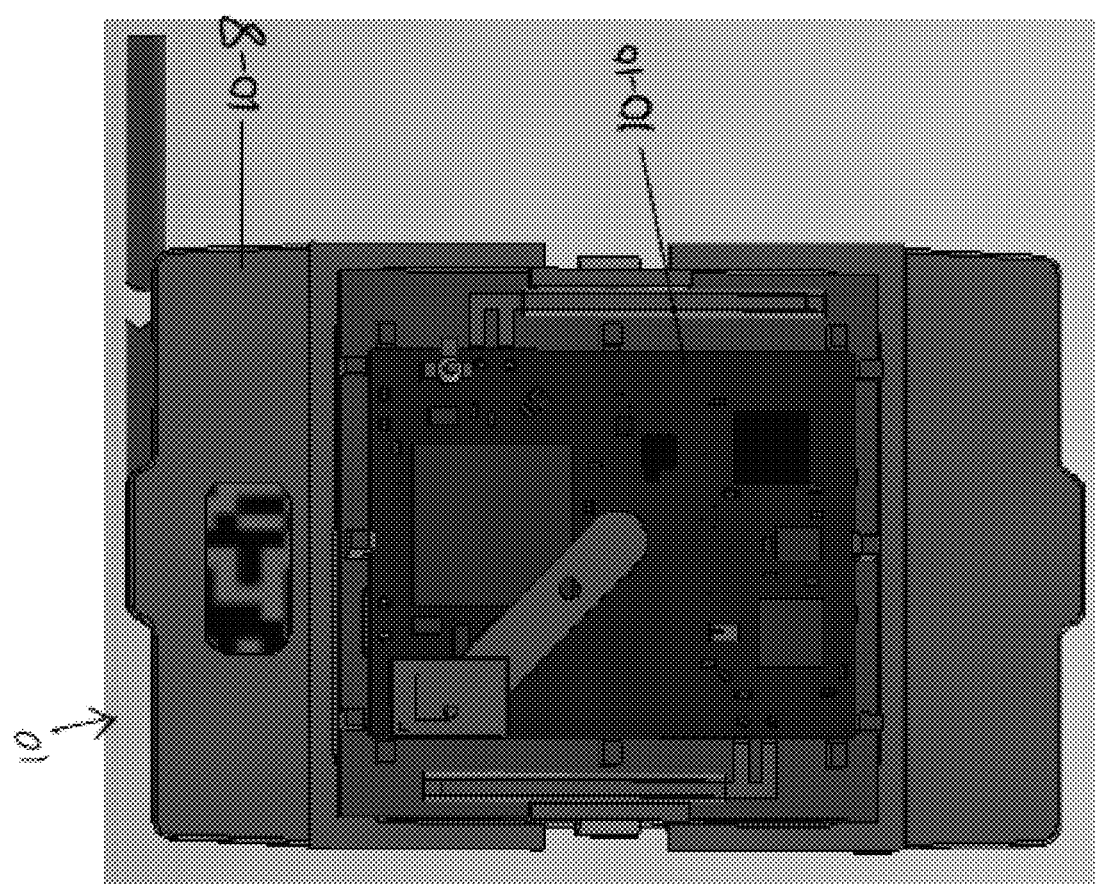
FIG. 6J is a front view of the computer system networking device assembly of FIG. 6A with certain component(s) removed.

FIG. 6J is a front view of the computer system networking device 10 with the front plate 10-2 removed. A gateway module 10-10 is visible with a number of associated components (e.g., microchip) on a circuit board, as discussed with respect to other embodiments above.

FIG. 6K is a front isometric view of the computer system networking device 10 with the front plate 10-2 removed. In addition to the components shown in FIG. 6K, the back plate 10-4 and a separator 14 with posts 14-1 (or other holder components) that hold the gateway module 10-10 with circuit board in place.

Figure 6L:
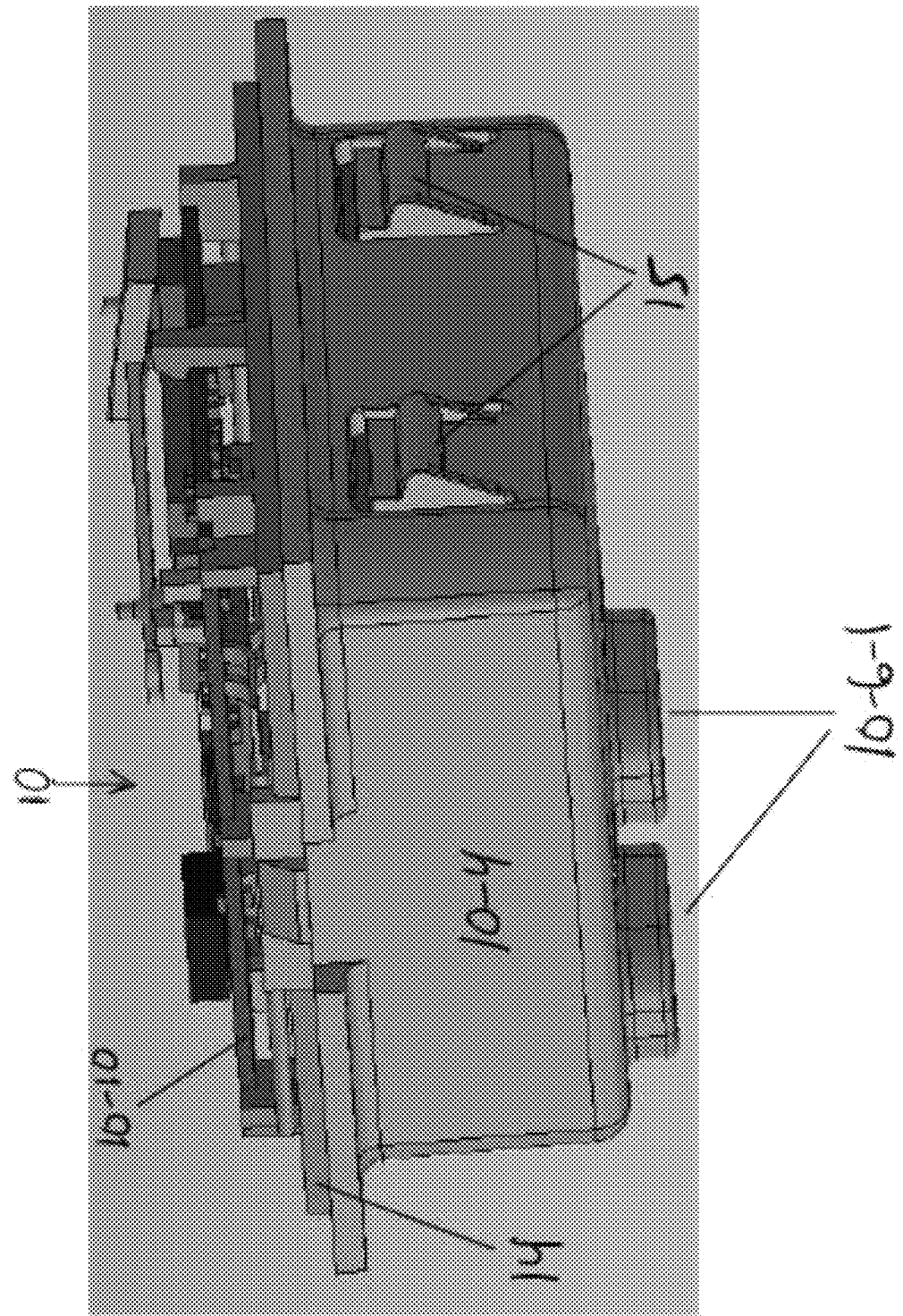
FIG. 6L is a side isometric view of the computer system networking device assembly of FIG. 6A with certain component(s) removed.

FIG. 6L is a side isometric view of the computer system networking device 10 with the front plate 10-2 removed. The openings 10-6-1 for AC wires 10-6 are shown, and snap-fit components for connecting the top and bottom portions of the back plate 10-4 to each respective modular alignment connector 13.

Figure 6M:
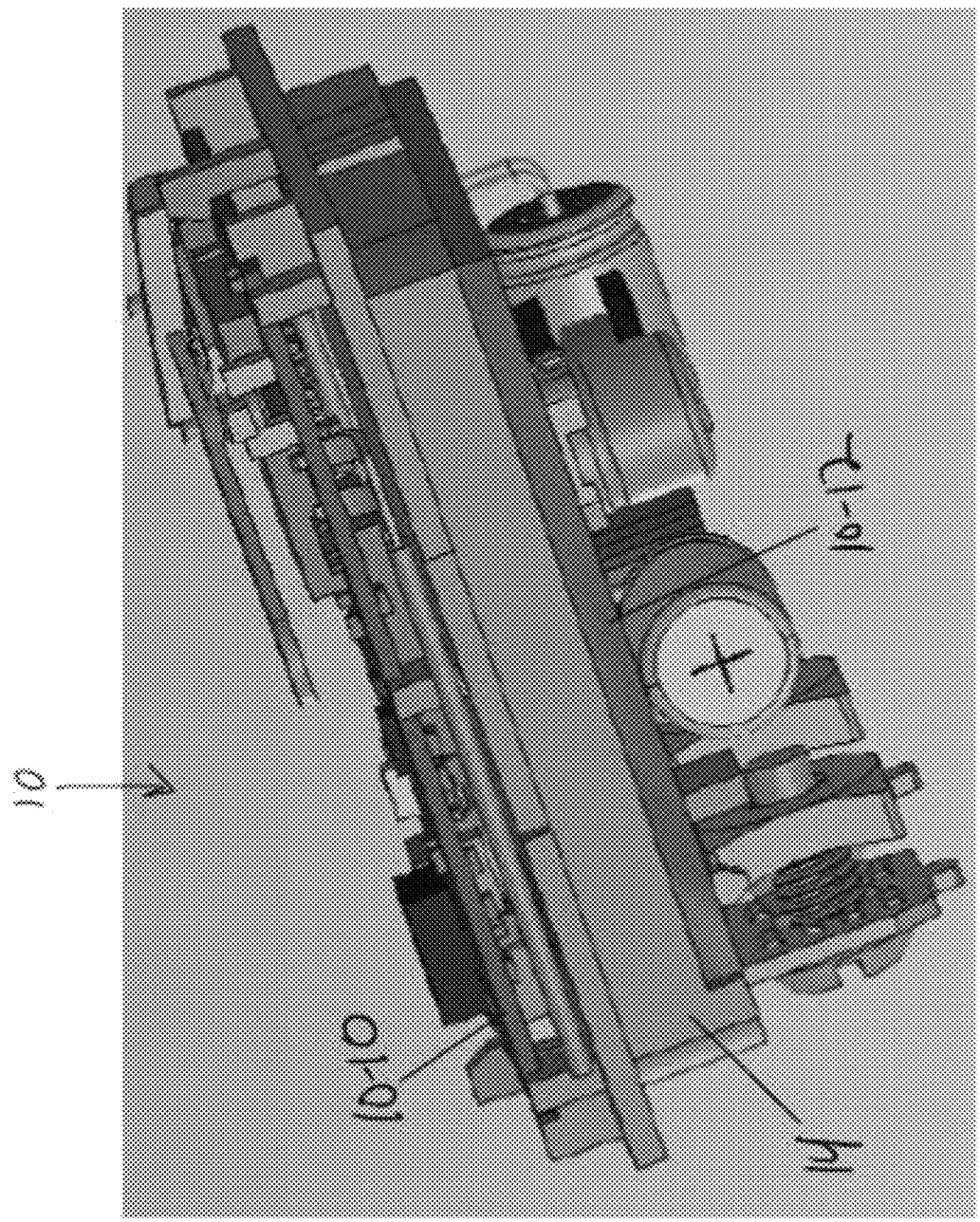
FIG. 6M is a side isometric view of the computer system networking device assembly of FIG. 6A with certain component(s) removed.

FIG. 6M is a side isometric view of the computer system networking device 10 with the front plate 10-2 and the back plate removed. A power supply circuit 10-12 is shown with components positioned on a circuit board, and is separated from the gateway module 10-10 by the separator 14. The power supply circuit 10-12 and the gate way module 10-10 are preferably positioned on circuit boards that are positioned in separate parallel planes, separated by the separator and connected by electrical connectors 13 (not shown).

Figure 6N:
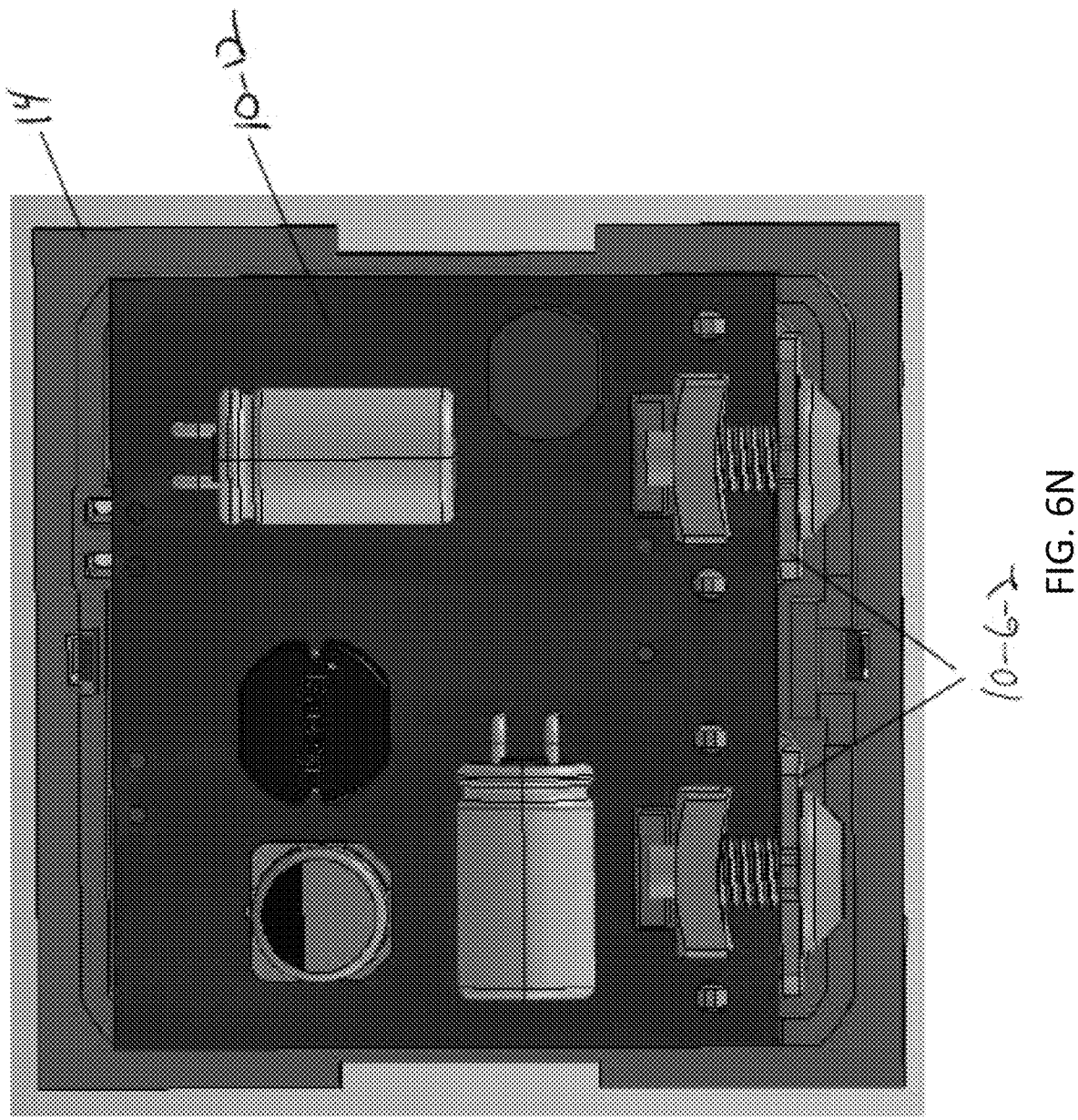
FIG. 6N is a back view of the computer system networking device assembly of FIG. 6A with certain component(s) removed.
Figures 1, 6N:
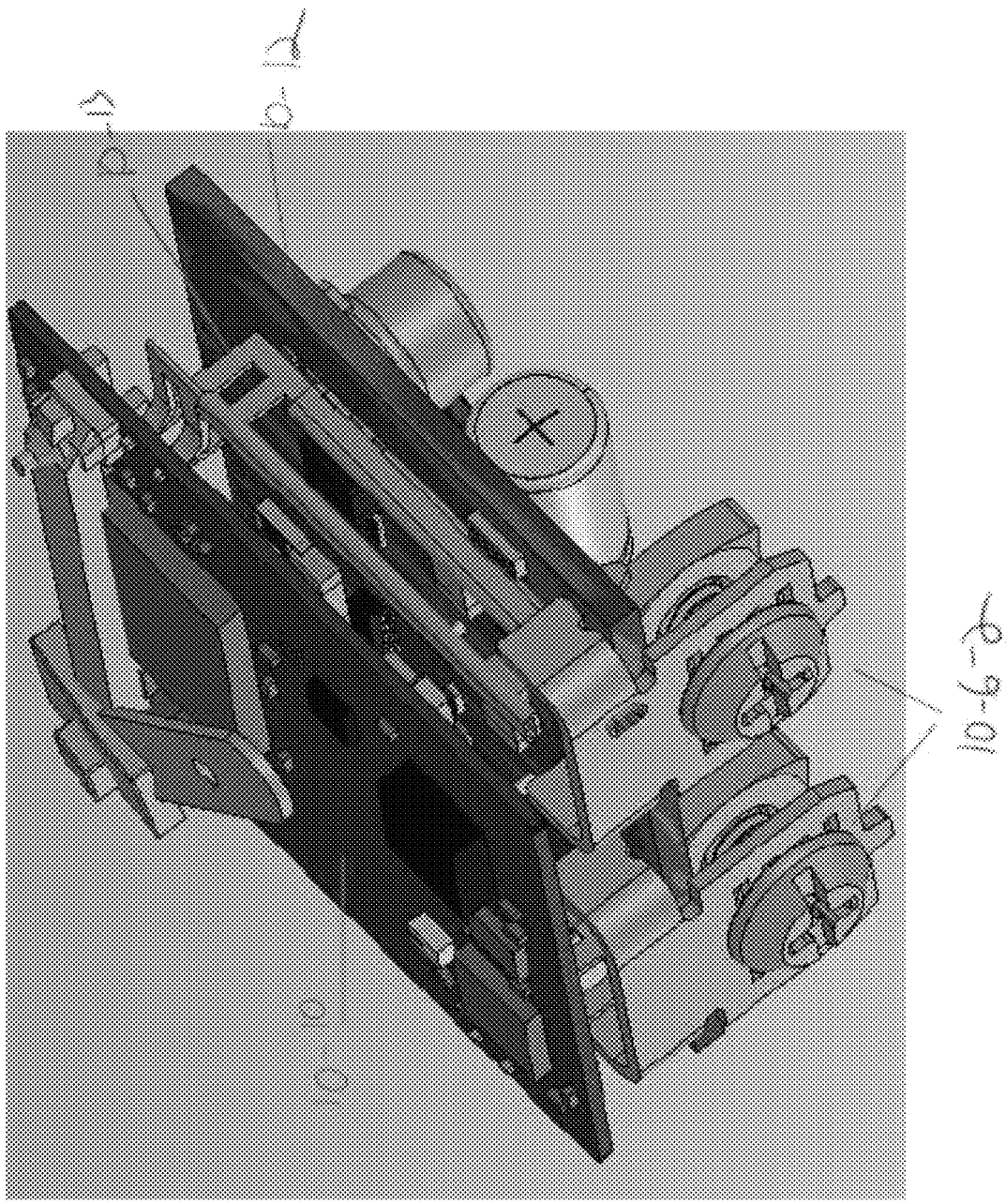
Figure 60:
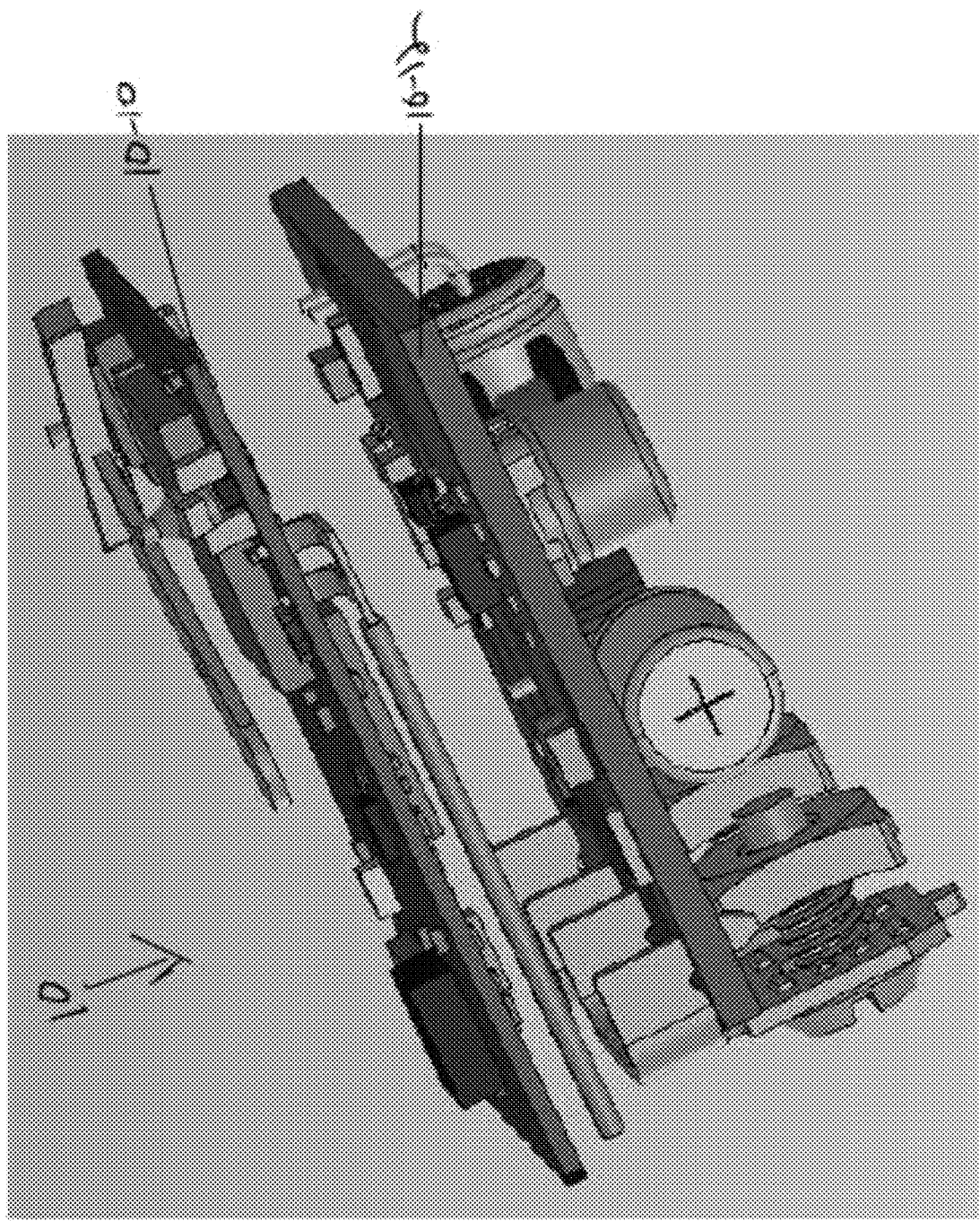
Figures 1, 60:
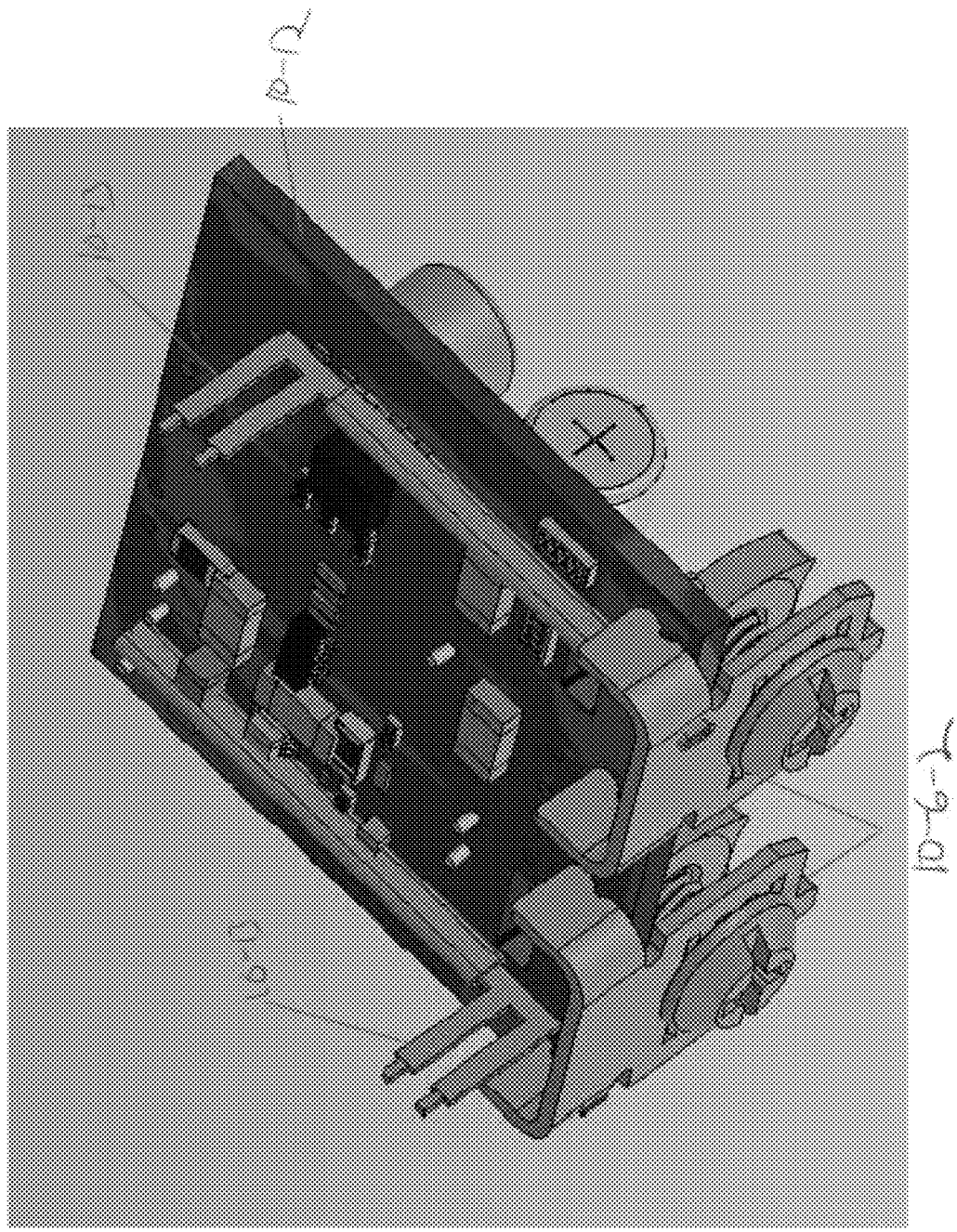

FIG. 6N is a back view of the computer system networking device 10 with the back plate removed. The power supply circuit 10-12 is shown with components positioned on a circuit board, and line in components 10-6-2 configured to electrically and/or mechanically connect the AC wires 10-6 to connection points on the power supply circuit 10-6-2.

FIG. 6N-1 is a side isometric view of the computer system networking device 10 with the front plate 10-2, the back plate 10-4, and the separator 14 removed. Among other components, electrical connectors 10-13 are shown extending up from the power supply circuit 10-12 board to electrically and mechanically connect to the gateway module 10-10 circuit board.

FIG. 6O is a side isometric view of the computer system networking device 10 with the front plate 10-2, the back plate 10-4, and the separator 14 removed. Electrical connectors, not shown, would extend from the power supply circuit 10-12 up to the gateway module 10-10 (as should be understood by a person of ordinary skill in the art in conjunction with a review of this disclosure.

FIG. 6O-1 is a side isometric view of the computer system networking device 10 with the front plate 10-2, the back plate 10-4, the separator 14 removed, and the gateway module 10-10 removed. The electrical connectors 10-13 are shown in this Figure extending from the power supply circuit 10-12 circuit board among other elements.

In accordance with another embodiment of the present invention, a computer system networking device assembly 200 is illustrated in FIGS. 7A-L and can include one or more electrical wiring devices 10-1-2 positioned in a wall box (as shown, one electrical wiring device 10-1-2 positioned in a single gang wall box 20, but can include multiple of the same and/or different electrical wiring devices positioned in a multi-gang wall box), and a computer system networking device 10-1-1 connected to the electrical wiring device 10-1-2 via a subplate 10-18 and/or wall plate 30. The non-limiting example of the computer system networking device 10 shown in the figures is a gateway hub device. The embodiments described with respect to FIGS. 7A-L are similar in many respects to the embodiments described with respect to FIGS. 2A-D including overall functionality, certain structural configuration features, the gateway hub being configured to be positioned over a wall structure next to an electrical wiring device in a wall box (a example retrofit configuration), and including a power supply circuit connected to AC wires which are configured to be connected to a mains power source (as should be understood by a person of ordinary skill in the art in conjunction with this disclosure). As such, these similarities may not be fully repeated herein below. There are, however, certain structural configuration differences (e.g., square shape of opening in wall plate and square shape of computer system networking device vs. rectangular shape of the same components discussed with respect to FIGS. 2A-D; and stacked circuit boards including the gateway module and power supply circuit, respectively vs. the planar connection illustrated with respect to the embodiments shown in FIGS. 2A-D (although, as discussed, the circuit boards can be stacked with those embodiments)).

Figure 7A:
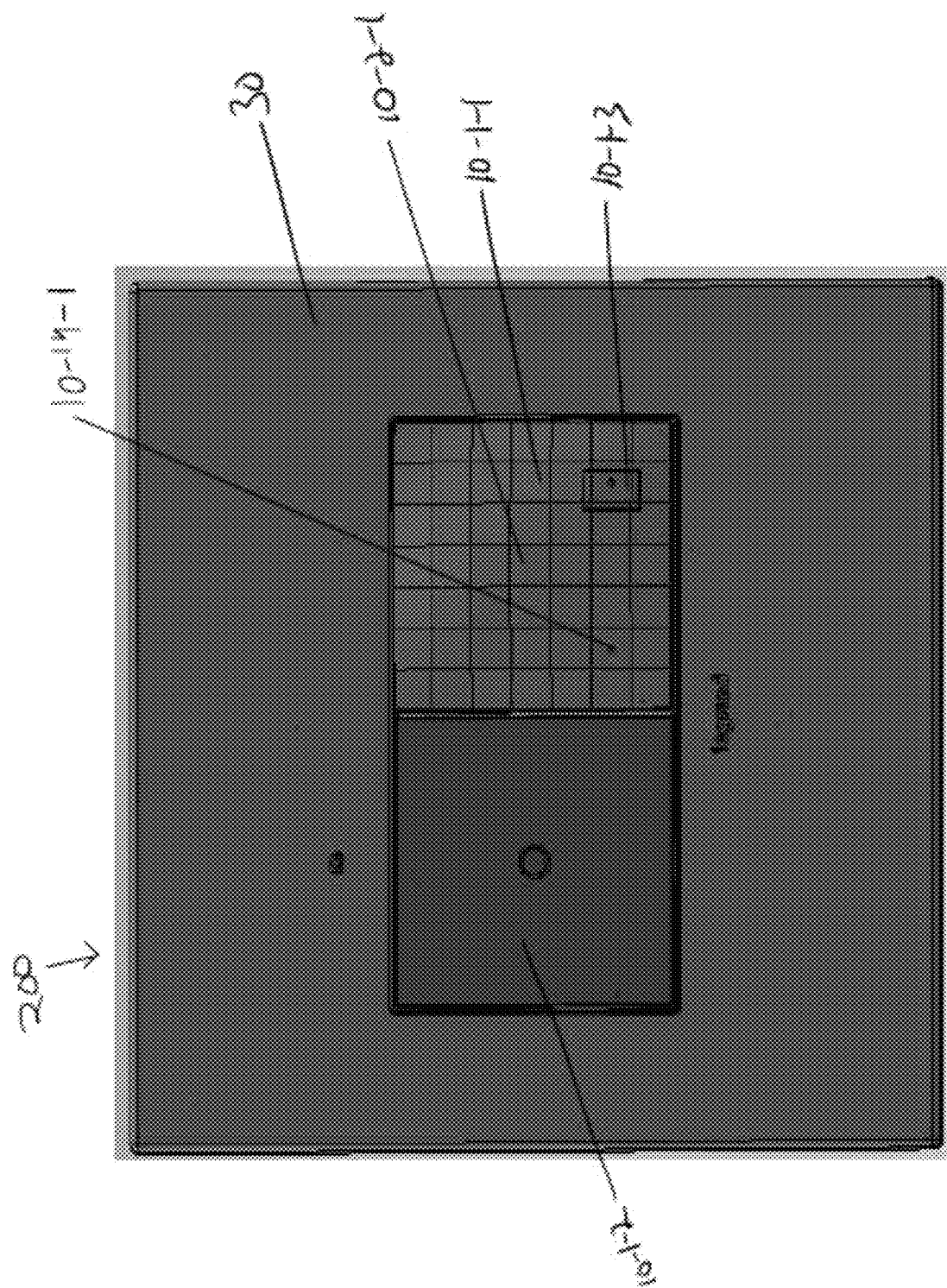
FIG. 7A is a front view of the computer system networking device assembly in accordance with another embodiment of the invention.

Turning to FIG. 7A, a front view of a computer system networking device assembly 200 is illustrated in accordance with an embodiment. A computer system networking device 10-1-1 is shown positioned through a substantially square (or fully square) shaped aperture formed in a wall plate 30. The front surface 10-2-1 of the front plate 10-2 can be curved and made of various planar units as discussed with respect to other embodiments above. Aperture 10-14-1 is for the light of the light pipe to be seen through (as discussed above, and can be present in one or all embodiments described herein). Also shown is a button actuator 10-1-3 (which can also be present in one or all embodiments described herein), that can be configured to program the computer system networking device 10-1-1 to perform certain functionality associated with it (as should be understood by a person of ordinary skill in the art). Electrical wiring device 10-1-2 is shown positioned through a separate aperture (but could be the same) through the wall plate 30, and is adjacent to the computer system networking device 10-1-1.

Figure 7B:
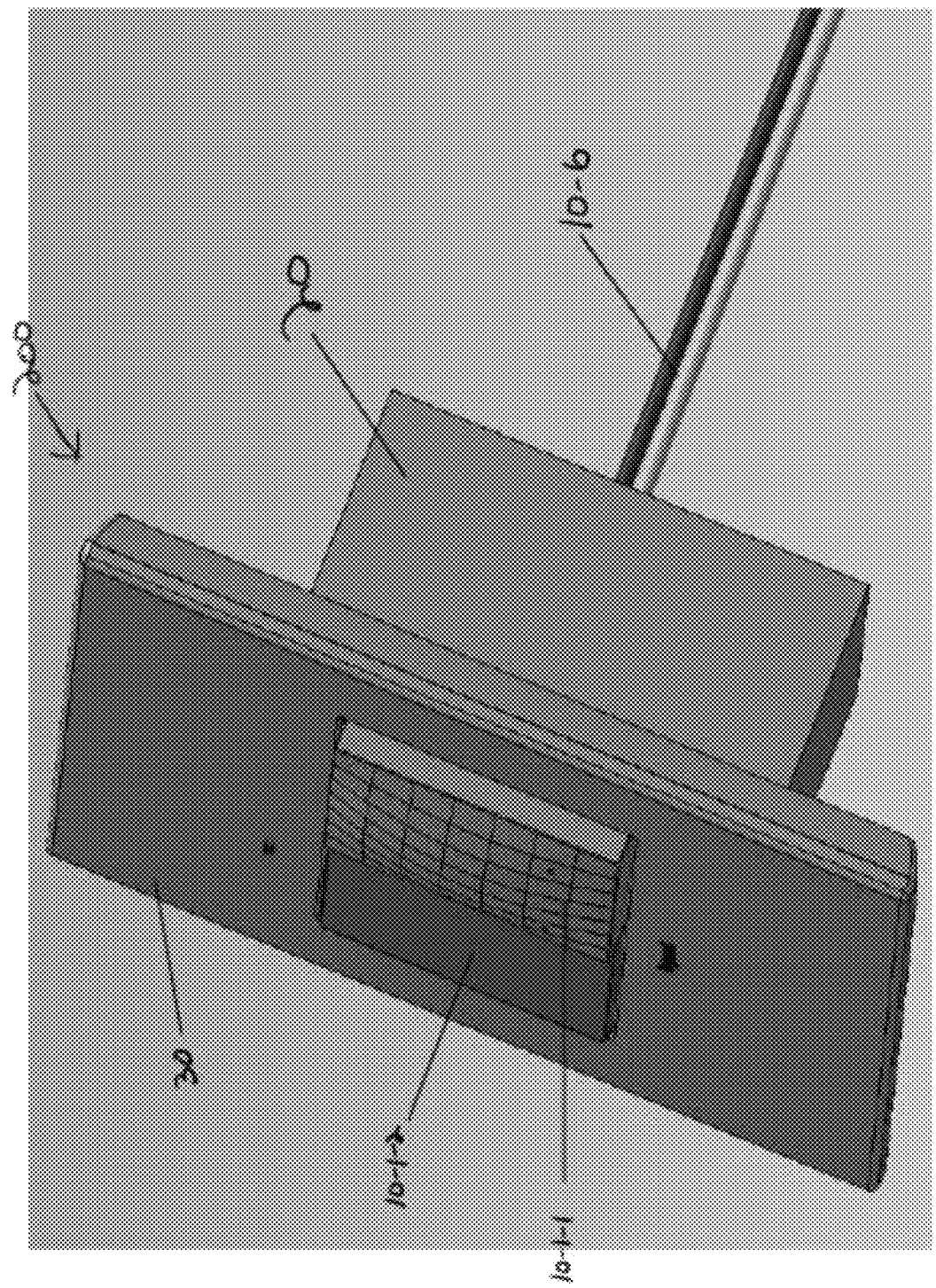
FIG. 7B is a front isometric view of the computer system networking device assembly of FIG. 7A.

FIG. 7B is a front isometric view of the computer system networking device assembly 200 of FIG. 7A. A wall box 20 in which the electrical wiring device 10-1-2 is positioned is also shown.

Figure 7C:
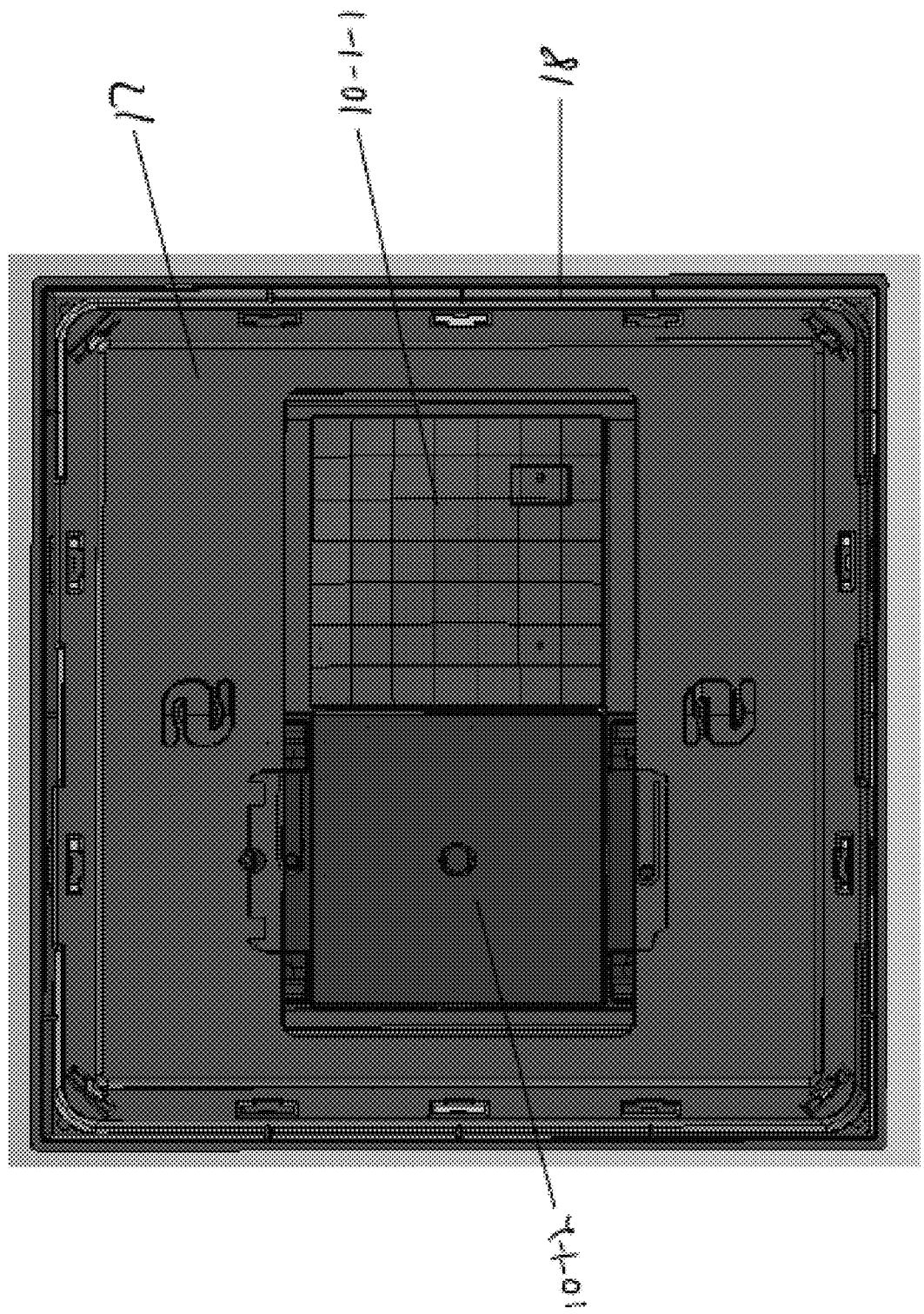
FIG. 7C is a front view of the computer system networking device assembly of FIG. 7A with certain component(s) removed.
Figure 7D:
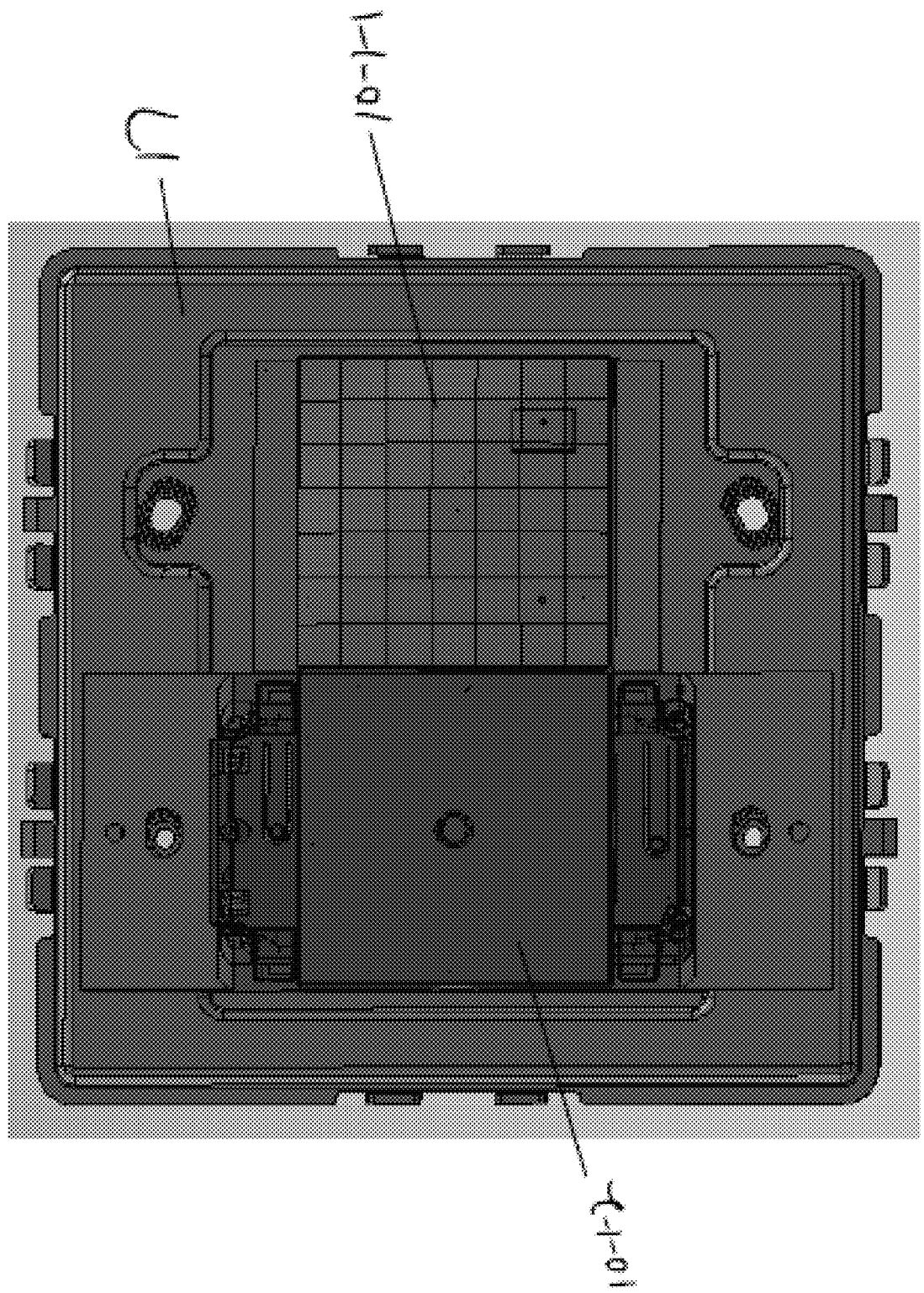
FIG. 7D is a front view of the computer system networking device assembly of FIG. 7A with certain component(s) removed.
Figure 7E:
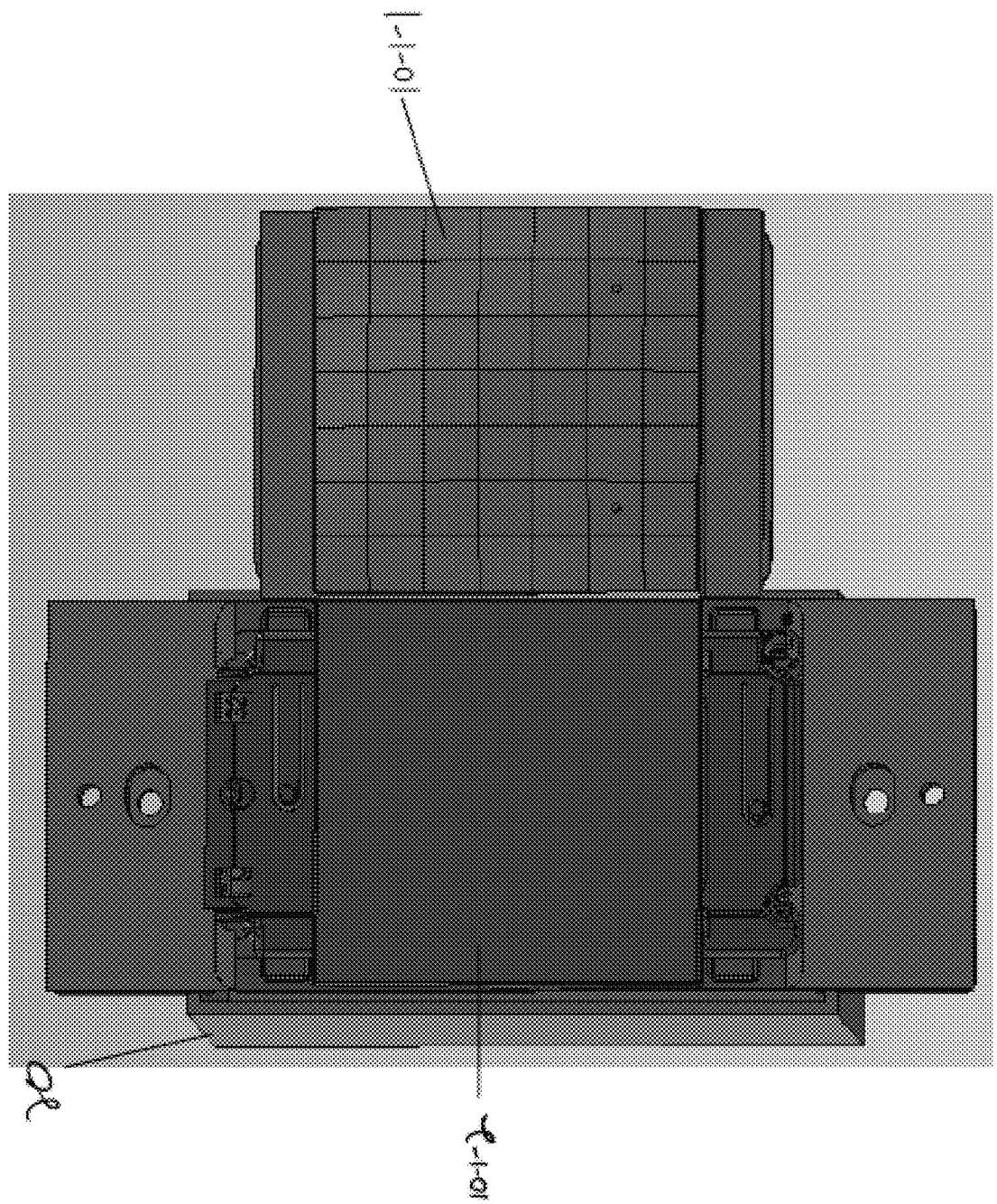
FIG. 7E is a front view of the computer system networking device assembly of FIG. 7A with certain component(s) removed.

The remaining figures shown the computer system networking device assembly 200 of FIG. 7A in various states of disassembly to show certain components therein. In particular, FIG. 7C is a front view showing the computer system networking device assembly 200 with the wall plate 30 removed. A frame 17 having apertures similar to the wall plate through which the electrical wiring device 10-1-2 is positioned and the gateway hub device 10-1-1 is positioned, respectively. Alternatively, the gateway hub device 10-1-1 can be a unitary part of the frame 17. A subplate 18 is connected (e.g., snap-fit) to the perimeter of the subplate 17. FIG. 7D is a front view showing the computer system networking device assembly 200 with the wall plate 30 and the subplate 18 removed. FIG. 7E is a front view showing the computer system networking device assembly 200 with the wall plate 30, the subplate 18, and the frame 17 removed.

Figure 7F:
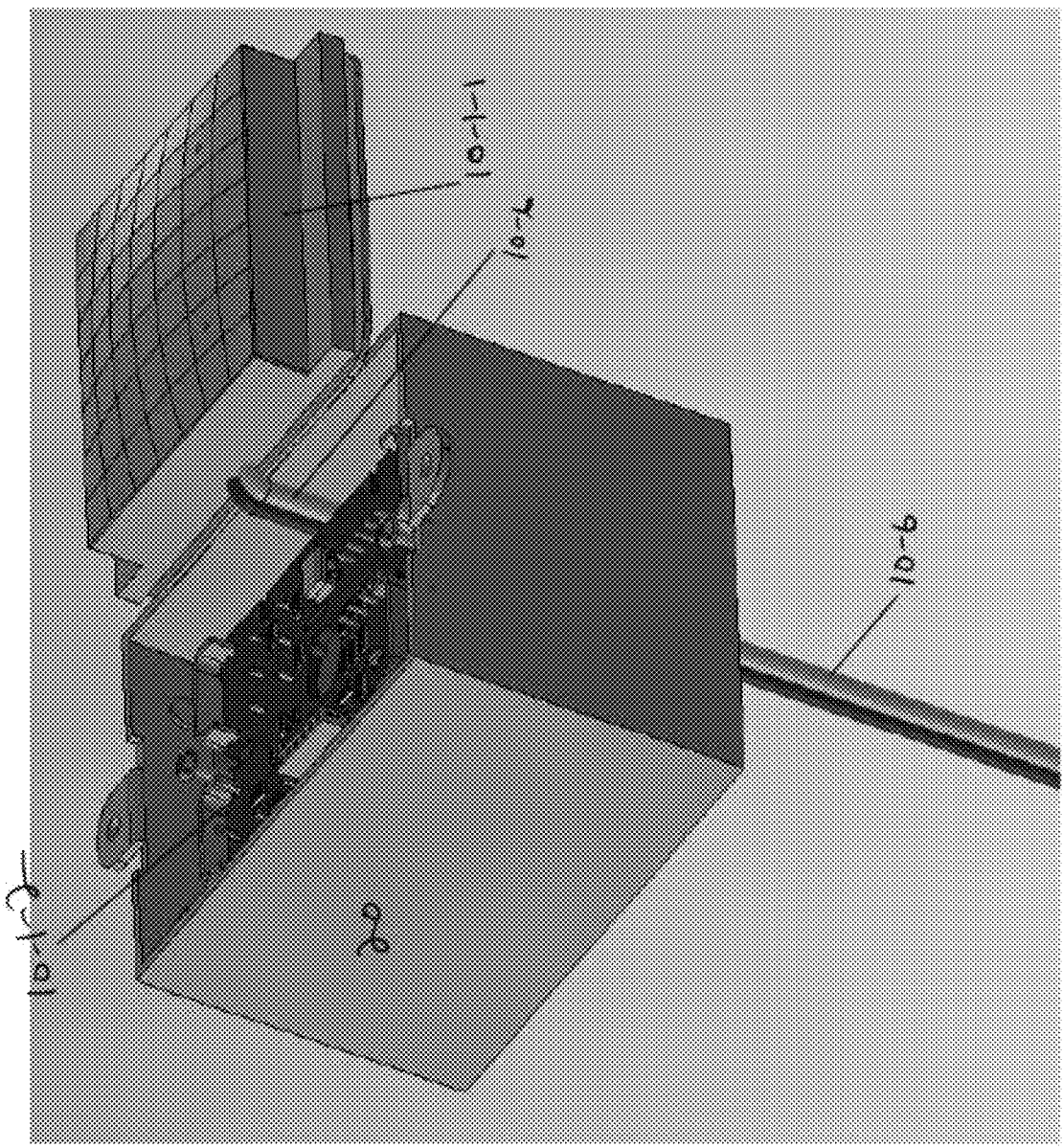
FIG. 7F is a front isometric view of the computer system networking device assembly of FIG. 7A with certain component(s) removed.
Figure 7G:
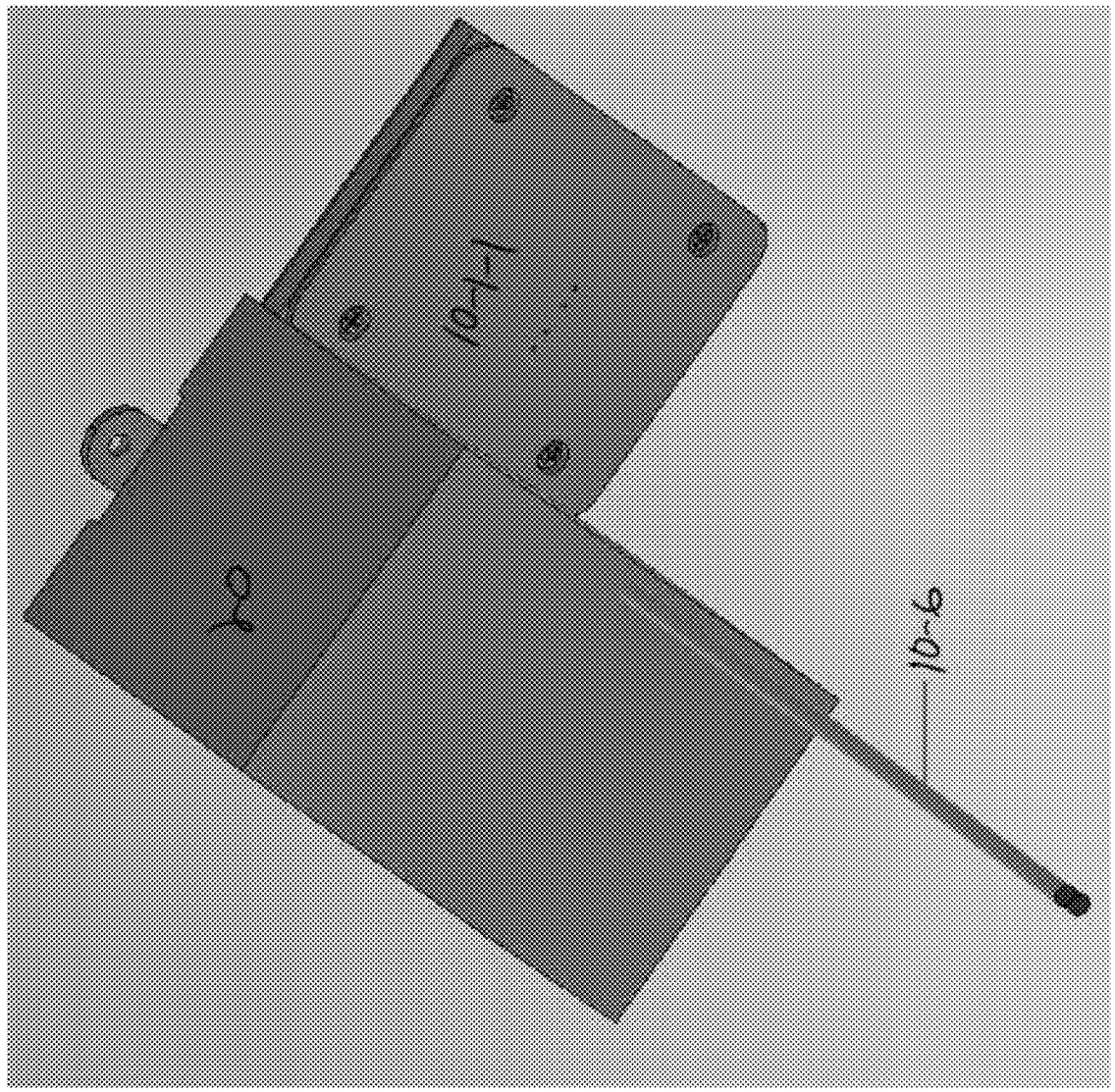
FIG. 7G is a back isometric view of the computer system networking device assembly of FIG. 7A with certain component(s) removed.
Figure 7H:
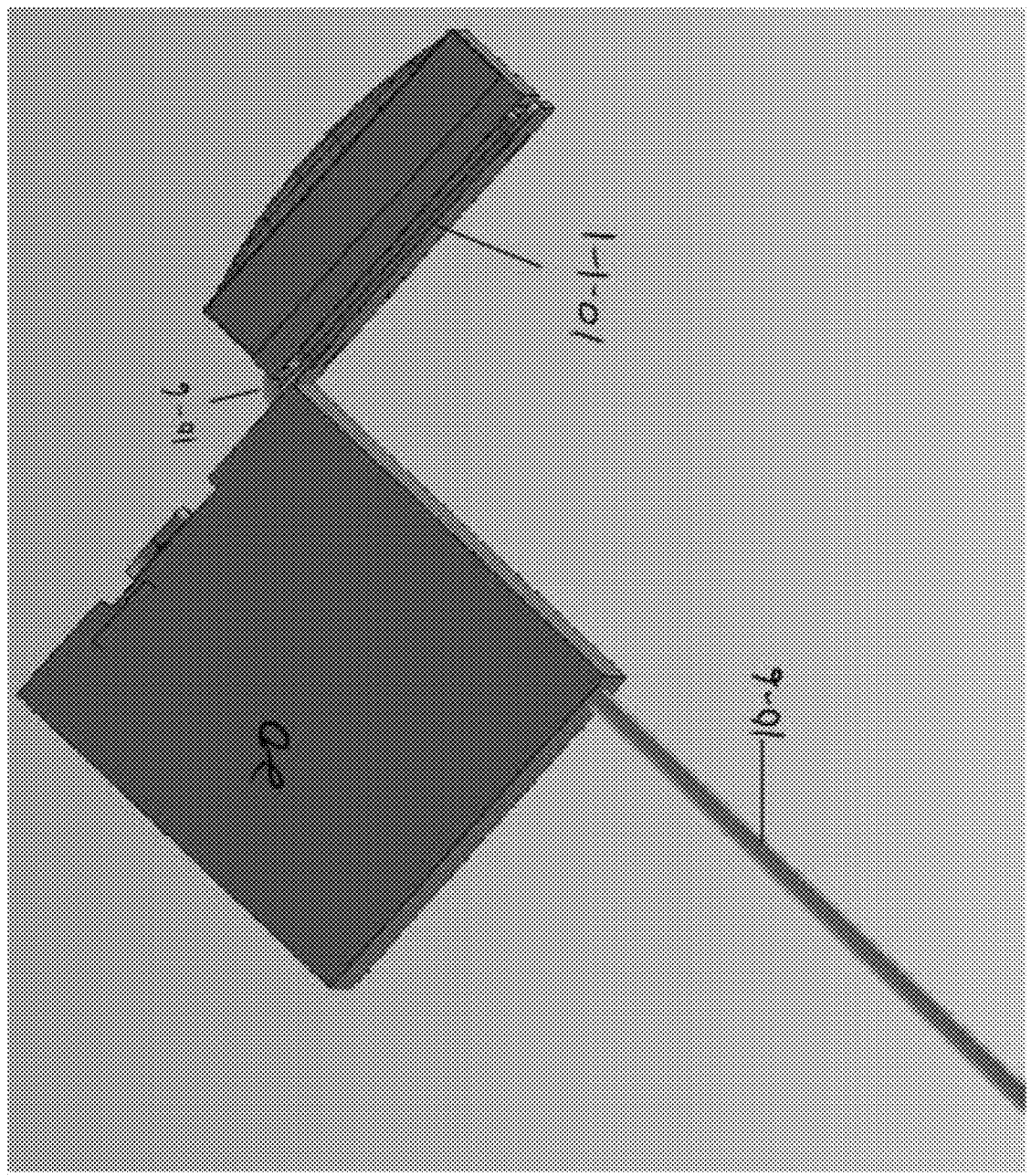
FIG. 7H is a side view of the computer system networking device assembly of FIG. 7A with certain component(s) removed.
Figures 1, 7H:
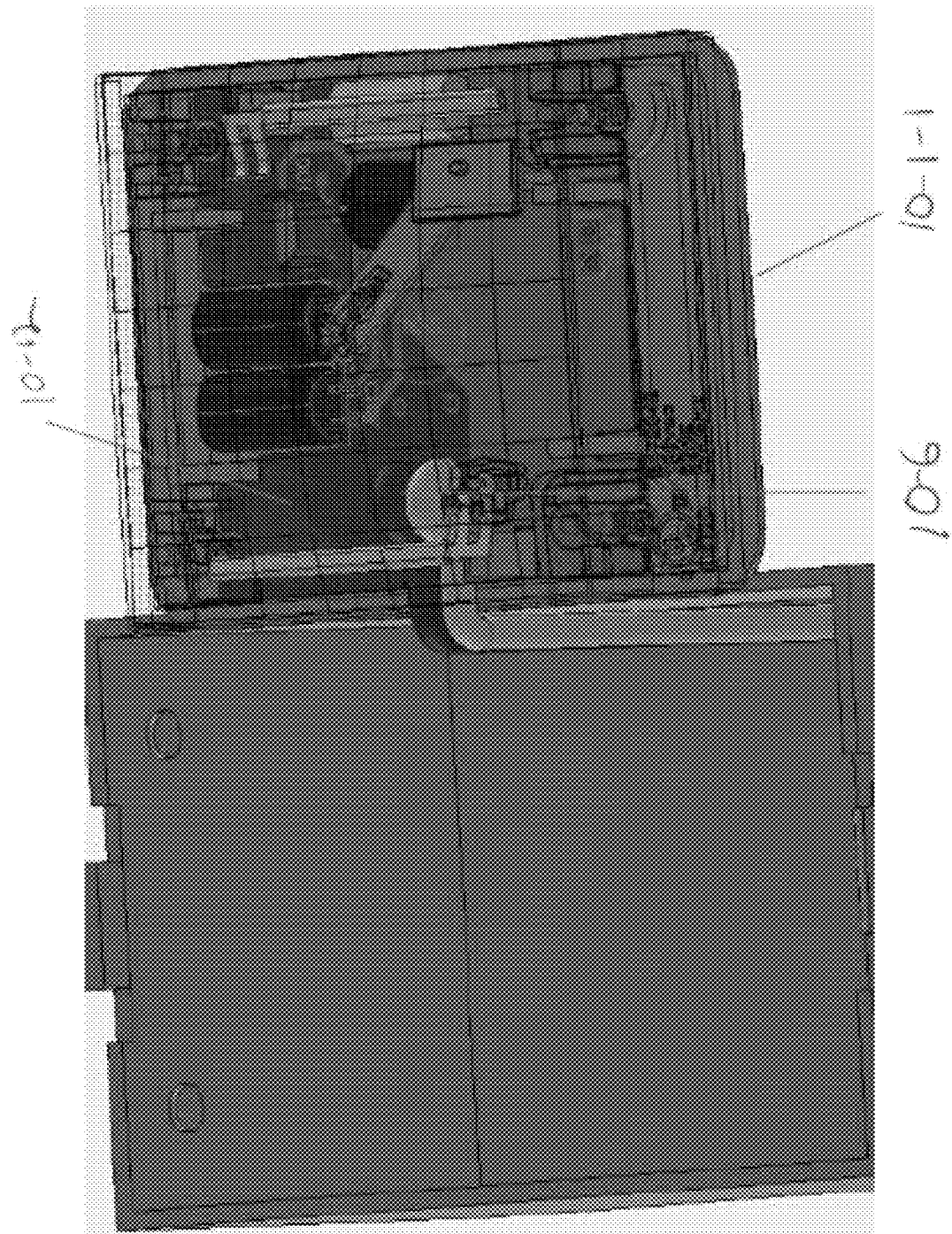
Figure 71:
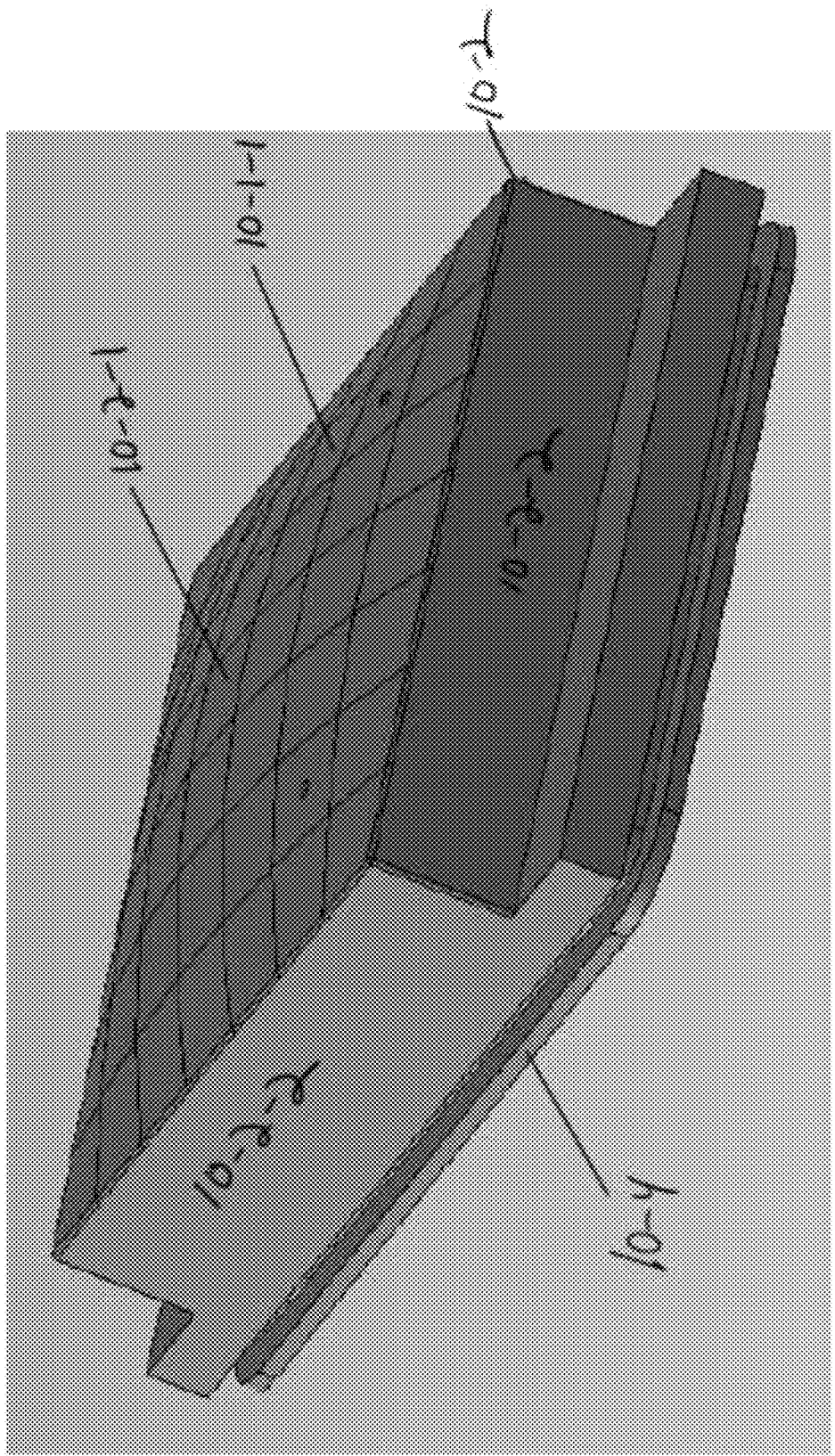

Turning to FIG. 7F, a front isometric view of portions of the computer system networking device assembly 200 of FIG. 7A. The wall plate 30, the subplate 18, and the frame 17 are removed, and various components of the electrical wiring device 10-1-2 are removed. AC wires 10-6 of the gateway hub device 10-1-1 are shown extending from the side of the device 10-1-1 (through an aperture, not shown) and down into and through the wall box 20 of the electrical wiring device (and is configured to be connected to a mains power supply). FIG. 7G is a back isometric view of the computer system networking device assembly 200 of FIG. 7A, showing the extension of the AC wires 10-6 away from the wall box 20. FIG. 7H is a side view of the computer system networking device assembly 200 showing AC wires 10-6 of the gateway hub device 10-1-1 extending from the side of the device 10-1-1, down into and through the wall box 20 of the electrical wiring device.

FIG. 7H-1 is a front isometric view of portions of the computer system networking device assembly 200 of FIG. 7A. In particular, AC wires 10-6 are shown positioned through the gateway hub device 10-1-1 enclosure and connecting to the power supply circuit 10-12 at connection points thereon.

FIG. 7I is a side isometric view of the gateway hub device 10-1-1 of the computer system networking device assembly 200 of FIG. 7A. Top plate 10-2 with facets/sides 10-2-2, and the back plate 10-4 are shown.

Figure 7J:
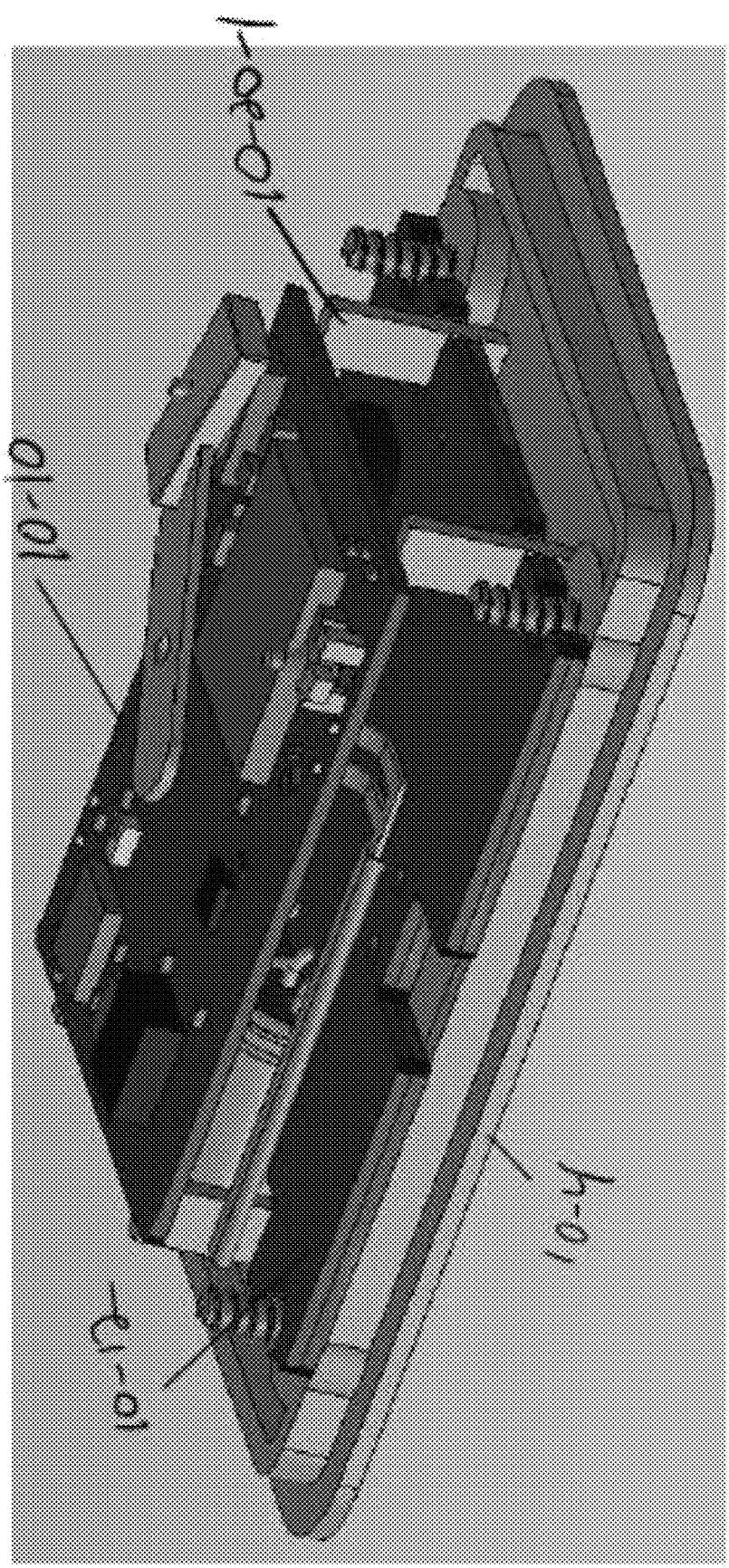
FIG. 7J is a side isometric view of the computer system networking device assembly of FIG. 7A with certain component(s) removed.
Figure 7K:
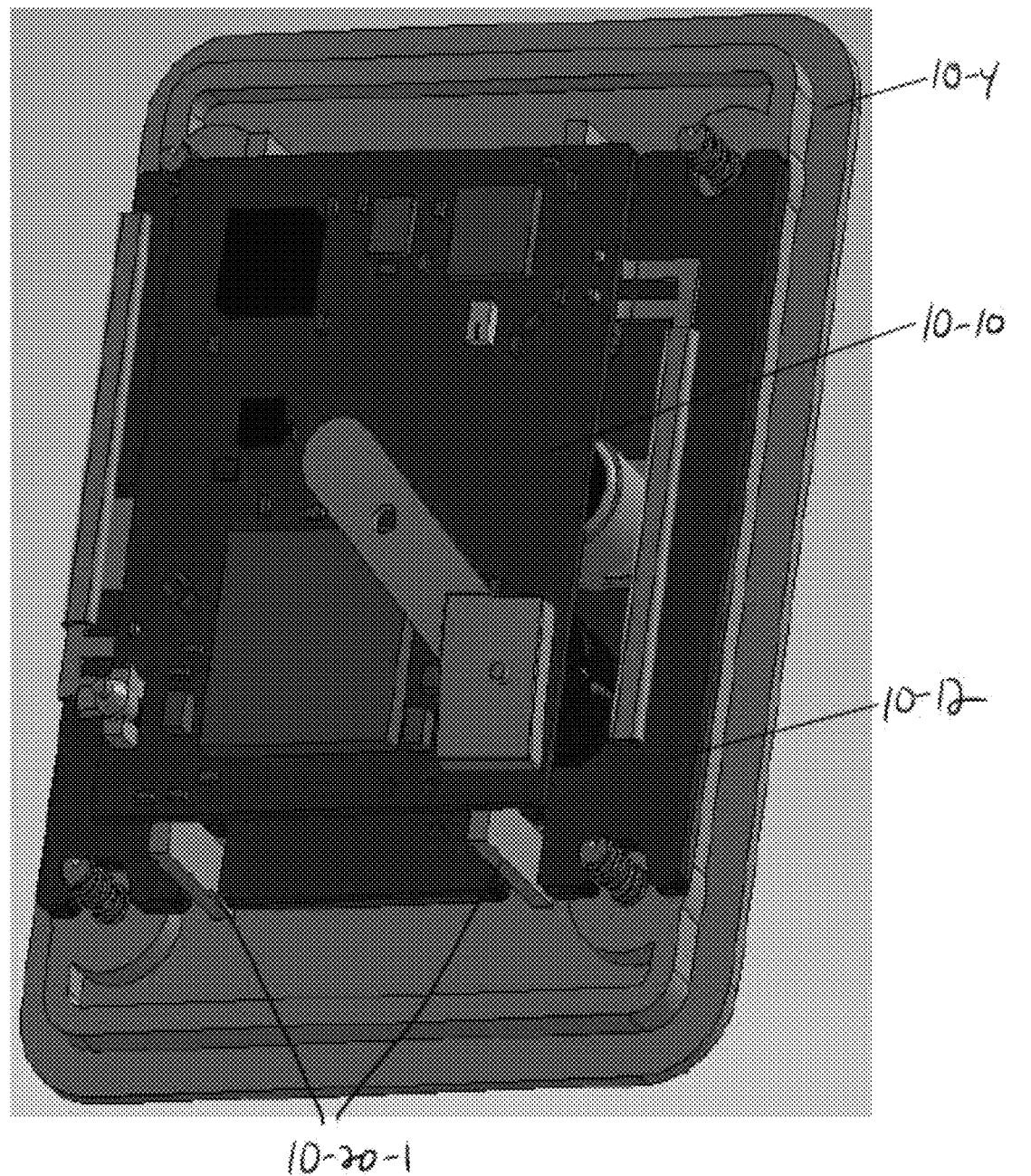
FIG. 7K is a front isometric view of the computer system networking device assembly of FIG. 7A with certain component(s) removed.

FIG. 7J is a side isometric view of the gateway hub device 10-1-1 of the computer system networking device assembly 200 of FIG. 7A with the front plate 10-2 removed. A gateway module 10-10 is visible with a number of associated components (e.g., microchip) on a circuit board, as discussed with respect to other embodiments above. A power supply circuit 10-12 is shown with components positioned on a circuit board, and is separated from the gateway module 10-10. This embodiment can also have a separator 14 (not shown), which can be used to separate the two circuit boards. The power supply circuit 10-12 and the gate way module 10-10 are preferably positioned on circuit boards that are positioned in separate parallel planes, separated by separation components 10-20-1 and connected by electrical connectors 13 (see FIG. 7L). In this embodiment, as opposed to the embodiment shown and discussed with respect to FIGS. 6A-O, the components on the power supply board 10-12 face the gateway module 10-10 circuit board. However, in accordance with an alternative embodiment, the components can face away from the gateway module 10-10 circuit board (and the embodiment shown and discussed with respect to FIGS. 6A-O can have a similar configuration as shown and described here). FIG. 7K is a front isometric view of the gateway hub device 10-1-1 of the computer system networking device assembly 200 of FIG. 7A, showing a different view of the same components as FIG. 7J.

Figure 7L:
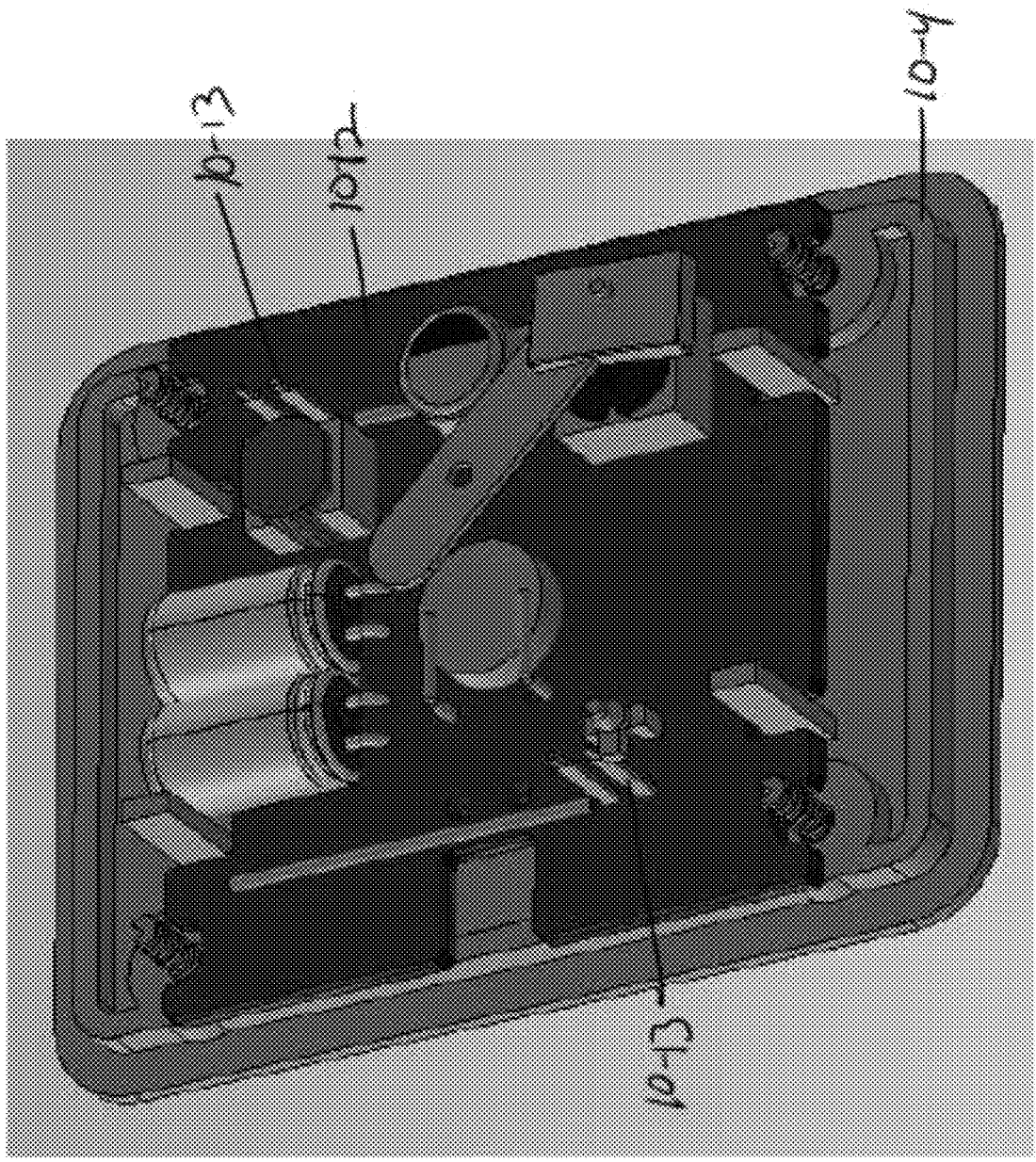
FIG. 7L is a front isometric view of the computer system networking device assembly of FIG. 7A with certain component(s) removed.

FIG. 7L is a front isometric view of the gateway hub device 10-1-1 of the computer system networking device assembly 200 of FIG. 7A with the gateway module 10-10 removed. The power supply circuit 10-12 is shown on a circuit board with various components including electrical connectors 10-13 that extend up to and electrically and mechanically connect with the gateway module 10-10 circuit board.

Additional alternative embodiments are contemplated by this disclosure, including those shown and described in the above referenced provisional application (U.S. Provisional Patent Application Ser. No. 62/948,843), the specifically referenced pages/sections are hereby incorporated by reference herein. For example, as described on page 2 of the provisional application as "option 1," a custom wall plate is contemplated that includes a bulge positioned on an existing length/width wall plate that provides a space for the gateway hub 10 components. Page 4 of the provisional describes a similar design, but the wall plate can have an extended length or width to accommodate the gateway hub 10 components.

On page 3 of the provisional application as "option 2," a custom wall plate is illustrated and described. This wall plate includes gateway hub 10 components in a structure that can be placed over the electrical receptacle half portion of the wireless charging device shown in U.S. Pat. No. 10,340,722, incorporated by referenced herein in its entirety, and has blades that can plug into voltage terminals of the electrical receptacle half and receive power in a similar manner as described with respect to FIG. 4B.

Page 5 of the provisional application describes a similar embodiment as described with respect to embodiments addressed above.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A computer system networking device assembly comprising:
 a computer system networking device module coupled to
  a power supply circuit, wherein the computer system networking device module is a gateway module configured to provide communication between one or more IoT devices and a remote server over an internet connection, wherein the power supply circuit is configured to convert an AC mains signal into a converted signal suitable for powering the computing system networking device module;

an enclosure wherein the enclosure houses the computer system networking device module and power supply circuit; and a subplate or wall plate having a first aperture formed therethrough, and wherein the enclosure is configured to be positioned at least partially through the first aperture formed in a subplate or a wall plate.

2. The assembly of claim 1, wherein the gateway module is positioned on a first circuit board and the power supply circuit is positioned on a second circuit board.

3. The assembly of claim 2, wherein the first circuit board and the second circuit board are connected adjacent to one another, and each of the first circuit board and the second circuit board are positioned and extend in a first plane.

4. The assembly of claim 2, wherein the first circuit board is positioned and extends in a first plane and the second circuit board is positioned and extends in a second plane, and wherein the first plane is different from the second plane.

5. The assembly of claim 1, wherein the enclosure is formed of a front plate having a front surface attached to a back plate.

6. The assembly of claim 5, wherein the front surface is curved.

7. The assembly of claim 6, wherein the front plate comprises a base portion, and wherein the curved front surface is positioned a distance from and connected to the base portion by one or more facets.

8. The assembly of claim 1, wherein the computer system networking device is at least partially positioned in a wall box.

9. The assembly of claim 8, wherein the wall box is a single gang wall box.

10. The assembly of claim 8, wherein the wall box is a multi-gang wall box.

11. The assembly of claim 1, wherein the subplate or wall plate further includes a second aperture formed therethrough being configured to accommodate at least a portion of an electrical wiring device.

12. The assembly of claim 11, wherein the electrical wiring device is configured to be at least partially installed in a wall box within a wall mounting surface.

13. The assembly of claim 12, wherein the gateway module is configured to overhang the wall mounting surface adjacent to the electrical wiring device when the electrical wiring device is at least partially installed in the wall box within the wall mounting surface.

14. The assembly of claim 13, wherein the gateway module is positioned on a first circuit board and the power supply circuit is positioned on a second circuit board.

15. The assembly of claim 14, wherein the first circuit board and the second circuit board are connected adjacent to one another, and each of the first circuit board and the second circuit board are positioned and extend in a first plane.

16. The assembly of claim 14, wherein the first circuit board is positioned and extends in a first plane and the second circuit board is positioned and extends in a second plane, and wherein the first plane is different from the second plane.

17. The assembly of claim 11, wherein the electrical wiring device is selected from a group consisting of electrical wiring devices including an outlet receptacle, an electric switch, a ground fault circuit interrupter (GFCI), an arc fault circuit interrupter (AFCI), a transient voltage surge suppressor (TVSS), a surge protective device (SPD), a dimmer, a fan speed control, a night light, a low voltage port, and a USB port.

* * * * *